(12) United States Patent
Palermo et al.

(10) Patent No.: US 11,888,730 B1
(45) Date of Patent: Jan. 30, 2024

(54) DYNAMICALLY OPTIMIZING ROUTING WITHIN A DECENTRALIZED NETWORK

(71) Applicant: Block, Inc., San Francisco, CA (US)

(72) Inventors: Joseph Palermo, Toronto (CA); Marc Tyndel, Toronto (CA); Hashiam Kadhim, Scarborough (CA)

(73) Assignee: Block, Inc., Oakland, CA (US)

( * ) Notice: Subject to any disclaimer, the term of this patent is extended or adjusted under 35 U.S.C. 154(b) by 0 days.

(21) Appl. No.: 17/948,374

(22) Filed: Sep. 20, 2022

(51) Int. Cl.
| | | |
|---|---|---|
| *H04L 9/00* | (2022.01) | |
| *G06Q 20/00* | (2012.01) | |
| *H04L 45/44* | (2022.01) | |
| *H04L 41/16* | (2022.01) | |

(52) U.S. Cl.
CPC .............. *H04L 45/44* (2013.01); *G06Q 20/00* (2013.01); *H04L 9/00* (2013.01); *H04L 41/16* (2013.01)

(58) Field of Classification Search
CPC ......... H04L 45/44; H04L 41/16; H04L 45/38; H04L 9/00; G06Q 30/0635
See application file for complete search history.

(56) References Cited

U.S. PATENT DOCUMENTS

| | | | |
|---|---|---|---|
| 10,122,683 B2 | 11/2018 | Wilf et al. | |
| 2020/0267020 A1* | 8/2020 | Doney | G06F 16/9024 |
| 2020/0336294 A1* | 10/2020 | Sun | H04L 9/0637 |
| 2020/0349194 A1* | 11/2020 | Kundu | G06F 16/903 |
| 2021/0217012 A1* | 7/2021 | Kettler | G06Q 20/4012 |
| 2021/0250297 A1* | 8/2021 | Norton | H04L 43/0894 |
| 2022/0107937 A1* | 4/2022 | Adivi | G06F 16/2379 |
| 2023/0004970 A1* | 1/2023 | Jakobsson | G06Q 20/407 |

* cited by examiner

*Primary Examiner* — Shirley X Zhang
(74) *Attorney, Agent, or Firm* — Polsinelli PC

(57) ABSTRACT

Dynamically optimizing routing within a decentralized network is described. In accordance with the described techniques, a node operator accesses historical state data associated with a decentralized network layered on top of a blockchain network. Using machine learning, the node operator trains one or more models based on the historical state data. For example, the node operator trains the one or more models to optimize routing within the decentralized network. In near-real time and using the one or more models, the node operator monitors state data (e.g., current state data) associated with the decentralized network. Based at least in part on the monitoring, the node operator performs one or more actions to optimize the routing within the decentralized network.

20 Claims, 17 Drawing Sheets

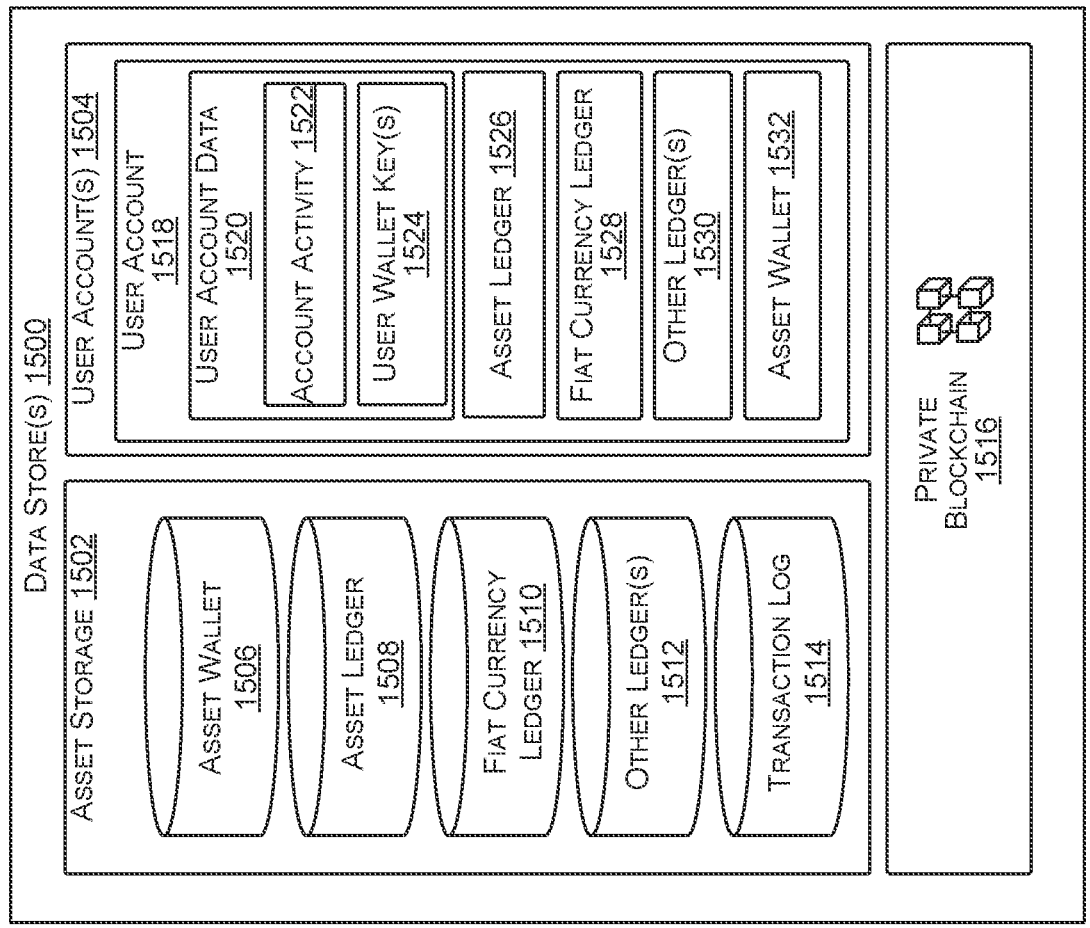
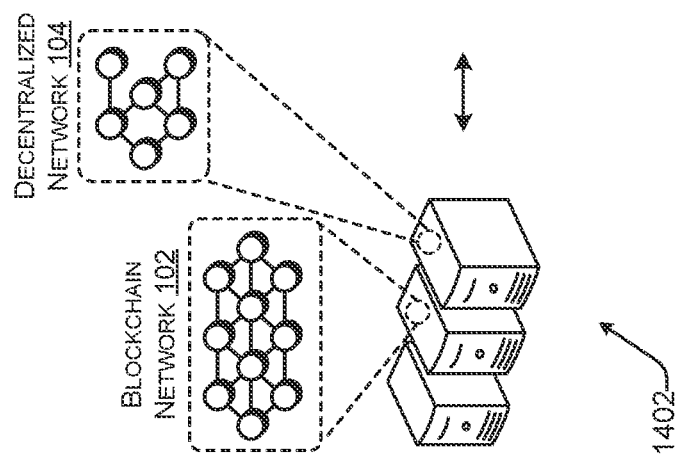
FIG. 15

DYNAMICALLY OPTIMIZING ROUTING WITHIN A DECENTRALIZED NETWORK

TECHNICAL FIELD

Blockchain networks provide a variety of functionality in connection with implementing and securely transferring various digital assets, examples of which include cryptocurrencies and blockchain-based tokens, such as tokens for "smart contracts" and non-fungible tokens (or "NFTs"). Additional decentralized networks have been developed to sit on top of the blockchain networks and enable transactions involving such digital assets to be executed without committing every transaction to the underlying blockchain network. These additional decentralized networks are referred to as "layer 2" networks because their framework and protocol is built on top of a blockchain network, which is referred to as a "layer 1" network.

BRIEF DESCRIPTION OF THE DRAWINGS

One or more embodiments of the disclosed technologies are illustrated by way of example and are not limited by the figures of the accompanying drawings, in which like references indicate similar elements.

FIG. 15 illustrates details associated with a ledger system with which techniques described herein can be implemented, according to an embodiment described herein.

DETAILED DESCRIPTION

Figure 1:
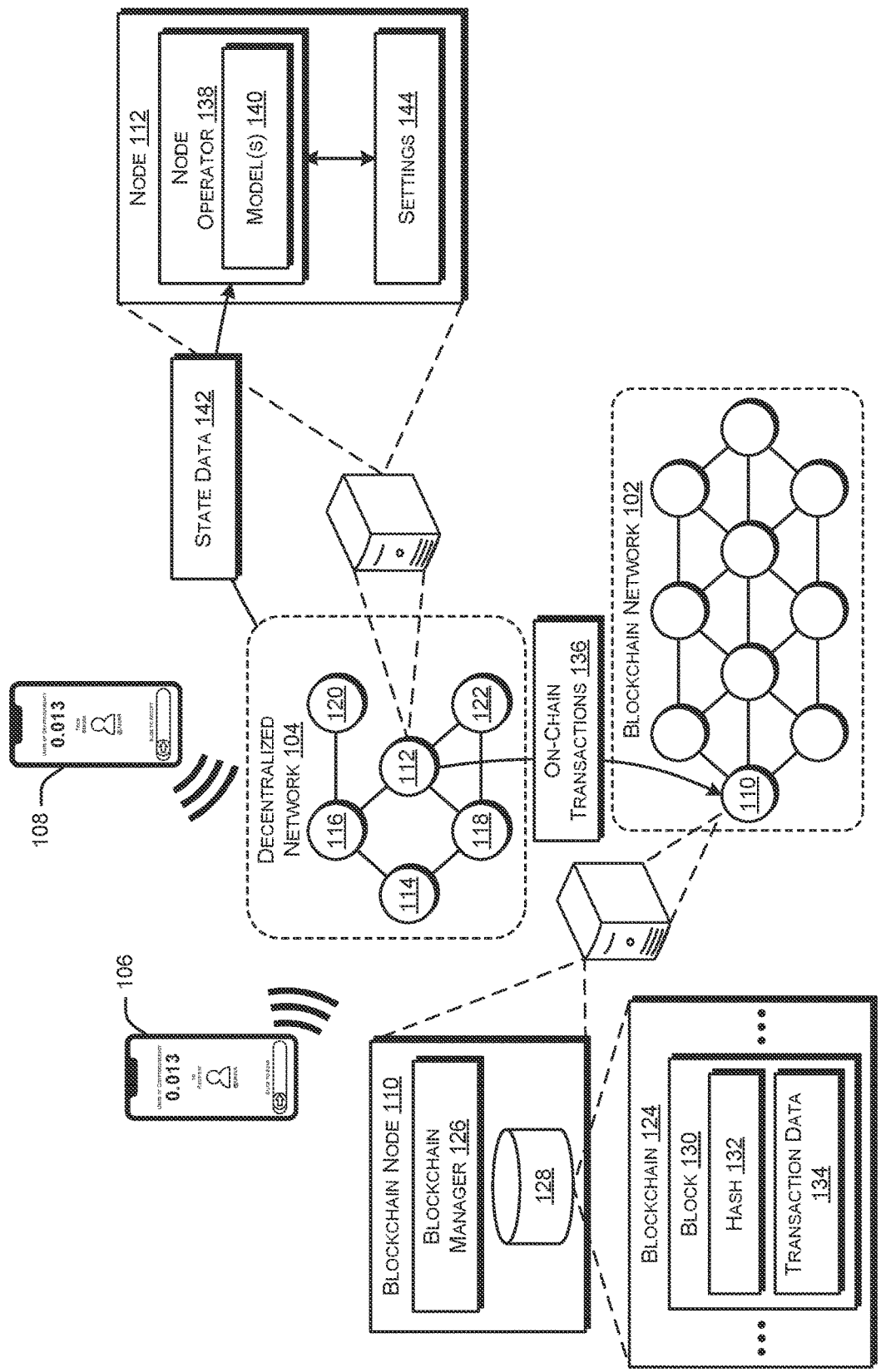
FIG. 1 is a block diagram of a non-limiting example environment in which dynamically optimizing routing within a decentralized network may be implemented, according to an embodiment described herein.

Techniques described herein relate to dynamically optimizing routing within decentralized networks. That is, techniques described herein relate to solutions to complex optimization problems associated with state changes of nodes and/or channels of decentralized networks. In examples, techniques described herein can utilize machine-learning techniques to optimize routing within decentralized networks. Techniques described herein utilize global, multivariate optimization approaches for solving such complex optimization problems, thereby offering advantages and improvements over piecewise or heuristic optimization approaches.

Blockchain networks provide a variety of functionality in connection with implementing and securely transferring various digital assets, examples of which include cryptocurrencies and blockchain-based tokens, such as tokens for "smart contracts" and non-fungible tokens (or "NFTs"). While their architecture and protocols provide a variety of advantages that support the secure transfer of digital assets (and provenance of physical assets in various cases), many blockchain networks have scaling limitations. For example, a fixed number of transactions can occur on the Bitcoin and Ethereum networks each day due to computer processing requirements and associated time delays.

Due to this, additional decentralized networks have been developed to sit on top of blockchain networks and enable transactions involving blockchain-implemented digital assets to be executed, without recording every transaction to a blockchain network. These additional decentralized networks are referred to as "layer 2" networks (or, "off-chain" solutions) because their framework and protocol is built on top of a blockchain network, which is referred to as a "layer 1" network. In addition to the Bitcoin and Ethereum networks, examples of layer 1 blockchain networks include the Litecoin blockchain network, the Ripple blockchain network, and the Hyperledger blockchain network. Examples of layer 2 decentralized networks include the Lightning Network, Ethereum Plasma, Raiden, and RIF Lumino. Techniques described herein are not limited to such example layer 1 and layer 2 networks.

The underlying architecture and protocols for implementing some layer 2 decentralized networks are based on the notion of a "channel," which is a medium of communication that can be established between two nodes of the decentralized network. In channel-based implementations, an individual node may not be directly connected to every other node of the decentralized network via a channel, and only pairs of nodes between which a channel has been established are directly connected. Once a channel is established between nodes of the decentralized network, any number of transactions can occur back and forth over the channel between the nodes and, notably, are executed without requiring the transactions be recorded to the blockchain network at the time they are executed. In other words, many transactions are executed "off-chain," thereby enabling the transactions to be completed without the use of, or with a reduced use of, computer processing and/or associated time delays as is the case with conventional, layer 1 networks. In particular, the use of channels to execute transactions "off-chain" enables transactions to be completed without involving computationally intensive tasks such as validation. As such, usage of computational resources is reduced for nodes participating in the validation process. Further, executing transactions using "channels" reduces the processing associated with propagating the transaction to each node in the network, as would otherwise be required with conventional, layer 1 networks. Propagation of the transaction involves sending communications which involve computational resources to prepare, transmit and receive information between nodes. Additionally, bandwidth usage is reduced as a result from the reduction in communications between nodes in the network. Conducting transactions "off-chain" also reduces the delay in completing a transaction, as discussed above, which can result from network congestion and queued transactions. Accordingly, using "channels" improves the responsiveness (i.e. efficiency and speed) of processing a transaction. Conducting transactions "off-chain" also enables privacy to be improved, especially in the case of public blockchain networks, as the transaction is not publicly broadcasted.

Although transactions over a channel of a layer 2 decentralized network may not be recorded to the underlying blockchain network, there may be a limit on the amount of each transaction, which, for example, can be based on a capacity of the channel. To open a channel on the Lightning Network, for example, each party "stakes" a certain amount of funds for the node on their side of the channel via a one-time, "on-chain" transaction on the blockchain—another on-chain transaction occurs when the channel is closed and the balances on either side of the channel are settled. As an example of "staking," a first party may commit 3 Bitcoin to the node on their side of the channel (e.g., a first node), and a second party may commit 2 Bitcoin to the node on their side of the channel (e.g., a second node). The amount of funds "staked" for a channel governs how transactions can flow across the channel, i.e., the channel's capacity. Initially, for example, the first node can transfer a maximum of 3 Bitcoin across the channel to the second node, and the second node can initially transfer a maximum of 2 Bitcoin across the channel to the first node. As payments are transferred, though, the capacity changes on each side of the channel. For example, if the first node transfers 0.05 Bitcoin across the channel to the second node, the first node is subsequently only able to transfer 2.95 Bitcoin across the channel, while the second node is now able to transfer 2.05 Bitcoin across the channel.

In some examples, channels may not be established directly between every node of the decentralized network. One reason that channels may not be established directly between every node of the decentralized network is that the resources required to establish channels can be a limiting factor. As mentioned above, in order to establish a channel, a particular amount of funds is "staked" for each node of the channel via a one-time, "on-chain" transaction on the underlying blockchain network. Since many users may have limited funds, cryptocurrency or otherwise, the criteria to stake funds to open a channel can prevent some users from operating nodes and/or from establishing channels between their nodes and various other nodes in the decentralized network. Moreover, many users may transact with a large number of different parties, such as friends, family members, a variety of different local merchants, artists, financial entities, and so forth. If a user were to form a new channel with each of these different parties, the number of transactions recorded to the underlying blockchain network in order to open each new channel would be relatively high, and thus the usefulness of layer 2 decentralized networks would be greatly reduced.

Thus, in order for transactions to occur between two nodes of the decentralized network that are not directly connected via a channel, the decentralized network includes and utilizes intermediate "routing" nodes. In accordance with the described techniques, a "routing" node is a type of node of the decentralized network. A routing node is a node that has channels established with at least two other nodes of the decentralized network, which may or may not be routing nodes. A routing node "routes" a transaction by receiving the transaction (e.g., a cryptocurrency payment or some other digital asset) via a first channel established with a first node and by forwarding the transaction via a second channel established with a second node. In terms of a path of channels connecting the first node, the routing node, and the second node, the routing node is in the path between the first and second nodes and is connected to both of those nodes via respective channels. Routing nodes enable payments to be transferred between two nodes "indirectly," without the two nodes needing to form a direct communication channel. Such transactions are routed between endpoints (e.g., an "origin" node and a "final" node) using established channels between one or more of those routing nodes along a path from endpoint to endpoint.

Without routing nodes, endpoints of a transaction would be limited to establishing a direct connection in order to execute the transaction, which, as discussed throughout, involves the validation and recording mechanisms of the blockchain network, thus exposing the process to some of the limitations of blockchain networks, e.g., daily transaction limits and high fees. Further, establishing direct connections is computationally intensive and thus, by utilizing indirect connections and routing nodes, techniques described herein can reduce computer processing requirements when compared to conventional, layer 1 networks. As discussed, processing requirements and bandwidth requirements are also reduced via indirect connections by not needing to propagate the transaction to each node in the network. In addition, using indirect connections and routing nodes enables improved robustness and responsiveness by avoiding network congestion and the queuing of transactions involved in establishing direct connections. Further, using routing nodes to transfer payments between nodes maintains the privacy of the parties involved in the transaction as would be exposed with conventional, layer 1 networks.

Routing nodes are configured to route transactions from a first node to a second node, for example, by receiving a transaction (e.g., a payment) from the first node across a first, incoming channel established with the first node, and then forwarding the transaction (e.g., the payment) to the second node across a second, outgoing channel established with the second node. Routing nodes can change their settings, but doing so may have an effect on the volume and/or number of transactions routed through the routing nodes. For example, decreasing a capacity of a channel may decrease traffic as payments may be routed through other nodes with channels having more capacity, whereas increasing capacity of a channel may increase the amount of traffic routed through the routing node.

In addition to capacity, there are numerous other factors which contribute to how much network traffic is routed through a routing node, examples of which include other nodes (e.g., "peers") to which the routing node is directly connected with established channels, capacities of channels peers have with other nodes, balances of the funds on the channels, routing fees of the routing node and other nodes, a speed at which the routing node routes transactions, security of the routing node and nodes to which the routing node is connected, latency of transactions routed through the routing node, and overall network use, to name just a few.

Dynamically optimizing routing within a decentralized network is described. In one or more implementations, a node operator accesses historical state data that describes characteristics, such as routing fees and/or traffic flows, associated with a decentralized network layered on top of a blockchain network, e.g., from one or more databases where the data is stored. In at least one variation, the historical state data is obtained by "probing" the decentralized network. Probing includes sending multiple communications (i.e., "probes") across the decentralized network to obtain the data. For example, the node operator sends a succession of probes at different times across a same path and/or probes across multiple different paths. In addition to the information the probes provide directly, the node operator also computes statistics based on differences between the information obtained at different times, such as to compute a flow of network traffic across a channel over time. In at least one example, a probe is a test payment which may not be able to settle because a hash associated with the test payment is, by design of the node operator, unknown to a recipient node of the test payment. As discussed in more detail below, the node operator sends probes, for instance, to determine balances of channels between nodes, and also to determine a flow of network traffic across those channels. Using machine learning, the node operator then trains one or more models based on the historical state data. For example, the node operator trains the one or more models to optimize routing within the decentralized network. As such, using machine learning in this way optimizes the distribution of network traffic, i.e. transactions, across the channels, thereby optimizing load distribution in the decentralized network.

In near-real time and using the one or more models, the node operator monitors state data (e.g., current state data) associated with the decentralized network. Based at least in part on the monitoring, the node operator performs one or more actions to optimize the routing within the decentralized network. As discussed in more detail below, the node operator performs the one or more actions to optimize the routing in relation to a performance metric or a combination of them. Examples of performance metrics include, but are not limited to, a volume of transactions over one or more channels, a number of transactions over one or more channels, a frequency of transactions, a speed of transactions over one or more channels, a latency of transactions over one or more channels, an amount of computing resources consumed due to executing transactions, an amount of power consumed by computing resources due to executing transactions, an amount of idle time of computing resources between transactions and/or over a time period (e.g., a day), a measure of security of transactions over one or more channels, an average size of transactions (e.g., in terms of amount of cryptocurrency), a number or volume of failed transactions, and return on investment of a cryptocurrency staked for a node, to name just a few.

Examples of the actions that the node operator can perform, or cause to be performed, dynamically to optimize the routing include, but are not limited to, opening a channel between nodes, closing a channel between nodes, designating which channels to open or close (e.g., "peer selection"), setting or modifying a routing fee associated with a channel, adjusting a capacity of an open channel, initiating a circular rebalancing of a channel, and so forth. As used herein, the phrase "dynamically" optimizing the routing refers to doing so "intelligently" and "automatically." As used herein, the term "intelligently" refers to using one or more models trained with one or more machine learning techniques. As used herein, the term "automatically" refers to performing one or more optimizations without user input, such as without receiving a user input specifying to perform an optimization and/or without receiving a user input to adjust a configuration of a routing node. By performing these actions intelligently and automatically, the node operator can optimize the state of the node in real time or near-real time as state data describing changes in the decentralized network is received, e.g., as other nodes change their routing fees, open new channels, close existing channels, circularly rebalance their channels, and so forth. Due to the intelligent and automatic adjustments, the node operator can take advantage of the changed network conditions before the operators of other nodes take action.

In addition to routing nodes, one or more "malicious nodes" may exist in the decentralized network layered on the blockchain. As used in the specification and in the claims, the phrase "node" refers to software and/or hardware that is assigned with a unique identity and is configured to perform at least one prescribed function. However, there may be instances when the node either intentionally or unintentionally may not perform the prescribed function. Put differently, although the node is configured to perform a prescribed function, it may not always perform its prescribed function. In some such instances, a node may be considered a "malicious" node if it has proven, repeated behavior of not performing its prescribed function. For example, a malicious node may introduce security vulnerabilities to a transaction, e.g., a payment flow. In one or more implementations, the machine learning models described herein learn the nodes that may be malicious based on comparison with "non-malicious nodes" and/or expected behavior, to operate in an adaptive manner such that routing is optimized to avoid malicious nodes (e.g., by routing network traffic around them) and/or to reduce an amount of network traffic that is routed through malicious nodes. In one or more implementations, this includes forming new channels with non-malicious nodes, closing channels with malicious nodes, and/or selecting paths through the decentralized network that include only non-malicious nodes, such that the integrity of the decentralized network is maintained. In this way, the stability and security of the decentralized network is improved.

In contrast to the described optimization, conventional systems for managing settings of routing nodes in a decentralized network on a blockchain network are naïve. Some of those systems are static and use routing nodes with fixed settings for determining how to route transactions through the network. Moreover, those approaches can result in inefficiencies, such as consuming too much network bandwidth to keep under-utilized or unused channels open, waiting for user intervention to initiate channel rebalancing thereby leaving allocated computing resources idle, and committing processing cycles to changing settings of routing nodes sub-optimally several times.

By intelligently and automatically adjusting settings of routing nodes (e.g., in real-time or near-real-time with little to no input from a user), the described techniques provide efficiencies, such as allocating network bandwidth to channels that are being used to execute transactions, performing various operations to rebalance a channel automatically so that it and the underlying computing resources do not remain idle, and reducing a number of processing cycles which are used to change routing node settings. These efficiencies enable improvements to computer processing and/or computer networks, thereby offering improvements over existing techniques. Accordingly, automatically rebalancing channels by adjusting settings of routing nodes using models trained with machine learning enables improved resource utilization of underlying computing resources. Further, the efficient use of underlying computing resources enables processing requirements, network bandwidth requirements and power consumption for nodes in the decentralized network to be reduced.

Also, conventional systems for managing settings of routing nodes use information that is local to a node (e.g., describing network traffic routed through the node and states of channels that involve the node) and information about other nodes that utilize a same node operator (e.g., from a central bus associated with the node operator). However, this information is limited because it does not describe various aspects of numerous other nodes in the network that use different node operators. With such incomplete information, conventional node operators are limited to utilizing piecewise or heuristic optimization approaches to optimize performance metrics.

In contrast, the described techniques utilize a global multivariate optimization approach, which leverages machine learning models trained on historical state data of the decentralized network and predicts the behavior of routing nodes in the decentralized network for which some information is "private." By performing the probing described above and below, the described techniques obtain this "private" information and/or generate information based on the probing that estimates or approximates such information, e.g., with a known amount of certainty. By doing so, the described techniques determine how to optimize routing performed by a particular routing node within the decentralized network using a more complete description of the network's operation than conventional techniques. That is, by leveraging a network-focused approach (instead of, or in addition to, a locally-focused approach), techniques described herein enable network-based optimization that would not otherwise be available for locally-focused approaches. As such, using the global multivariate optimization approach described herein for network-based optimization enables a more robust and reliable method for optimizing the routing within the decentralized network.

As used herein "multivariate optimization" refers to optimization that is performed jointly over historical data describing numerous aspects of the system (e.g., all aspects described by the data) simultaneously. This is distinguished from optimization in which aspects of the system (as described by the data) are optimized in isolation from each other—which may be faster to perform but reduces a performance ceiling of the system.

Further, many conventional systems rely on human interaction to adjust routing node settings, if attempts are even made to optimize various performance metrics, such as return (e.g., an amount collected from routing fees) on an investment (e.g., the amount of cryptocurrency staked and/or a cost of underlying hardware resources) associated with operating a routing node. For example, these systems are capable of receiving user input to adjust the settings. When providing such input, however, a human user merely makes a "best guess" as to what a routing node's settings should be to optimize the performance metrics. A human user is not capable of simulating hundreds or thousands (or more) of transactions flowing across a decentralized network over multiple hours while a routing node operates with particular settings, and also tracking the simulated transactions. Moreover, a human user is not further capable of subsequently performing additional simulations for different settings of the routing node, and tracking outcomes of simulated transactions. Notably, even if a human user were able to perform such simulations, by the time he or she was able to complete those simulations, the state of the decentralized network (e.g., settings of other nodes in the network) is likely to have changed, rendering the human-performed simulations obsolete.

By using a machine-learning approach, the described techniques are able to determine optimal routing settings for a node within the decentralized network in real-time or near-real time as changes to the state of the decentralized network occur. Once the optimal routing settings are determined, the node operator performs various actions without user input (e.g., automatically), which affect how a routing node routes transactions in real-time or near-real time thereby taking advantage of the determined optimal routing settings. That is, techniques described herein offer improvements to existing techniques by leveraging machine-learning to automate routing of nodes within a decentralized network in real time or near-real time.

Various technical advantages of techniques described herein are described above. In some examples, the machine-learning approach can be agnostic to different layer 1 and layer 2 networks. That is, a model can be trained on data associated with a first layer 1 and/or layer 2 network and can be utilized by a second layer 1 and/or layer 2 network without regard to the differences in the networks. In some examples, transaction data associated with layer 1 and/or layer 2 networks can be used to update and/or re-train a model trained on other layer 1 and/or layer 2 networks to customize the model for the layer 1 and/or layer 2 networks. Such updating and/or re-training can therefore enable faster use and/or application of a model when compared to training a model from scratch. As such, techniques described herein can be compatible with different layer 1 and/or layer 2 networks and provide efficiencies as described above.

FIG. 1 is a block diagram of a non-limiting example environment 100 in which dynamically optimizing routing within a decentralized network may be implemented. The environment 100 includes blockchain network 102, decentralized network 104, and a plurality of client devices (represented in the environment 100 by client device 106 and client device 108). In an example, the blockchain network 102 (which is also decentralized) can be a layer 1 network and the decentralized network 104 can be a layer 2 network. The blockchain network 102 includes a plurality of nodes, an example of which is blockchain node 110. The decentralized network 104 is also implemented using nodes, including the node 112 and other nodes 114, 116, 118, 120, 122. The blockchain nodes of the blockchain network 102, the nodes of the decentralized network 104, and the client devices are communicatively coupled, one to another, via one or more networks (not shown), an example of which is the Internet.

Computing devices that implement the environment 100 are configurable in a variety of ways. A computing device, for instance, is configurable as a server, a desktop computer, a laptop computer, a mobile device (e.g., assuming a handheld configuration such as a tablet or mobile phone), an IoT device, a wearable device (e.g., a smart watch), an AR/VR device, and so forth. Thus, a computing device ranges from full resource devices with substantial memory and processor resources to low-resource devices with limited memory and/or processing resources. Although in instances in the following discussion reference is made to a computing device in the singular, a computing device may also represent any number of different computing devices, such as multiple servers of a server farm utilized to perform operations "over the cloud" as further described in relation to FIG. 17.

In accordance with the described techniques, the blockchain network 102 includes a plurality of nodes (including the blockchain node 110) interconnected as a network, e.g., a distributed network. Each node of the blockchain network 102 is a runtime implemented using processing, memory, and networking resources of underlying computing devices that operate as the infrastructure of a blockchain 124. In variations, the underlying computing resources leveraged to implement an individual blockchain node may be local to a particular computing device. However, in other variations, the underlying computing resources leveraged to implement an individual blockchain node may be distributed and/or virtualized. In the illustrated example, the blockchain node 110 is depicted including blockchain manager 126 and storage 128, the storage 128 being an example of an underlying computing resource leveraged by the blockchain manager 126 to implement the blockchain node 110. Other underlying resources of one or more computing devices are also made available for operating the blockchain node 110. Broadly, the blockchain manager 126 is configured to leverage those resources to implement the blockchain node 110 on behalf of the one or more computing devices.

By way of example, the blockchain manager 126 manages the storage 128 of the one or more computing devices implementing the blockchain node 110, such as by causing a copy of the blockchain 124 to be maintained in the storage 128. The copy of the blockchain 124 stored at the storage 128 may be a partial or full copy of the blockchain 124, depending on one or more characteristics of the blockchain node 110 (e.g., a type) and/or a time (e.g., whether updates have been made to the blockchain 124 via other nodes in the blockchain network 102). The blockchain manager 126 may manage other resources of the computing devices in connection with operation of the blockchain node 110, such as memory and processors of those devices to perform computations (e.g., transaction validation), operating systems of those devices, and network connections of those devices (e.g., to commit changes to the blockchain 124 and to receive updates to the blockchain node 110's copy of the blockchain 124), to name just a few. In short, blockchain nodes store, communicate, process, and manage data that makes up the blockchain 124. As illustrated in FIG. 1, the blockchain nodes are interconnected to exchange data via one or more computer networks, such as the Internet. In this way, the blockchain nodes operate as a peer-to-peer network in a distributed and decentralized manner.

Broadly, the blockchain 124 is formed using a plurality of blocks 130, illustrated in FIG. 1 as including a respective hash 132 and transaction data 134. The transaction data 134 of the block 130 includes batches of validated transactions that are hashed and encoded. A subsequently generated block in the blockchain 124 includes the hash 132, which is a cryptographic hash of the block 130 in the blockchain 124, thereby linking blocks to each other to form the blockchain 124. As a result, the blocks 130 cannot be altered retroactively without altering each subsequent block in the blockchain 124 and in this way protecting against attacks by malicious parties.

In order to publish blocks for addition to the blockchain 124, a blockchain node may be implemented as a "miner" to add a block of transactions to the blockchain 124. In one or more implementations, other blockchain nodes may communicate transactions received at those nodes to one or more mining nodes for validation. Mining nodes may perform peer-to-peer computations to check if transactions intended for the blockchain 124 are valid and, if validated, may add validated transactions to a block 130 that those blockchain nodes are building. If the transactions are determined to be valid, for instance, then the transaction data 134 describing those transactions is encoded in or otherwise stored on a respective block 130, which is linked to the blockchain 124 such that the new block is "at the end" or "at the top" of the blockchain 124, e.g., through inclusion of the hash 132 of a previous block in the chain.

The blockchain nodes then broadcast this transaction history via the blockchain network 102 for sharing with other blockchain nodes. This acts to synchronize the blocks 130 of the blockchain 124 across the distributed architecture of computing devices. A variety of "types" of blockchain nodes may be used to implement the blockchain 124. By way of example, the blockchain 124 may be implemented at least in part using "full" blockchain nodes, which are nodes that store an entirety of the blockchain 124, e.g., locally in computer-readable storage media of respective computing devices of the blockchain nodes. Other types of blockchain nodes may also be employed to implement additional functionality, such as for governing voting events, execution of protocol operations, rules enforcement, and so forth.

The blockchain 124 may be leveraged to provide a diverse range of functionality. Due in part to the distributed storage and updating of the blockchain 124 over the blockchain network 102, the blockchain 124 may store its data in a decentralized manner, without a centralized database (e.g., run by a clearinghouse), and thus operate as a distributed ledger. The decentralized storage of the blockchain 124 overcomes one of the disadvantages of centralized storage, which is that centralized storage essentially has a single point of failure. It is to be appreciated that in one or more implementations, the blockchain 124 may be public (e.g., like Bitcoin and Ethereum blockchains), such that transactions on the blockchain 124 are generally viewable with a connection to the Internet. Alternatively, the blockchain 124 may be configured as a private blockchain, in one or more implementations. When the blockchain 124 is a "private" blockchain, the computing devices used to implement the blockchain nodes may be controlled by a centralized authority, such as a company or a consortium of entities.

As a distributed ledger, the blockchain 124 supports the secure transfer of digital assets, such as the transfer of a cryptocurrency and/or tokens. Often, cryptocurrencies (e.g., coins of the cryptocurrency) are the native assets to blockchains, whereas tokens are created "on top" of these blockchains. By way of example, the Bitcoin blockchain's native asset is (Bitcoin or "BTC"), a cryptocurrency. In one or more implementations, the blockchain network 102 corresponds to the Bitcoin blockchain. In variations, however, the blockchain network 102 may correspond to a different blockchain network (e.g., the Ethereum blockchain) or a combination of blockchain networks. It is to be appreciated that the described techniques may be used to optimize routing within a decentralized network (e.g., the decentralized network 104) for various digital instruments, including, by way of example and not limitation, cryptocurrencies (e.g., Bitcoin (BTC), Ether (ETH), Ripple (XRP), etc.) and tokens (e.g., non-fungible tokens (NFTs), smart contracts, digital rights management (DRM) mechanisms associated with digital content, mechanisms for shipping and logistics, etc.).

While their architecture and protocols provide a variety of advantages that support the secure transfer of digital assets (and provenance of physical assets in various cases), many blockchain networks have scaling limitations. For example, a fixed number of transactions may occur on the Bitcoin network and the Ethereum network each day. This limits Bitcoin's and Ethereum's feasibility as a medium of exchange for goods and services and can also lead to high fees (e.g., "gas" fees) for executing transactions at various times of day and throughout the week.

In accordance with the described techniques, the decentralized network 104 is a "layer 2" network that sits on top of the blockchain network 102, which is a "layer 1" network. One example of the decentralized network 104 is the Lightning Network, which is a "layer 2" network that sits on top of the Bitcoin blockchain network, which is "layer 1". Other examples of blockchain networks that are layer 1 networks include, but are not limited to, the Ethereum blockchain network, the Litecoin blockchain network, the Ripple blockchain network, and the Hyperledger blockchain network. Other examples of decentralized networks that are layer 2 networks (because their framework or protocol is built on top of a blockchain network) include, but are not limited to, Ethereum Plasma, Raiden, and RIF Lumino.

In variations, the underlying architecture and protocols for implementing the decentralized network 104 are based on the notion of a "channel," which is a medium of communication that can be established between two nodes of the decentralized network 104. For example, a channel is established between two nodes across one or more networks (e.g., the Internet) and using the underlying network interfaces and other networking hardware with which the two nodes are implemented. In accordance with the described techniques, an individual node of the decentralized network 104 is not directly connected to every other node of the decentralized network 104 via a channel. Rather, pairs of nodes between which a channel has been established are directly connected in the decentralized network 104. In the illustrated environment 100, for instance, the node 112 is depicted directly connected to the node 116 via a channel but is not directly connected to the node 120 via a channel. As discussed, processing requirements and bandwidth requirements are reduced by using the routing nodes of the decentralized network 104 due to indirect connections by not needing to propagate transactions to each node in the decentralized network 104. In addition, using indirect connections and routing nodes enables improved robustness and responsiveness by avoiding network congestion and the queuing of transactions involved in establishing direct connections. Further, using routing nodes to transfer payments between nodes maintains the privacy of the parties involved in the transaction as would be exposed with conventional, layer 1 networks.

Once a channel is established between nodes of the decentralized network 104, a number of transactions can occur back and forth over the channel between the nodes and, notably, those transactions are executed without the protocol of the decentralized network 104 requiring the transactions be recorded to the blockchain network 102 at the time they are executed.

The use of channels to execute transactions "off-chain" enables transactions to be completed over the decentralized network 104 without involving computationally intensive tasks, such as validation, associated with the blockchain network 102. As such, usage of computational resources is reduced for nodes participating in the validation process. Further, executing transactions using "channels" reduces the processing associated with propagating the transaction to each node in the blockchain network 102, as would otherwise be required by limiting transactions to conventional, layer 1 networks. Propagation of the transaction involves sending communications which involve computational resources to prepare, transmit and receive information between blockchain nodes. Additionally, bandwidth usage is reduced as a result from the reduction in communications between blockchain nodes in the blockchain network 102. Conducting transactions "off-chain" also reduces the delay in completing a transaction, as discussed above, which can result from network congestion and queued transactions. Accordingly, using "channels" of the decentralized network 104 improves the responsiveness (i.e. efficiency and speed) of processing a transaction. Conducting transactions "off-chain" using the decentralized network 104 also enables privacy to be improved, especially in the case of layering the decentralized network 104 on a public blockchain network, as the transaction is not publicly broadcasted.

Although each transaction executed over a channel of the decentralized network 104 may not be recorded to the blockchain 124, there is a limit on the amount (e.g., of funds) of each transaction, which, for example, can be based on a capacity of the channel. In one or more implementations, to open a channel between a pair of nodes on the decentralized network 104, a particular amount of funds is "staked" for each node of the channel via a one-time, "on-chain" transaction on the blockchain 124. Another on-chain transaction (on the blockchain 124) occurs between a pair of nodes that have established a channel with each other when that channel is closed.

The illustrated example includes on-chain transactions 136, which represent the transactions to open and close channels of the decentralized network 104, such that those opening and closing transactions are validated using validation mechanisms of the blockchain 124 and permanently recorded in the transaction data 134 of the blockchain 124. In one or more implementations, one or more connections (e.g., channels, bridges, etc.) are opened between the blockchain network 102 and the decentralized network 104 at intervals (e.g., regular or irregular) to communicate the on-chain transactions 136 between those networks.

As an example of "staking" funds to open a channel between nodes of the decentralized network 104, 3 Bitcoin may be committed to the node on one side of the channel (e.g., a first node), and 2 Bitcoin may be committed to the node on the other side of the channel (e.g., a second node)—via an on-chain transaction 136 validating and recording those amounts on the blockchain 124. The amount of funds "staked" for a channel governs how transactions flow across the channel, i.e., the channel's balance. Initially, for example, the first node of the example channel can transfer a maximum of 3 Bitcoin across the channel to the second node, and the second node can initially transfer a maximum of 2 Bitcoin across the channel to the first node. As payments are transferred, though, the balance changes on each side of the channel. For example, if the first node transfers 0.05 Bitcoin across the channel in connection with a first transaction, the first node is subsequently limited to transferring 2.95 Bitcoin across the channel, while the second node can transfer 2.05 Bitcoin across the channel.

As noted above, an individual node of the decentralized network 104 may not be directly connected to every other node of the decentralized network 104 via a channel, and direct connections are limited to pairs of nodes between which a channel has been established. In order for transactions to occur between two nodes of the decentralized network 104 that are not directly connected, the decentralized network 104 includes and utilizes intermediate "routing" nodes. Routing nodes of the decentralized network 104 enable payments to be transferred between two nodes without the two nodes forming a direct communication channel. Such transactions are routed between endpoints (e.g., an "origin" node and a "final" node) using established channels between one or more of those routing nodes along a path from endpoint to endpoint.

If a first user associated with the client device 106 wishes to make a payment to a second user associated with the client device 108 via a payment application, for example, the payment application can cause the payment to be routed from the first user to the second user over one or more routing nodes of the decentralized network 104. The first user pays costs to the routing nodes (e.g., a small cost to each routing node) for the privilege of using the routing nodes to route the payment from one endpoint (the origin node) of the transaction to another endpoint (the final node). Routing nodes can change their routing fees and/or other settings, but doing so may have an effect on the volume and/or number of transactions routed through the routing nodes. For example, increasing the routing fees for a routing node may decrease traffic as payments may be routed through other nodes with lower routing fees, whereas decreasing routing fees may increase the amount of traffic routed through the routing node.

Without the routing nodes, endpoints of a transaction would need to establish a direct connection in order to execute the transaction. However, establishing such a connection involves use of the validation and recording mechanisms of the blockchain 124, thus exposing the process of executing the transaction to the above-noted limitations of some established blockchain networks, e.g., daily transaction limits and high fees. Moreover, if the number of endpoints attempting to execute transactions by establishing direct connections grows (rather than using routing nodes of the decentralized network 104), then the risk of being affected by the limitations of the blockchain networks also increases. Due to higher use, for example, the gas fees programmatically charged to utilize the blockchain 124 may increase, exceeding the amount of a transaction in various cases (e.g., especially in the case of micropayments), and the latency of executing a transaction may increase, to name just a couple.

In accordance with the described techniques, the node 112 is configured to execute transactions with other nodes of the decentralized network 104 across established channels. For example, the node 112 is capable of serving as an endpoint (e.g., an origin node or final node) of a transaction and/or serving as a routing node of a different transaction to route the different transaction through to other nodes of the decentralized network 104.

In the illustrated example, for instance, the node 112 is depicted having a channel (e.g., a first channel) established with the node 116 and an additional channel established with the node 122 (e.g., a second channel). Based on this, a transaction may be routed between the node 116 and the node 122 as follows. A first transfer is executed over the channel between the node 116 and the node 112, and a second transfer is executed over the channel between the node 112 and the node 122. In other words, the transaction is "routed through" the node 112. In accordance with the described techniques, the node 112 may charge and thus collect a "routing fee" to use the node 112 to route the transaction. In one or more implementations, a routing fee may include one or more fees, such as a base fee (e.g., a fixed sum that is the same regardless of a size of the transaction) and/or a fee rate (e.g., a proportion of a payment that is forwarded). In one or more scenarios, rather than charge a fee, the node 112 may not charge a fee and/or may provide an incentive (e.g., a payment or other asset) to encourage transactions to be routed through the node 112.

Notably, the above-discussed path is just one example of routing a transaction through the node 112. It is to be appreciated that the decentralized network 104 is capable of executing transactions using various combinations of nodes, such that one or more of those transactions are routed through the node 112 and such that one or more other transactions are not routed through the node 112. Rather than routing a transaction between the node 116 and the node 122 through the node 112, for instance, a transaction may be routed over channels from the node 116 to the node 114, from the node 114 to the node 118, and from the node 118 to the node 122. As such, the reliability and robustness of the decentralized network 104 is improved by using the machine learning approach, such as to identify and avoid malicious nodes.

In addition to routing nodes, one or more "malicious nodes" may exist in the decentralized network 104. As noted above, there may be instances when a node either intentionally or unintentionally may not perform its prescribed function. Put differently, although the node is configured to perform a prescribed function, it may not perform its prescribed function for various reasons. In some such instances, a node may be considered a "malicious" node if it has proven, repeated behavior of not performing its prescribed function. For example, a malicious node may introduce security vulnerabilities to a transaction, e.g., a payment flow. As discussed below, however, the machine learning approach can identify malicious nodes and reduce their impact on the efficiency of transactions by performing actions which cause path-finding algorithms to avoid the malicious nodes, such as by forming new channels with non-malicious nodes, closing channels with malicious nodes, and selecting paths through the decentralized network that include only non-malicious nodes, thereby maintaining the integrity of the decentralized network 104.

It is to be appreciated that a path-finding algorithm may determine a path between endpoint nodes that does not utilize the node 112 to route a transaction for various reasons, such as due to capacities of channels of the node 112, speed of transactions across those channels, routing fees charged by the node 112, routing fees charged by other nodes in the neighborhood of the node 112 (e.g., other nodes with which the node 112 has established channels, nodes connected to those other nodes, nodes within a designated number of "hops" from the node 112, and so on), balance of the node 112 (e.g., an amount of cryptocurrency associated with the node 112), balance of other nodes in the neighborhood of the node 112, latency associated with routing a transaction through the node 112, security associated with routing a transaction through the node 112, and so on. Additionally or alternatively, the node 112 may be too many "hops" away from those endpoints (e.g., exceed a threshold number of "hops"), such that a transaction may be routed through more nodes to be routed through the node 112 than if routed along other paths.

Broadly, each node of the decentralized network 104 is a runtime implemented using processing, memory, and networking resources of the underlying computing devices that operate as the infrastructure of the decentralized network 104. Further, the nodes interact with other nodes of the decentralized network 104, the blockchain network 102, and those underlying processing, memory, and networking resources in a pre-determined and specified way, e.g., according to a protocol and framework of the decentralized network 104. In variations, the underlying computing resources that implement an individual node of the decentralized network 104 may be local to a particular computing device. However, in other variations the underlying computing resources may be distributed and/or virtualized.

In the illustrated example, the node 112 is depicted including node operator 138. The node operator 138 is configured to leverage the resources of the node 112's underlying one or more computing devices to implement the node 112 on behalf of those computing devices. The node operator 138 leverages the underlying resources of the node 112 to cause the node 112 to interact with the blockchain network 102 and with other nodes of the decentralized network 104 according to the protocol and framework specified for the decentralized network 104.

By way of example, the interactions include routing payments (and/or transactions involving transfer of other digital assets supported by the blockchain network 102) when the node 112 is along the path of a transaction. In addition to interacting with the decentralized network 104 and the blockchain network 102 according to the decentralized network 104's specified protocol, the node operator 138 is further configured to optimize routing within the decentralized network 104.

For example, the node operator 138 is configured to optimize routing within the decentralized network 104 for a performance metric, such as to increase a number or volume of transactions routed through the node 112, to maximize a return on investment for the node 112 (or for multiple nodes associated with a particular stakeholder), or to minimize a number or volume of transactions routed through one or more nodes of the decentralized network 104, to name just a few. In one variation, for instance, the node operator 138 optimizes routing within the decentralized network 104 to maximize the return (e.g., an amount collected from routing fees) on an investment (e.g., the amount of cryptocurrency staked and/or a cost of underlying hardware resources) associated with operating the node 112.

In cases where the decentralized network 104 includes one or more malicious nodes, those malicious nodes can reduce and/or nullify the efficiencies of handling transactions of blockchain-based digital assets on the decentralized network 104 rather than on the blockchain network 102. Malicious nodes may not propagate a transaction as it should be propagated or propagate the same legitimate transaction multiple times. In the implementations described herein, one or more model(s) 140 (e.g., machine learning models) can identify or infer invalid transactions (e.g. by comparing the transactions to previously verified or allowed transactions, by determining the rate at which the transactions are relayed to a receiving node, by adding frictional elements such as transaction fees for transactions over a particular risk threshold) and block the invalid transaction and remove the malicious node from determination of an optimal path through the decentralized network 104.

In the absence of the node operator 138 optimizing routing of the decentralized network 104 (e.g., though the node 112) in near-real time, the network traffic routed through the node 112 may be suboptimal, in some cases substantially ceasing across one or more channels of the node 112 but nevertheless tying up resources deployed to establish those channels, e.g., staked cryptocurrency, underlying hardware resources, and/or power to operate the hardware. By way of example, one or more channels of the node 112 may not have enough capacity to route various transactions, e.g., payments that exceed the capacity of those channels. Due to this, path-finding algorithms of nodes in the decentralized network 104 may determine paths that route transactions through neighboring nodes with more capacity rather than through the node 112. Alternatively or additionally, in a scenario where the routing fee for the node 112 is higher than routing fees of neighboring nodes, path-finding algorithms of nodes in the decentralized network 104 may determine paths that route transactions through those neighboring nodes rather than through the node 112. Alternatively or additionally, the channels of the node 112 may be balanced such that path-finding algorithms, which would determine to utilize a channel of the node 112 were the channel balanced differently, determine paths that are not routed through the node 112. In the context of a path-finding algorithm determining a path through the decentralized network 104 that does not route the transaction through the node 112, consider the following example of FIG. 2.

Figure 2:
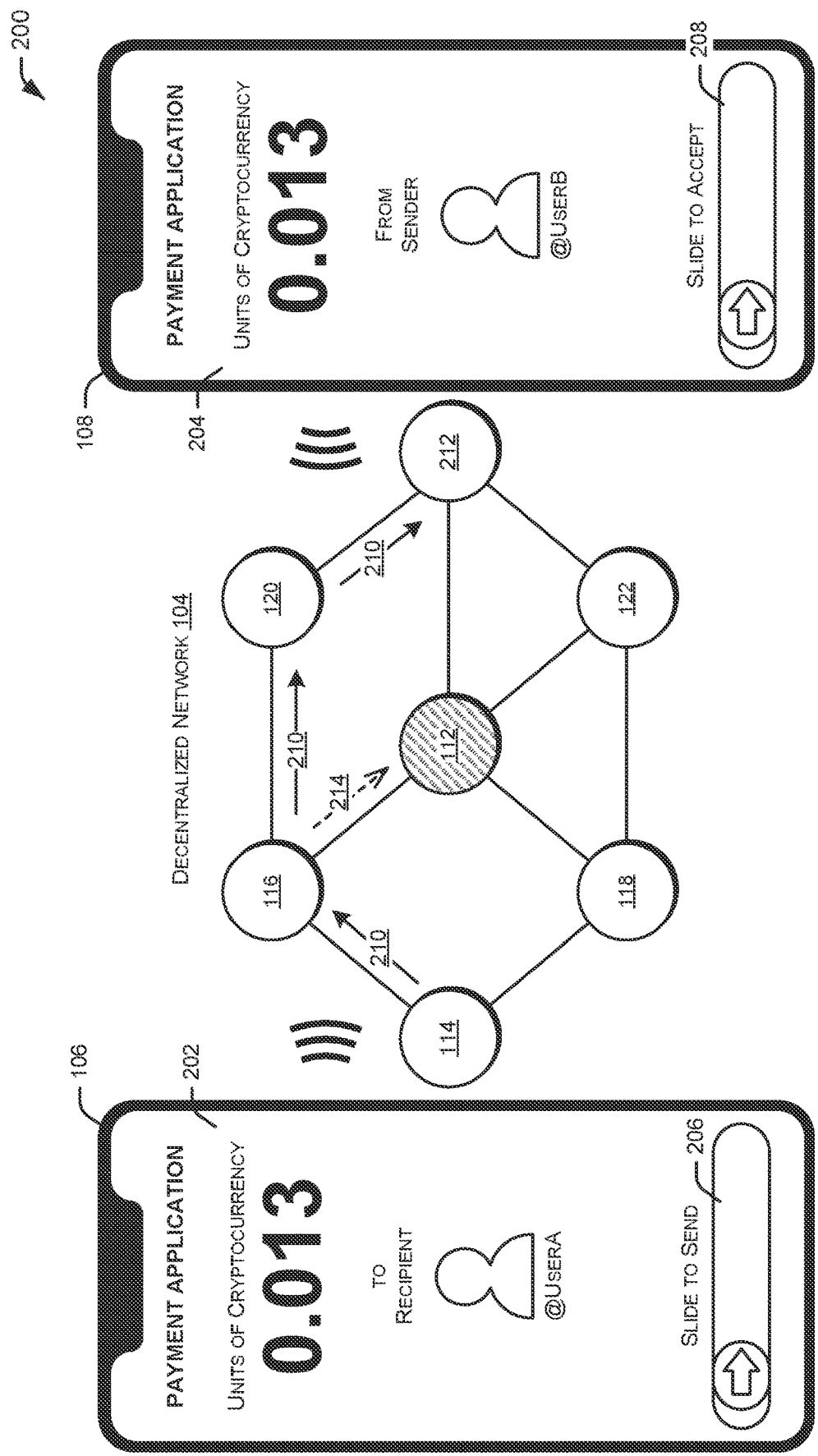
FIG. 2 is a block diagram of a non-limiting example of executing a transaction between endpoints using routing nodes of a decentralized network layered on top of a blockchain network, according to an embodiment described herein.

FIG. 2 is a block diagram of a non-limiting example 200 of executing a transaction between endpoints using routing nodes of a decentralized network layered on top of a blockchain network.

In particular, the illustrated example 200 depicts a scenario in which a user associated with the client device 106 sends a cryptocurrency payment over the decentralized network 104 to a user associated with the client device 108 via a payment application. Although the example 200 is depicted and discussed in relation to a cryptocurrency payment made via a payment application, it is to be appreciated that the described techniques enable different items to be transferred via various computer applications over a decentralized network layered on top of a blockchain network without departing from the spirit or scope of those techniques. As noted above and below, examples of those items include, but are not limited to, smart contracts, tokens (e.g., NFTs), and DRM mechanisms, to name just a few.

In one or more implementations, the example 200 may be initiated using QR codes (or other images or transaction codes). For example, the client device 108 may generate and/or display a QR code (or some other image or transaction code). In such an example, the client device 108 may correspond to a merchant (e.g., selling a good or service), an artist (e.g., initiating transfer of an image, music, video, NFT, or some other artwork), a business agent (e.g., initiating transfer of a smart contract), or another person or entity initiating a transaction, to name just a few. In some examples, the QR code (or other image or transaction code) can be generated by a service or service provider on behalf of a user, such as a merchant, an artist, a business agent, a sending or receiving user (e.g., in a peer-to-peer payment), etc. In some examples, the QR code (or other image or transaction code) can be generated in response to an invoice, a payment request, or the like. In some examples, the QR code (or other image or transaction code) can be encoded with data to enable selection of one or more currencies and/or networks for use with the payment.

In an example, a user of the client device 106 may then use the client device 106 to scan the QR code displayed by the client device 108. In such an example, the client device 106 may correspond to a customer and/or a user transferring one or more digital assets (e.g., a payment) to a user associated with the client device 108. In some examples, based on scanning the QR code, a transaction may be initiated over the decentralized network 104 (e.g., the Lightning Network) and can be routed according to techniques described herein. In some examples, such routing can take into account context data associated with the transaction such that routing can therefore optimize for a sender, recipient, or the transaction. In some examples, a service and/or service provider can assist with determining the optimal path. In one or more implementations, an application (not shown) of one or more of the client devices 106, 108 initiates the transaction on the decentralized network 104, which includes determining an optimal path across nodes (including routing nodes) of the decentralized network 104. In some examples, the service provider can modify one or more internal ledgers to record the transaction (e.g., withdrawn from a balance of the sending user and deposit to a balance of the receiving user). In some examples, if one or more conversions are warranted, the service provider can perform such conversions.

In the illustrated example 200, the client device 106 is depicted displaying user interface 202 and the client device 108 is depicted displaying user interface 204. The user interface 202 includes an indication that a user of the client device 106 sends a cryptocurrency payment (e.g., 0.013 units of a cryptocurrency such as Bitcoin) via a payment application to a user of the client device 108 (e.g., '@UserA'). The user interface 202 also includes a graphical control 206. In one or more implementations, the client device 106 receives user input (e.g., touch input) in relation to the displayed graphical control 206 to send a cryptocurrency payment. In variations, the client device 106 may receive user input in other ways to send a cryptocurrency payment or different digital asset, examples of which include voice commands, input to a physical control (e.g., a mechanical button on the client device 106), and so on.

The user interface 204 includes an indication that the user of the client device 108 receives the cryptocurrency payment (e.g., 0.013 units of the cryptocurrency) via the payment application from the user of the client device 106 (e.g., '@UserB'). In one or more implementations, the user interface 204 also includes a graphical control 208. The graphical control 208 enables a user of the client device 108 to provide input for performing one or more various actions in relation to the cryptocurrency payment (or different digital asset), examples of which include accepting the cryptocurrency payment, acknowledging receipt of the cryptocurrency payment, or dismissing the indication that the cryptocurrency payment was received, to name just a few.

The illustrated example 200 also depicts another example of the decentralized network 104 as well as a path 210 of the payment across the decentralized network 104. In this example 200, the client device 106 and the client device 108 are endpoints of the transaction, e.g., the cryptocurrency payment. The client device 106 is an origin endpoint of the transaction and the client device 108 is a final endpoint of the transaction. In one variation of the continuing example, the client device 106 and the client device 108 are nodes associated with the decentralized network 104, but they are not routing nodes. In accordance with the described techniques, the client device 106 and the client device 108 are communicatively connected to the decentralized network 104, such that routing nodes of the decentralized network 104 can be used to route the transaction from the client device 106 to the client device 108. As noted above, assuming for the sake of example that the client device 106 and the client device 108 do not have a direct connection, without the routing nodes, the client device 106 and the client device 108 would establish a direct connection to execute the transaction, which involves on-chain transactions 136 to the blockchain 124 and thus is subject to drawbacks of blockchain networks.

In this example 200, the client device 106 is connected to the node 114 (e.g., via the payment application, directly via a channel (not shown), and/or indirectly via more than one channel and routing nodes (not shown)), and the client device 108 is connected to node 212 (e.g., via the payment application, directly via a channel (not shown), and/or indirectly via more than one channel and routing nodes (not shown)). Further, the cryptocurrency payment is routed through the decentralized network 104 along the path 210 through the node 114 over a channel to the node 116, through the node 116 over a channel to the node 120, and through the node 120 over a channel to the node 212.

Notably, though, the path 210 does not route the cryptocurrency payment through the node 112. The example 200 depicts an option 214 to route the cryptocurrency through the node 112. This represents that there are channels available to route the transaction from the node 116, through the node 112, and to the node 212. In this example 200, however, one or more path-finding algorithms that determine the path 210, do not select the option 214 to route the payment through the node 112, e.g., from the node 116 over a channel to the node 112 and then through the node 112 over a channel to the node 212 (and then to the client device 108). As noted above, path-finding algorithms may determine and output paths that are not routed through a node (or that avoid a particular node) based on various factors.

To cause path-finding algorithms to determine and output paths that route transactions through the node 112 (and prevent those algorithms from avoiding the node 112), the node operator 138 is configured to optimize routing through the decentralized network 104. In an example, the node operator 138 does so based, at least in part, on one or more objectives of the optimization, e.g., performance metrics to optimize.

Returning to the discussion of example environment 100, the node operator 138 includes or otherwise has access to model(s) 140, in accordance with the described techniques.

The model(s) 140 are trained using machine learning and based on state data 142, which is obtained from the decentralized network 104. As discussed in more detail below, the state data 142 describes various aspects of the decentralized network 104, including aspects of the nodes and changes to the channels due to transactions executed using the channels.

The state data 142 includes "historical" state data along with other state data, e.g., current state data and/or predicted state data. As used herein, "historical state data" refers to the state data 142 that is collected for one or more time periods that precede a particular point in time. For example, the state data 142 that is collected prior to a time at which the model(s) 140 are trained may be "historical" state data in one or more variations. In at least one implementation, the historical state data is used to train the model(s) 140. The other state data 142 (e.g., current state data) may be used as input to the trained model(s) 140, along with test settings, for the model(s) 140 to generate predictions of network traffic over any interval of time, e.g., a next 30 minutes, a next hour, a next 12 hours, a next day, a historical time period for which traffic data was not recorded, etc.

The node 112 also includes settings 144 which control routing over the decentralized network 104 using the node 112. In accordance with the described techniques, the node operator 138 is configured to perform one or more actions dynamically to optimize routing within the decentralized network 104, such as by adjusting the settings 144. As used herein, the phrase "dynamically" optimizing the routing refers to doing so "intelligently" and "automatically." As used herein, the term "intelligently" refers to using one or more models trained with one or more machine learning techniques. As used herein, the term "automatically" refers to performing one or more optimizations without user input, such as without receiving a user input specifying to perform an optimization or without receiving a user input to adjust a configuration of a routing node. By performing these actions intelligently and automatically, the node operator 138 can optimize a state of the node 112 in real time or near-real time as state data 142 describing changes in the decentralized network 104 is received, e.g., as other nodes change their routing fees, open new channels, close existing channels, circularly rebalance their channels, and so forth. Due to this, the node operator 138 reduces idle time of open channels and their underlying computing resources and also reduces a number of processing cycles which are used to change routing node settings. Due to the intelligent and automatic adjustments, the node operator 138 can also take advantage of the changed network conditions before the operators of other nodes take action.

By way of example, and not limitation, the actions performed by the node operator 138 to optimize such routing include, but are not limited to, adjusting routing fees of the node 112, opening one or more channels with other nodes of the decentralized network 104, closing one or more open channels established with other nodes of the decentralized network, specifying how much cryptocurrency is "staked" for each channel, and performing a circular rebalancing for a channel, to name just a few. By adjusting the settings 144 dynamically, the node operator 138 can cause path-finding algorithms to determine paths which route transactions through the node 112, such as in scenarios where those path-finding algorithms would have determined different paths which do not route the transactions through the node 112 without the adjustments. Alternatively or in addition, the node operator 138 can cause path-finding algorithms to determine paths which route particular types of transactions through the node 112, such as "large" transactions over a threshold amount since doing so may provide a better return (in terms of routing fees) than routing many smaller transactions.

In the context of FIG. 2, the node operator 138 can train the model(s) 140 based on the state data 142 (e.g., historical state data), and then dynamically adjust the settings 144 of the node 112 based on the trained model(s) 140 to optimize routing through the decentralized network 104, so that, rather than determining the path 210, the path-finding algorithm determines a different path (not shown) that routes the transaction (e.g., the cryptocurrency payment) from the client device 106 to the client device 108 through the node 112. As such, using machine learning in this way optimizes the distribution of network traffic, i.e. transactions, across the channels, thereby optimizing load distribution in the decentralized network 104.

Figure 3:
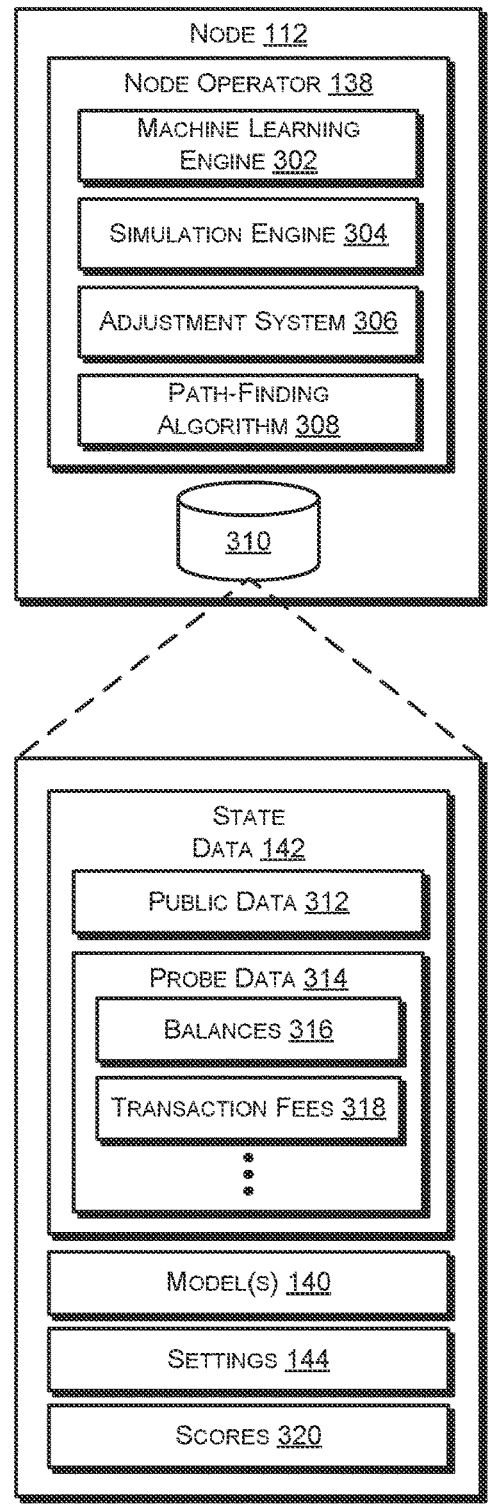
FIG. 3 is a block diagram of a non-limiting example of a node having a node operator that optimizes routing within the decentralized network, according to an embodiment described herein.

FIG. 3 is a block diagram of a non-limiting example 300 of a node having a node operator that optimizes routing within the decentralized network.

In this example 300, the node 112 includes the node operator 138, and the node operator 138 is depicted having machine learning engine 302, simulation engine 304, adjustment system 306, and path-finding algorithm 308. The node 112 is also depicted having storage 310, which represents storage of the underlying computing devices that is allocated to the node 112 for operation using the hardware resources of those computing devices. It is to be appreciated that in various implementations the node 112 may include more, fewer, or different components than discussed herein without departing from the spirit or scope of the described techniques.

The storage 310 is depicted storing the state data 142. In this example 300, the state data 142 includes public data 312 and probe data 314. However, the state data 142 may include additional and/or different data in one or more variations. In accordance with the described techniques, at least some of the state data 142 corresponds to historical state data. The probe data 314 is depicted including data describing balances 316 (of channels between nodes of the decentralized network 104) and transaction fees 318 (of nodes of the decentralized network 104). The probe data 314 is illustrated with ellipses to indicate that it may include more and/or different data without departing from the described techniques. Broadly, the probe data 314 may be collected by sending "probes" (e.g., test payments or other communications) over the decentralized network 104 via one or more determined paths and recording behaviors of the routing nodes along the paths in relation to the probes. The notion of probing the network is discussed in more detail below in relation to FIGS. 4-7.

The storage 310 is also depicted storing the one or more model(s) 140, the settings 144, and scores 320. As discussed in more detail below, the scores 320 are indicative of how well a set of adjusted settings is predicted to optimize the flow of network traffic through the node 112 over numerous simulations generated by the simulation engine 304. In one or more implementations, for example, a higher score 320 indicates that a corresponding set of adjusted settings is predicted more likely to optimize one or more performance metrics during actual operation than a different set of adjusted settings which corresponds to a lower score 320. In different implementations, however, a lower score 320 may indicate that a corresponding set of adjusted settings is predicted to be more likely to optimize the one or more performance metrics during actual operation than a different set of adjusted settings which corresponds to a higher score 320.

In accordance with the described techniques, the node operator 138 obtains the state data 142, which the machine learning engine 302 uses to train the model(s) 140 and/or which the simulation engine 304 uses to run simulations of network traffic flow over the decentralized network 104 for a period time (e.g., a day). In at least one variation, the node operator 138 obtains the public data 312 by utilizing a messaging protocol of the decentralized network 104. This includes configuring and generating messages according to the protocol and then "querying" the decentralized network 104 (and/or other public data sources) by sending those messages over the network. The data requested via the messages (e.g., via the queries) is then returned to the node 112 via one or more responses.

In an example where the decentralized network 104 is the Lightning Network, for instance, the messaging protocol (and the node 112) may be implemented through a daemon, such as the Lightning Network Daemon. The Lightning Network Daemon defines commands that can be issued by nodes of the decentralized network 104 to obtain public data 312, at least one example of which is the 'lncli describegraph' command, which requests and obtains data (e.g., a JSON) indicative of a topology of the decentralized network 104 (or at least a portion of it) from the perspective of the node that issued the command (e.g., the node 112).

In one or more variations, the node operator 138 utilizes the messaging protocol (e.g., issues commands) to obtain any of a variety of data that is made publicly available in accordance with the protocol implementing the decentralized network 104. By way of example, the node operator 138 can continuously query the decentralized network 104 for changes in publicly announced data, which can include, for instance, data describing creation of new channels, updates in fee policies, implementation of new nodes, information about a peer's alias, features supported by a peer, how to reach the peer, how a channel can be verified on the blockchain 124, fees charged, and so on. In one or more implementations, nodes of the decentralized network 104 announce themselves and their public channels to the decentralized network 104 using a peer-to-peer network. The node operator 138 is thus configured to use this network to assemble a graph of the decentralized network 104, which is used to calculate routes for transactions (e.g., by the pathfinding algorithm 308).

In contrast to the public data 312, the node operator 138 generates the probe data 314 by computing statistics and/or estimations based on data obtained by querying the decentralized network 104 and/or one or more of its nodes or by sending other types of communications over the decentralized network 104. In one or more variations, the node operator 138 computes one or more of the statistics and/or estimations based on data obtained at different times. In accordance with the described techniques, the node operator 138 obtains the data used to compute the statistics and/or estimations (e.g., the probe data 314) by "probing" the decentralized network 104.

Figure 4:
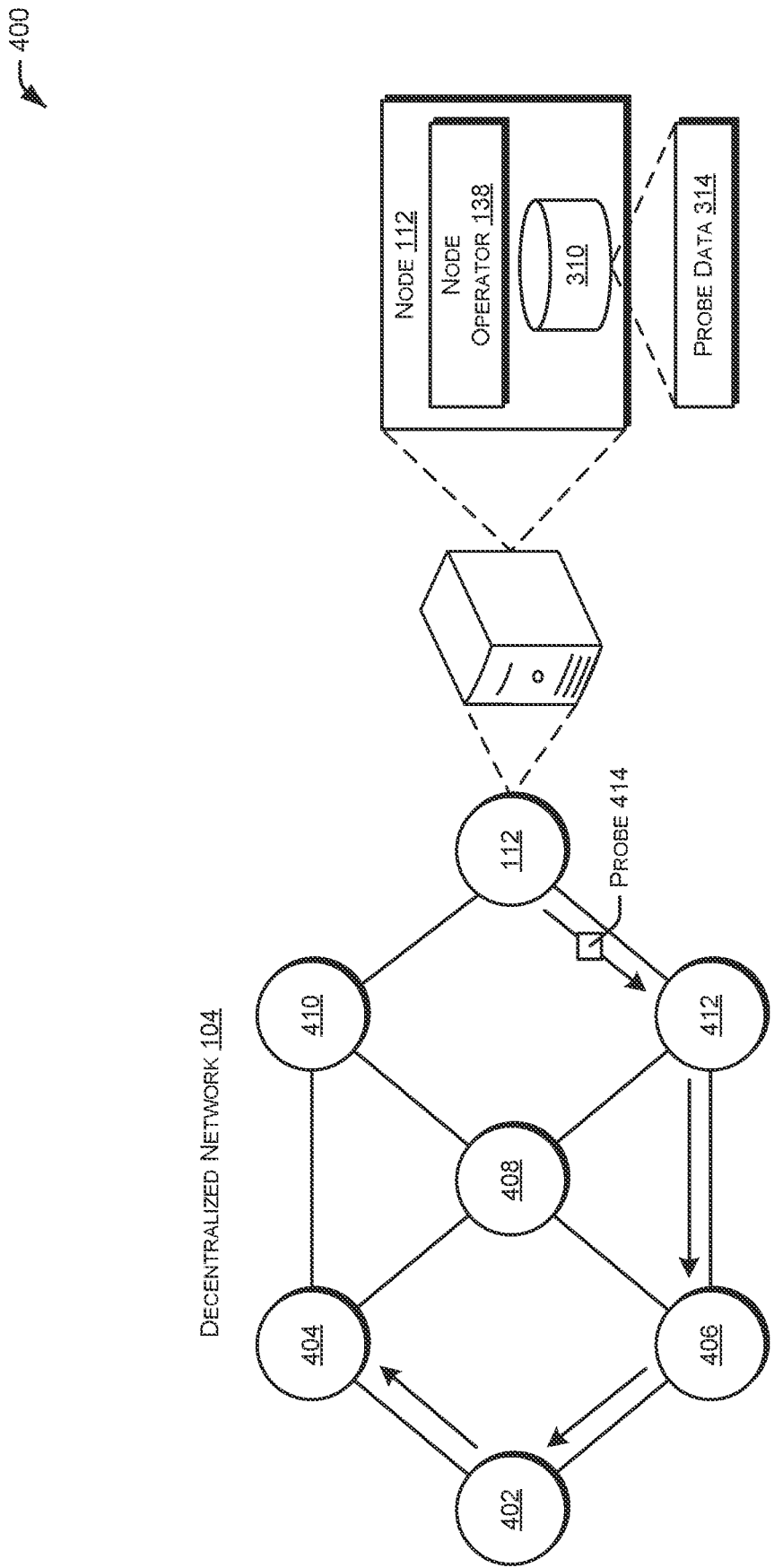
FIG. 4 is a block diagram of a non-limiting example of sending a communication across a decentralized network to obtain data for generating information about the decentralized network, according to an embodiment described herein.

FIG. 4 is a block diagram of a non-limiting example 400 of sending a communication across a decentralized network to obtain data for generating information about the decentralized network.

The illustrated example 400 depicts the node 112 of the decentralized network 104 along with additional nodes 402, 404, 406, 408, 410, 412 of the decentralized network 104. The node 112 includes the node operator 138 and the storage 310, which is depicted storing the probe data 314—one example of the state data 142, e.g., historical state data.

The illustrated example 400 also depicts probe 414. In one or more implementations, the node operator 138 sends one or more probes across the decentralized network 104 to obtain data describing aspects of various nodes in the network and their channels, such as data describing aspects of nodes and/or channels over which a probe is communicated. Based on the data obtained from the probes, the node operator 138 generates the probe data 314, which includes, for example, statistics and/or estimations about one or more portions of the decentralized network 104.

In variations, the node operator 138 causes a probe 414 to be sent to one or more nodes along a path. The node operator 138 is further configured to cause multiple probes to be sent along a path, e.g., at different times. The node operator 138 is also configured to cause probes to be sent along different paths. In this way, the node operator 138 collects data about multiple nodes and multiple paths through the decentralized network 104.

In this example 400, the probe 414 is depicted being sent along a path that originates at the node 112 and terminates at the node 404. In particular, the probe 414 is depicted being communicated over a first channel from the node 112 to the node 412, over a second channel from the node 412 to the node 406, over a third channel from the node 406 to the node 402, and over a fourth channel from the node 402 to the node 404. In other words, the probe 414 makes four "hops" to reach the node 404. Different probes and transactions can traverse paths of different lengths (e.g., having more or fewer "hops"), in accordance with the described techniques.

Here, the node operator 138 obtains data about the nodes 412, 406, 402, 404 and also about the second channel, the third channel, and the fourth channel based on the probe 414. Notably, the node operator 138 already has access to data describing the node 112 because the node 112 corresponds to one side of the first channel—data describing non-public aspects of the node 112 and its channels is available locally to components of the node 112 and its underlying computing devices. As discussed in more detail below, the node operator 138 can send one or more additional probes along a same path as the probe 414, and generate statistics and estimations based on differences between the data obtained in connection with the probe 414 and the one or more additional probes. It is to be appreciated that the illustrated topography of the decentralized network 104 and the illustrated path are merely examples, and the node operator 138 is operable to probe decentralized networks having different topologies and along different paths without departing from the spirit or scope of the described techniques.

In order for the model(s) 140 to predict flow of network traffic (e.g., payment flow) across the channels of the decentralized network 104, the model(s) 140 are trained using data describing historical flow of network traffic (e.g., historical payment flow) across the channels. In at least one implementation, a probe 414 is a payment which may not be able to settle. This is because the payment hash corresponding to the probe 414, which is generated by sender (e.g., the node operator 138), is not known by the recipient (e.g., the node 404 in the illustrated example 400). In other words, in such implementations a probe 414 is a test payment. In at least one example, the node operator 138 sends a probe along a route to determine if there are sufficient balances on channels along the route to execute a payment of an amount indicated in the probe.

By deploying a succession of probes, the node operator 138 is capable of determining a balance of a specific channel, such as within a threshold amount, e.g., 10 satoshi. In one or more implementations, the node operator 138 deploys probes according to a pattern or algorithm, such as binary search. By sending a succession of probes according to the pattern, the node operator 138 can determine an amount of payment (e.g., a maximum amount) that can successfully pass through a particular channel. The process of inferring determinable channel balances along a given route is referred to as a "balance search."

In connection with the binary search example, for instance, the node operator 138 sends a first probe for a first amount. If an amount indicated by a probe is able to pass through a channel, then the amount is less than the maximum payment supported by the channel. When the first amount does pass through, the node operator 138 can send a probe for a second amount that is higher than the first amount to determine if the second amount is also supported. The node operator 138 can continue this process until the amount does not pass through a channel. If the amount indicated by a probe is not able to pass through a channel, then the amount is more than the maximum payment supported by the channel. When the amount indicated by a probe does not pass through a channel, the node operator 138 can send a next probe for an amount that is less than the amount that was not able to pass through the channel.

To demonstrate, consider an example in which the node operator 138 sends a first probe corresponding to 0.05 Bitcoin and in which the first probe passes through a channel. This indicates that the channel's maximum payment amount is greater than 0.05 Bitcoin. Continuing with this example, consider that the node operator 138 subsequently sends a second probe corresponding to 0.1 Bitcoin (twice as much as the first probe) and in which the second probe does not pass through the channel. Based on this information, the node operator 138 determines that the maximum payment on the channel is less than 0.1 Bitcoin, but greater than 0.05 Bitcoin.

Subsequent to the second probe, the node operator 138 can send a third probe along the channel, where the third probe corresponds to 0.075 Bitcoin (between 0.05 and 0.1 Bitcoin). If the third probe passes through the channel, the node operator 138 determines that the maximum payment on the channel is between 0.075 and 0.1 Bitcoin, whereas if the third probe does not pass through the channel, the node operator 138 determines that the maximum payment on the channel is between 0.05 and 0.075 Bitcoin. The node operator 138 can send a fourth probe for an amount between 0.075 and 0.1 when the third probe does pass or for an amount between 0.05 and 0.075 when the probe does not pass. In one or more implementations, the node operator 138 continues sending probes until a threshold is reached, such as a threshold number of probes or until a next probe would be within a threshold of an amount able to pass across a channel.

In one or more implementations, the node operator 138 determines a bound (e.g., a lower bound) on a flow of network traffic based on the inferred channel balances. By way of example, the node operator 138 determines a lower bound by performing two balance searches on a given route at a first time and at a second time (that is subsequent to the first time). This particular technique determines the lower bound on the flow of network traffic because in one or more scenarios a bi-directional flow of network traffic may have occurred across the channel between the first time and the second time. However, by simply using the balances of channels, the node operator 138 does not account for bi-directional flows, such that an amount of network traffic determined by the node operator 138 as flowing over a channel between a first time and a second time does not include any bi-directional flow amounts. This process may be referred to as a "flow check."

In order to more accurately predict a flow of network traffic over a period of time, techniques described herein utilize the historical state data to train the model(s) 140. The more accurate the historical state data, the more accurate the resulting predictions. However, flow checks that are limited to indicating a lower bound of network traffic across a channel may miss a substantial amount of the network traffic when there is a significant amount of time between the flow checks. In at least one variation, the node operator 138 can regulate intervals between flow checks in an effort to ensure that the lower bound on the flow of network traffic does not differ too substantially (e.g., more than 10,000 satoshi) from the actual flow by regulating an interval of time between flow checks. To do so, for instance, the node operator 138 regulates the interval between flow checks, so that some portion of the flow checks indicate (absolutely) zero flow, which further indicates with high probability that no flow occurred over the channel. The portion of flow checks indicating zero flow (e.g., a percentage or fraction of the flow checks) is a quantity that can be tuned to increase or decrease an amount of error in the lower bound. To decrease the amount of error, in one or more implementations, the node operator 138 sends probes to perform flow checks more frequently. As the frequency of flow checks increases, the node operator 138 determines that there is zero flow more frequently. As further examples of probing, consider the following discussion of FIGS. 5-7.

Figure 5:
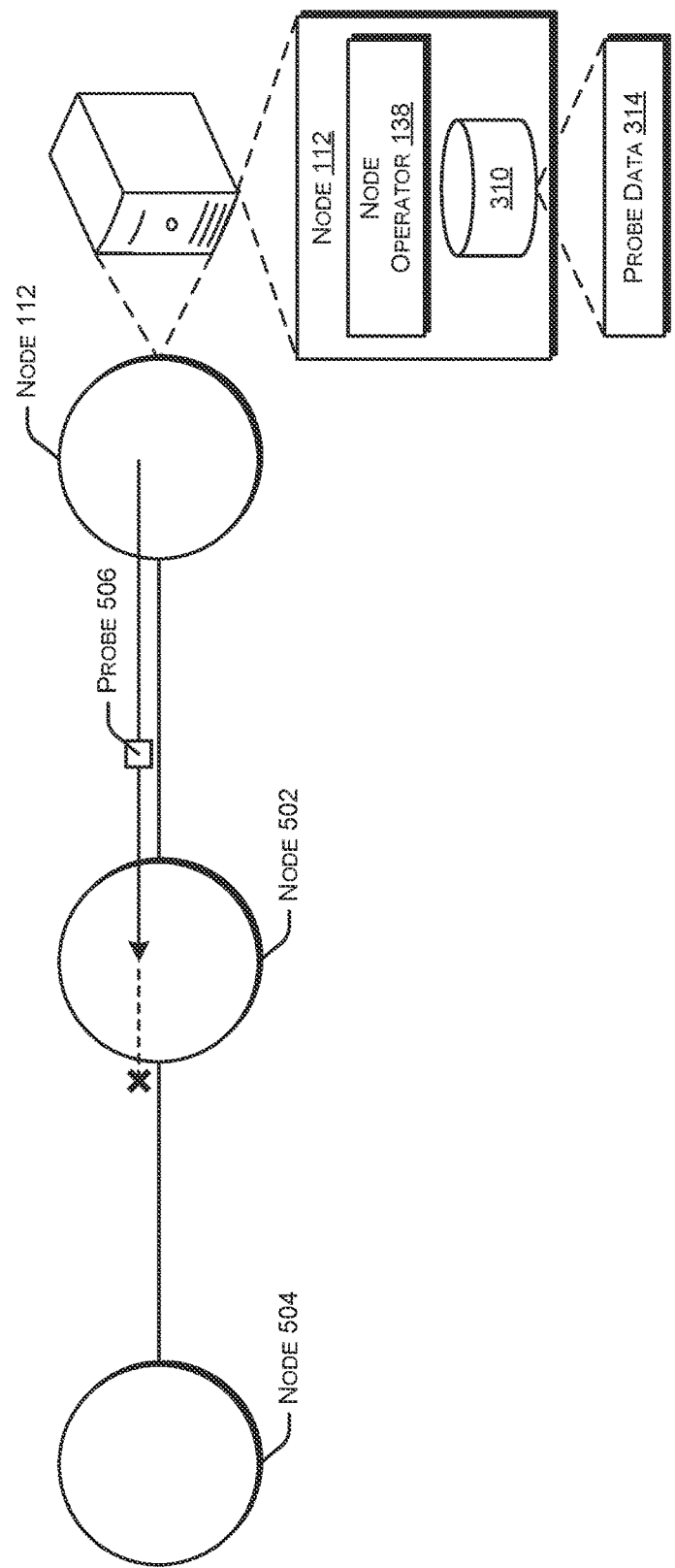
FIG. 5 is a block diagram of a non-limiting example of sending a first communication of successive communications across a decentralized network to obtain data for generating information about the decentralized network, according to an embodiment described herein.

FIG. 5 is a block diagram of a non-limiting example 500 of sending a first communication of successive communications across a decentralized network to obtain data for generating information about the decentralized network.

Figure 6:
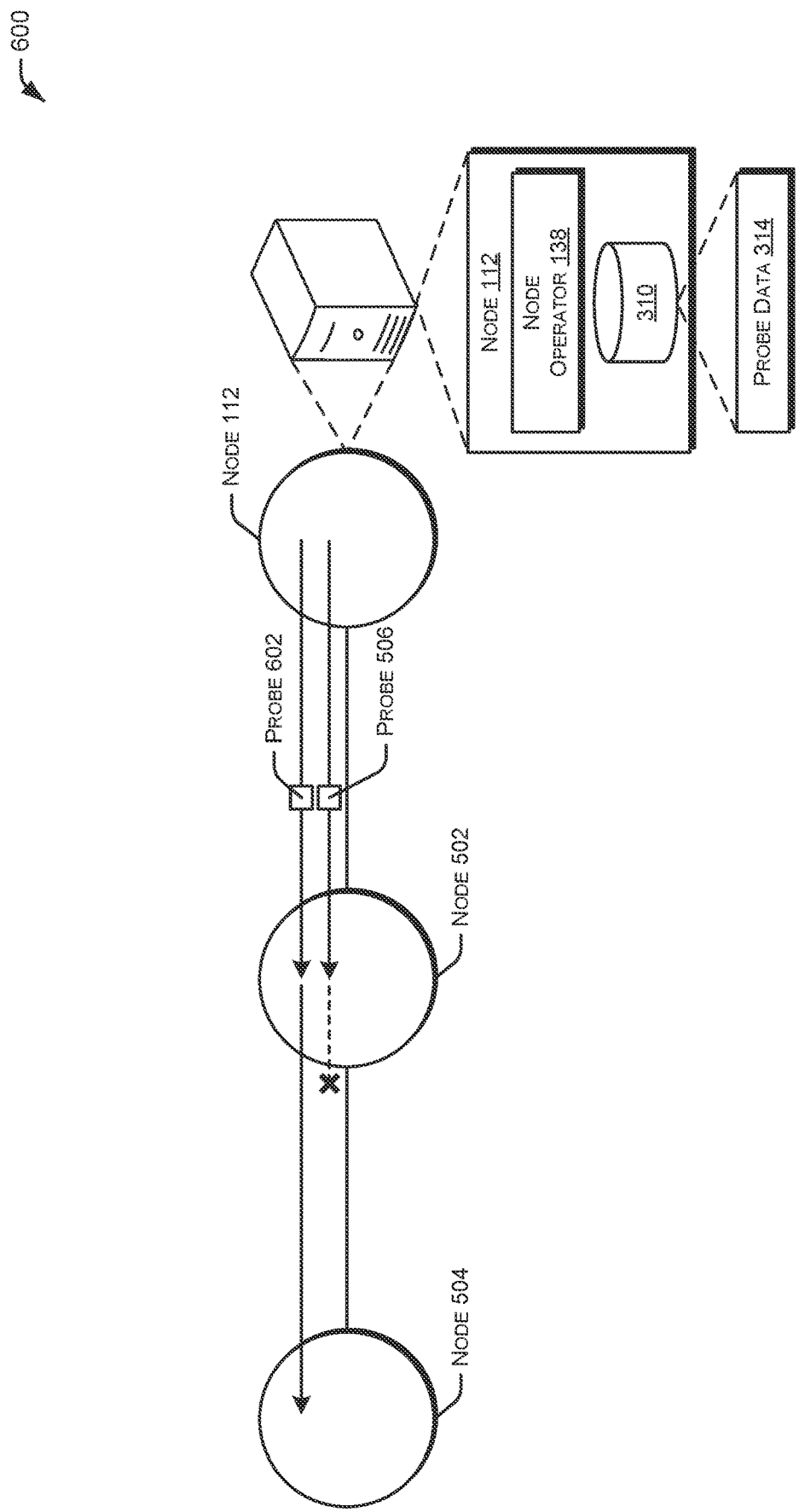
FIG. 6 is a block diagram of a non-limiting example of sending a second communication of the successive communications across a decentralized network to obtain data for generating information about the decentralized network, according to an embodiment described herein.
Figure 7:
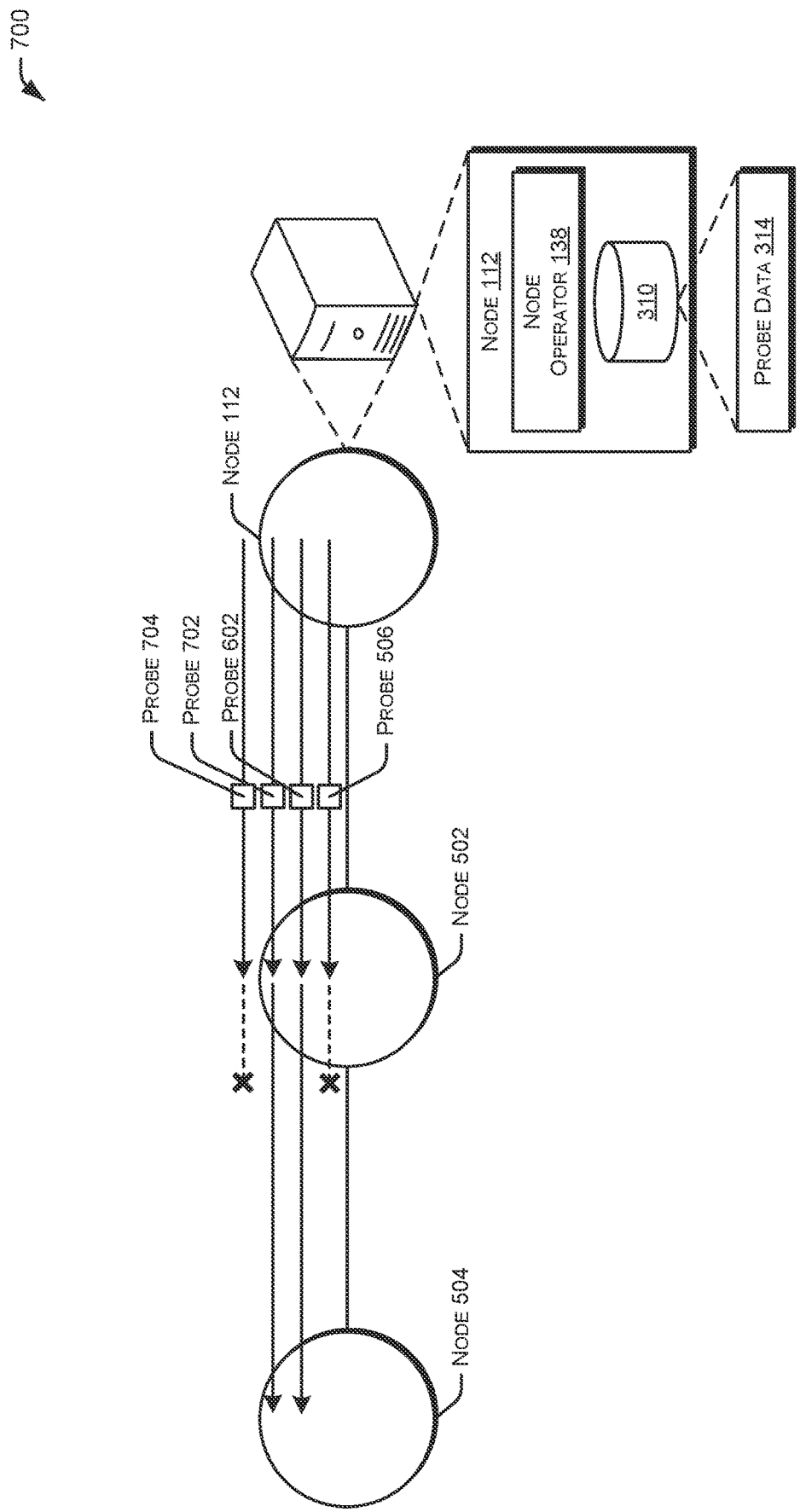
FIG. 7 is a block diagram of a non-limiting example of sending a third and fourth communication of the successive communications across a decentralized network to obtain data for generating information about the decentralized network, according to an embodiment described herein.

The illustrated example 500 includes the node 112 of the decentralized network 104 and also includes node 502 and node 504. The illustrated examples of FIGS. 5-7 depict a series of successive probes sent by the node operator 138 over a path from the node 112 to the node 502 and then to the node 504. In accordance with the discussion above, the node operator 138 sends such probes, for instance, to determine a balance of the channel between node 502 and the node 504, and also to determine a flow of network traffic across that channel.

This example 500 includes probe 506, which is depicted being sent from node 112 to the node 502 over a channel established between those nodes. The probe 506 is illustrated passing across that channel to the node 502, representing that the balance of the channel is sufficient to execute a payment amount corresponding to the probe 506. In contrast, the probe 506 is depicted with a dashed line extending from the node 502 toward the node 504 and an 'X'. This represents that the payment amount corresponding to the probe 506 is not able to pass across the channel between the node 502 and the node 504, and therefore that the balance of the channel between the node 502 and the node 504 is insufficient to execute the payment amount corresponding to the probe 506. As noted in the discussion above, when attempting to determine a balance of a channel and a payment amount does not pass across a channel, the node operator 138 causes a subsequent probe to be sent which corresponds to a reduced amount, e.g., half of the previous probe's amount. Relative to the examples depicted in FIGS. 6 and 7, the node operator sends the probe 506 at a first time.

FIG. 6 is a block diagram of a non-limiting example 600 of sending a second communication of the successive communications across a decentralized network to obtain data for generating information about the decentralized network.

The illustrated example 600 includes the node 112 of the decentralized network 104 as well as the node 502 and the node 504. This example 600 includes the probe 506 and probe 602. In contrast to the probe 506, the probe 602 is depicted being sent from the node 112 to the node 502 over the channel between those nodes and being forwarded from the node 502 to the node 504 over the channel between those nodes. This represents that the balance of the channel between the node 112 and the node 502 (e.g., a first channel of the path) is sufficient to execute a payment for an amount corresponding to the probe 602, and also that the balance of the channel between the node 502 and the node 504 (e.g., a second channel of the path) is sufficient to execute a payment for the amount corresponding to the probe 602.

In this example 600 it is assumed that the node operator 138 configures the probe 602 to correspond to a payment for a lesser amount than the probe 506. Since the probe 602 successfully passes across the channel from the node 502 to the node 504, the node operator 138 determines that the balance of the channel is greater than the amount of the probe 602 and less than the amount of the probe 506. For the sake of simplicity, and because the binary search technique for determining the maximum amount of a payment supported by a channel is discussed in more detail above, it is assumed that with the probe 602, the node operator 138 determines an amount for the balance of the channel, e.g., that is within a threshold of the actual balance based on the amounts of the probe 506 and the probe 602. In the continuing example, the node operator 138 deploys the probe 602 at a second time, which is subsequent to the first time when the node operator 138 deploys the probe 506. By way of example, the node operator 138 deploys the probe 506 and the probe 602 in connection with performing a balance search.

FIG. 7 is a block diagram of a non-limiting example 700 of sending a third and fourth communication of the successive communications across a decentralized network to obtain data for generating information about the decentralized network.

The illustrated example 700 also includes the node 112, the node 502, and the node 504 of the decentralized network 104. In addition to the probe 506 and the probe 602, this example 700 includes probe 702 and probe 704. Like the probe 602, the probe 702 is depicted being sent from the node 112 to the node 502 over the channel between those nodes, and is also depicted being forwarded from the node 502 to the node 504 over the channel between those nodes. Like the probe 506, the probe 704 is depicted passing across that channel to the node 502, but is not able to pass across the channel between the node 502 and the node 504. This represents that the balance of the channel between the node 502 and the node 504 is insufficient to execute the payment amount corresponding to the probe 704. Although more probes may be deployed by the node operator 138 in operation for a balance search, the inclusion of the probe 702 and the probe 704 in the illustrated example represent a second balance search. In accordance with the described techniques, the node operator 138 deploys the probe 702 and the probe 704 at an interval of time after the balance search represented by the probe 506 and the probe 602 is performed, such that the probe 702 and the probe 704 are deployed at a third and fourth time respectively. The fourth time being subsequent to the third time.

By performing two balance searches along the path from the node 112 to the node 502 and to the node 504 separated by the above-noted interval, the node operator 138 determines a lower bound on a flow of network traffic through the channel between the node 502 and the node 504. In other words, the node operator 138 performs a flow check on the channel between the node 502 and the node 504.

In one or more scenarios, the node operator 138 deploys probes using a 2-hop neighbors approach, in which each probe sent by the node operator 138 corresponds to a two-hop payment. Assuming, for example, that the node 112 has k channel partners, and each channel partner has n channels, the node operator 138 probes a set of (k×n) channels. One advantage of this approach is that the node operator 138 avoids resolving balances along a route that are insufficient to enable the probe, which is not guaranteed for probes that are routed to three or more nodes (from the origin node). However, the 2-hop neighbors approach has may be limited by an amount of data that is gathered by the node operator 138, per probe, relative to probes that traverse longer routes, e.g., routes involving three or more hops.

Alternatively or additionally, the node operator 138 deploys probes using a 3-or-more hop probing approach. In one or more variations, the node operator 138 maintains a list of channels for which it sends probes to obtain probe data, and thus perform balance searches and flow checks. The node operator 138 is configured to update the list so that it includes different channels, such as when a new channel is opened, when an opened channel is closed, and/or when commands issued over the decentralized network 104 extend the node operator 138's graph of the network.

For each of the channels, the node operator 138 deploys a series of probes to perform flow checks (e.g., two balance searches each) at a target interval of time. If a deployed probe fails to resolve a balance of a target channel because a preceding channel along the route has an insufficient balance, then the node operator 138 deploys an additional probe over a different route in an attempt to resolve the balance of the target channel. In variations, the node operator 138 continues sending additional probes when preceding probes fail to resolve a balance of a particular channel. The node operator 138 sends these additional probes until the balance of the particular channel is determined, up to a maximum number of additional probes.

If channels that are the targets of the probing correspond to a set of target nodes, then the node operator 138 can ensure that those channels are probed using the 2-hop neighbors approach (rather than 3-or-more hop probing) by opening channels from the node 112 to each of the target nodes (in scenarios where channels are not yet opened to the target nodes).

Alternatively or in addition, the node operator 138 selects a node of the decentralized network 104 to serve as a "bridge" to the target node. In one or more implementations, the node operator 138 selects a bridge node based on it having an open channel with a target node and based on the balance of the channel. For example, the node operator 138 selects the bridge node based on the channel with the target node having a balance that is suitable to handle probes for at least a threshold number of channels of the target node. In other words, the node operator 138 selects the target node based, in part, on the balance of the channel satisfying (e.g., exceeding) a lower threshold amount.

In one or more implementations, the node operator 138 also selects the bridge node based on the balance of the channel with the target node being less than an upper threshold amount. This is because in various scenarios, channels having balances above the upper threshold amount may charge relatively higher fees for transactions than channels with balances below the upper threshold. When the node operator 138 selects a bridge node, the node operator 138 uses the channel with the suitable balance (satisfying one or more of the lower and upper threshold amounts) as a second hop, e.g., as a bridge to the target node.

In at least one implementation, the node operator 138 identifies a plurality of nodes that share channels, having suitable balances, with multiple target nodes. To identify the nodes that share such channels with the target nodes, for instance, the node operator 138 generates a list of nodes having channels with suitable balances to target nodes and orders the nodes within the list based on a number of suitably balanced channels with the target nodes. The node operator 138 opens channels with one or more of the nodes on the list, for example, based at least in part on the order, e.g., the node operator 138 opens a channel with a node having a highest number of suitably balanced channels with target nodes, then opens a channel with a node having the second highest number of suitably balanced channels with target nodes, and so forth.

By deploying the probes in the various manners discussed above, the node operator 138 obtains data about the channels and nodes located along different paths across the decentralized network 104 over time. Further, the node operator 138 processes this data to compute, for example, the balances 316 of the channels and the transaction fees 318, along with other statistics such as flows of network traffic across a channel over time (or a lower bound). The node operator 138 uses this data (e.g., the probe data 314) along with the public data 312 to train the model(s) 140 to predict flows of traffic over various channels of the decentralized network 104.

In one or more implementations, the node operator 138 deploys probes to obtain data about different settings and/or determine different characteristics of nodes (routing or otherwise) of the decentralized network 104, e.g., different from data about flows of network traffic and channel balances. For example, the node operator 138 may deploy a series of probes to obtain information associated with security of transactions over one or more channels, speed or changes in speed of transactions over one or more channels, latency of transactions over one or more channels, measures indicative of malicious nodes encountered by transactions along a path to a channel and/or a node, numbers of hops to reach a particular node from a source node at different times, changes in amount of computing resources leveraged to complete transactions at different times, and so forth. In the context of training the model(s) 140 based on historical state data 142 using machine learning, consider the following example.

Figure 8:
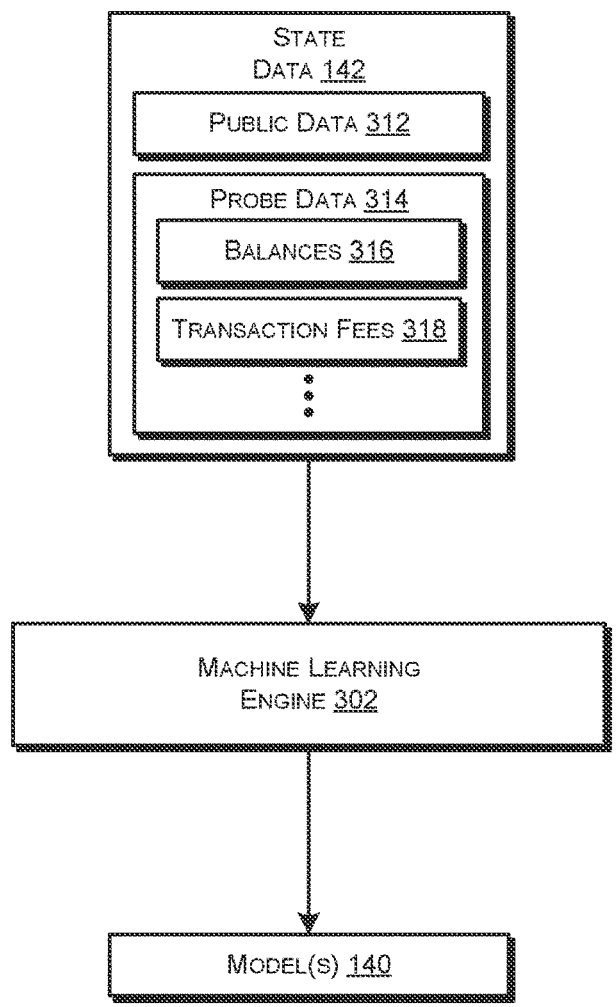
FIG. 8 is a block diagram of a non-limiting example of using machine learning to train models to predict flows of network traffic on a decentralized network layered on a blockchain network, according to an embodiment described herein.

FIG. 8 is a block diagram of a non-limiting example 800 of using machine learning to train models to predict flows of network traffic on a decentralized network layered on a blockchain network.

The illustrated example 800 includes the machine learning engine 302 of the node operator 138. In this example 800, the machine learning engine 302 is depicted receiving as input the state data 142, which includes the public data 312 and the probe data 314. The machine learning engine 302 is depicted outputting model(s) 140. Once output by the machine learning engine 302, the model(s) 140 are trained in accordance with the described techniques. Broadly, the machine learning engine 302 uses machine learning to train the model(s) 140 based on the historical state data 142. It is to be appreciated that the model(s) 140 may be retrained or otherwise updated by the machine learning engine 302 in variations.

In one or more implementations, the machine learning engine 302 generates one trained model(s) 140. Alternatively, the machine learning engine 302 generates multiple trained model(s) 140, e.g., an ensemble of models. Additionally, the architecture of the one or more model(s) 140 generated by the machine learning engine 302 and the training techniques utilized by the machine learning engine 302 can differ in variations without departing from the spirit or scope of the described techniques.

By way of example, the machine learning engine 302 configures one or more of the model(s) 140 as a multilayer perceptron (MLP). Alternatively or in addition, the machine learning engine 302 configures one or more of the model(s) 140 as a graph neural network (GNN) using a graph of the decentralized network 104 or a graph of a neighborhood of the decentralized network 104. As used herein, a "graph" includes nodes and edges. In terms of representing the decentralized network 104, the nodes of such a graph correspond to the nodes of the decentralized network 104, and the edges of the graph correspond to channels of the decentralized network 104. Accordingly, the edges of the graph connect graph nodes which represent network nodes connected by channels of the decentralized network 104.

Alternatively or in addition, the machine learning engine 302 configures one or more of the model(s) 140 as a reinforcement learning model. Initially, the machine learning engine 302 may configure a reinforcement learning model to output predictions of adjusted settings of the node 112 to optimize routing through the node 112 according to an initial, hardcoded policy, such as a policy that instructs the model to output the same settings when the state data 142 indicates lower traffic flow over the decentralized network 104 (times of low network demand) as when the state data 142 indicates higher traffic flow over the decentralized network (times of high network demand).

Over time, the machine learning engine 302 refines this underlying policy of the model(s) 140. For instance, the policy is refined based on changes observed in one or more performance metrics while the node 112 operates in a particular state (e.g., a particular configuration) due to actions performed by the node operator 138. As noted above and below, examples of performance metrics include, but are not limited to, a volume of transactions over one or more channels of the node 112 (and/or additional nodes), a number of the transactions over the one or more channels of the node 112 (and/or additional nodes), and return on investment of a cryptocurrency staked for the node 112 (and/or additional nodes), to name just a few. Examples of the actions performed by the node operator 138 include, by way of example and not limitation, opening a channel between the node 112 and another node of the decentralized network 104, closing a channel between the node 112 and another node of the decentralized network 104, adjusting a capacity of an open channel of the node 112, and rebalancing a channel of the node 112, to name just a few. In particular, the machine learning engine 302 refines the policy by negatively or positively reinforcing the reinforcement learning model depending on the effects that the adjustments made by the node operator 138 have on the one or more performance metrics over an observation time period. Due to this, the described techniques reduce idle time of open channels and their underlying computing resources and also reduce a number of processing cycles which are used to change routing node settings.

Alternatively or additionally, the machine learning engine 302 trains one or more of the model(s) 140 based on the state data 142 to generate predictions of an aggregate flow of network traffic in either direction across each channel of the decentralized network 104 (or a neighborhood of the decentralized network 104) for a given time period, e.g., an hour, multiple hours, a day, and so on. Alternatively or in addition, the machine learning engine 302 trains one or more of the model(s) 140 to generate predictions of a flow of network traffic across a specific path through a node over a given time period, e.g., an hour, multiple hours, a day, and so on. As such, using machine learning in this way optimizes the distribution of network traffic, i.e. transactions, across the channels, thereby optimizing load distribution in the decentralized network.

In one or more implementations, the model(s) 140 receive, in part, data describing a particular configuration of the node 112, including, for example, routing fees charged by the node 112, a set of channels open with other nodes of the decentralized network 104, and balances of those channels. The model(s) 140 predict flows of network traffic over a time interval (for one or more channels and/or across one or more specific paths) for the particular configuration of the node 112. When data describing a different configuration of the node 112 is received by the model(s) 140 as input, the model(s) 140 may predict different flows of network traffic over the time interval. In one or more implementations, the model(s) 140 are used in simulations for determining how to configure the node to optimize routing within the decentralized network 104.

While particular machine-learning techniques (e.g., MLP, GNN, reinforcement, etc.) are described above, any machine-learning techniques can be used to train the model(s) 140 consistent with techniques described herein. Further, while the machine learning engine 302 is described as being associated with a node operator 138, in some examples, a machine learning engine can be implemented by a centralized computing device and distributed to one or more node operators for use in real time or near-real time.

Figure 9:
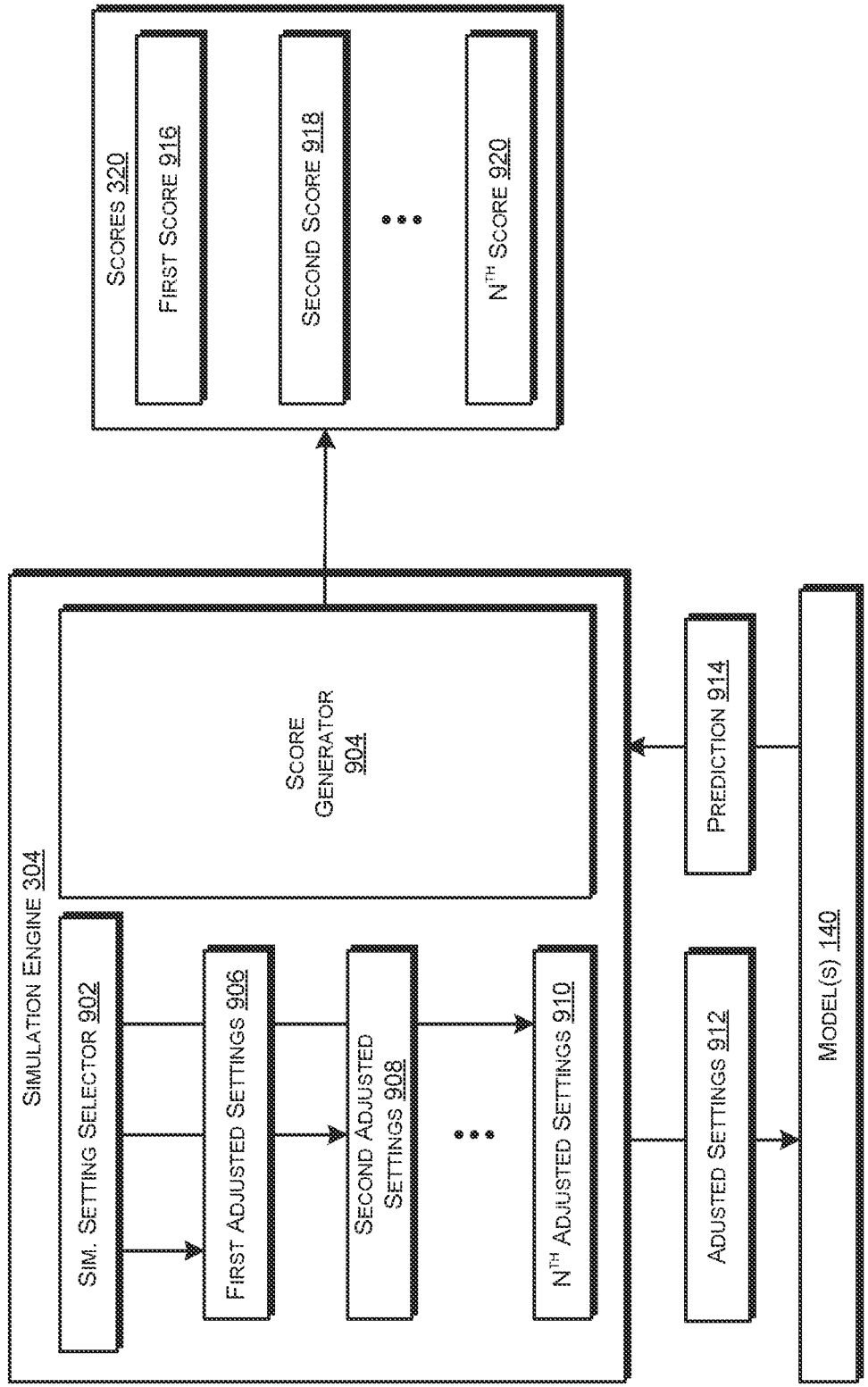
FIG. 9 is a block diagram of a non-limiting example of simulating network traffic with trained models to optimize routing within a decentralized network layered on a blockchain network, according to an embodiment described herein.

FIG. 9 is a block diagram of a non-limiting example 900 of simulating network traffic with trained models to optimize routing within a decentralized network layered on a blockchain network.

The illustrated example 900 includes the simulation engine 304. In accordance with the described techniques, the simulation engine 304 generates the scores 320 for numerous sets of settings which can be used to configure the node 112 for actual operation in the decentralized network 104. The simulation engine 304 generates the scores 320 by performing simulations, such that for each simulation the node 112 is simulated having a particular configuration (e.g., as governed by a set of settings) and the model(s) 140 predict flows of network traffic over an interval of time with the node 112 having the particular configuration.

In the illustrated example 900, the simulation engine 304 includes a simulation setting selector 902 and a score generator 904. It is to be appreciated that an engine for generating simulations of network behavior using the trained model(s) 140 may include more, fewer, or different components without departing from the spirit or scope of the described techniques.

The simulation setting selector 902 is configured to determine different sets of settings with which to configure the node 112 for the numerous simulations. In at least one implementation, the selector 902 determines different sets of settings using various techniques, such as by randomly changing a particular setting (e.g., a routing fee) and/or employing various exploration-exploitation schemes (e.g., multi-armed bandit algorithms) to generate the different sets of settings. In the illustrated example 900, the simulation setting selector 902 is depicted outputting first adjusted settings 906, second adjusted settings 908, and $N^{th}$ adjusted settings 910. These settings correspond to a first simulation, a second simulation, and an $N^{th}$ simulation, respectively, where N is any number greater than or equal to three. It is to be appreciated, however, that the simulation engine 304 may run various numbers of simulations (e.g., more or less than three) and that the simulation setting selector 902 is capable of outputting a set of adjusted settings for each simulation run by the simulation engine 304.

In accordance with the described techniques, the adjusted settings define a configuration of the node 112 for a simulation, specifying, for example, routing fees charged by the node 112, a set of open channels between the node 112 and other nodes of the decentralized network 104, and balances of those channels.

The simulation engine 304 is depicted providing adjusted settings 912 to the model(s) 140 as input. For a first simulation, for instance, the simulation engine 304 provides the first adjusted settings 906 to the model(s) 140 as the adjusted settings 912. For a second simulation, the simulation engine 304 provides the second adjusted settings 908 to the model(s) 140 as the adjusted settings 912. For the $N^{th}$ simulation, the simulation engine 304 provides the $N^{th}$ adjusted settings 910 to the model(s) 140 as the adjusted settings 912.

For each simulation, the model(s) 140 generate a prediction 914 of network flow across one or more channels of the decentralized network 104 and/or across one or more specific paths that includes a node (e.g., the node 112). Thus, for the first simulation, where a configuration of the node 112 is based on the first adjusted settings 906, the model(s) 140 generate a first prediction 914 of flows of network traffic. For the second simulation, where the configuration of the node 112 is based on the second adjusted settings 908, the model(s) 140 generate a second prediction 914 of flows of network traffic. The simulation process proceeds in this manner until the $N^{th}$ simulation, where the configuration of the node 112 is based on the $N^{th}$ adjusted settings 910, for which the model(s) 140 generate an $N^{th}$ prediction 914 of flows of network traffic.

The score generator 904 generates a score for each set of settings provided to the model(s) 140 as input, and particular transactions executed by the simulated network during the simulation. The transactions executed for the simulations may be generated randomly or by some other method, such as a Monte Carlo simulation. In the illustrated example 900, the scores 320 include a first score 916, a second score 918, and an $N^{th}$ score 920, which the score generator 904 generates for the first adjusted settings 906, the second adjusted settings 908, and the $N^{th}$ adjusted settings 910, respectively, based on the predictions 914.

Broadly, the scores 320 indicate how well the respective settings optimize one or more performance metrics in the simulations. Based on the prediction 914 of traffic flow generated for the first simulation, for instance, the first score 916 indicates how well the first adjusted settings 906 optimized the one or more performance metrics in relation to other sets of the settings. As noted above, in one or more implementations, a higher score 320 (e.g., a score that satisfies threshold) indicates that the set of adjusted settings resulted in a simulation that better optimized one or more performance metrics than a different set of adjusted settings having a lower score 320 (e.g., a score that does not satisfy the threshold). In different implementations, however, a lower score 320 may indicate that a set of adjusted settings resulted in a simulation that better optimized the one or more performance metrics than a different set of adjusted settings which corresponds to a higher score 320.

The score generator 904 can score the settings in different ways in variations. In one variation, for example, the score generator 904 scores sets of the settings used in the simulations based on optimizing a single performance metric, such as a simulated volume of transactions over one or more channels of the node 112. If the objective is to maximize the volume of transactions over those channels, then the score generator 904 is programmed to generate the highest score (e.g., relative to other scores) for the set of settings that resulted in the simulation with the highest volume of transactions over the one or more channels of the node 112. It follows also that the score generator 904 generates the lowest score (e.g., relative to other scores) for the set of settings that resulted in the simulation with the lowest volume of transactions over the one or more channels of the node 112.

Alternatively, the score generator 904 may generate scores for each set of settings as a function of multiple performance metrics which can be computed from the prediction 914. In one or more such implementations, the function may weight and/or normalize the performance metrics. For example, the score generator 904 may score the settings as a function of return on investment and volume of transactions, but may weight the return on investment more heavily than the volume of transactions. It is to be appreciated that the score generator 904 may score the sets of settings in a variety of ways without departing from the spirit or scope of the described techniques.

Examples of performance metrics relative to which the score generator 904 may score the settings, and based on which the node operator 138 optimizes routing within the decentralized network 104, include but are not limited to, a volume of transactions over one or more channels of the node 112 (and/or other nodes), a number of transactions over the one or more channels of the node 112 (and/or other nodes), a number or volume of failed transactions, a speed of transactions over the one or more channels of the node 112 (and/or other nodes), a latency of transactions over the one or more channels of the node 112 (and/or other nodes), an amount of computing resources consumed by transactions, an amount of power consumed by computing resources due to executing transactions, an amount of idle time of computing resources between transactions and/or over a time period (e.g., a day), a measure of security of transactions over the one or more channels of the node 112 (and/or other nodes), a measure indicating the avoidance or reduction of malicious node encounters for transactions over the one or more channels of the node 112 (and/or other nodes), and a return on an investment associated with operating the node 112. The score generator 904 may score the settings, and the node operator 138 may optimize routing within the decentralized network 104, based on other metrics without departing from the spirit or scope of the described techniques. Examples of such other metrics include but are not limited to optimizing routing given limited power for performing transactions or adjustments, limited processing cycles available to change routing settings, limited amounts of time to carry out a transaction or performing adjustments, and so forth.

Accordingly, the simulation engine 304 simulates the flow of network traffic using the model(s) 140 for multiple simulations. For each simulation, the simulation engine 304 causes the simulation setting selector 902 to adjust one or more settings associated with routing the network traffic through the node 112. Further, the simulation engine 304 provides the adjusted settings 912 to the model(s) 140 as input, and the model(s) 140 generate a prediction of the network traffic routed through the node 112 based on the adjusted settings 912. The score generator 904 generates scores for the adjusted settings 912 of each simulation based, in part, on the prediction 914 of traffic flow generated for the simulation.

In one or more implementations, the simulation engine 304 uses a Monte Carlo simulation. By way of example, the simulation engine 304 simulates one or more transactions in the neighborhood of the node 112 and configures the node 112 (e.g., by adjusting the settings) to optimize the flow of network traffic over the channels of the node 112. Alternatively or in addition, the simulation engine 304 assigns weights to different paths through the node 112, such as within a 2-hop neighborhood of the node 112. By probing the neighborhood around the node 112, the node operator 138 can generate estimations of an amount of network traffic that flows through individual channels of the neighborhood, and these amounts can be used to assign a weight to each path. In some examples, a model can be trained to predict how weights change as settings, such as fees, in the neighborhood change.

Based on the simulating, the adjustment system 306 performs one or more actions to optimize routing within the decentralized network 104. For instance, the adjustment system 306 adjusts a configuration of the node 112, such as by changing the settings 144 of the node. Actions which the adjustment system 306 can perform to optimize routing within the decentralized network include, but are not limited to, opening or closing one or more channels between the node 112 and other nodes of the decentralized network 104, setting a routing fee for the node 112 (e.g., modifying the routing fee, tuning the routing fee, etc.), adjusting a capacity of a channel of the node 112, and performing a circular rebalancing to shift an amount of cryptocurrency from one side of a channel to the other, to name just a few. Due to this, the adjustment system 306 can reduce idle time of open channels and their underlying computing resources and also reduce a number of processing cycles which are used to change routing node settings. Further, the efficient use of underlying computing resources enables processing requirements, network bandwidth requirements and power consumption for nodes in the decentralized network to be reduced. In one or more implementations, the adjustment system 306 performs the one or more actions to adjust the configuration of the node 112 so that it matches a configuration corresponding to a highest score 320 from a plurality of simulations. In other words, the adjustment system 306 performs the one or more actions so that the settings 144 of the node 112 conform to the optimized settings, e.g., which have the highest score 320 according to the plurality of simulations.

In one or more implementations, the node operator 138 causes the model(s) 140 to be updated or otherwise trained at intervals, which may be regular or irregular. Examples of regular intervals include every hour, 12 hours, daily, weekly, and monthly. Examples of irregular intervals may include the occurrence of events, such as an observation that the flow of network traffic over some period of time satisfies a threshold (e.g., the amount of network traffic is less than or greater than a threshold for the period of time), a new channel is established with the node 112, a new channel is established within some neighborhood of the node 112, a routing fee of a node is changed, and so forth. Similarly, the node operator 138 causes the simulation engine 304 to simulate the flow of network traffic at intervals, which may be regular or irregular.

In a given simulation session, the simulation engine 304 is capable of simulating hundreds or thousands (or more) of transactions flowing across the decentralized network 104 while the node 112 is simulated operating with a particular set of the adjusted settings 912. The simulation engine 304 is also capable of tracking the simulated transactions, such that a score 320 can be generated for the simulation of numerous transactions. The simulation engine 304 is further capable of subsequently performing additional simulations during the session using different sets of the adjusted settings 912 for the node 112, and tracking numbers of those transactions for the simulated hours.

While FIG. 9 makes reference to a score generator 904 and scores 320, additional or alternative metrics can be used as a function of multiple performance metrics which can be computed from predictions and/or used to determine adjustments to the settings.

The following discussion describes examples of procedures for dynamically optimizing routing within a decentralized network. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks. Moreover, the following procedures include discussion of examples from the figures above but are not necessarily limited to the examples from those figures. In one or more implementations, for example, the procedures may be implemented using different systems (which can optionally include one or more components from the above-described example systems). In at least some implementations the procedures are performed by a node operator, such as node operator 138.

Figure 10:
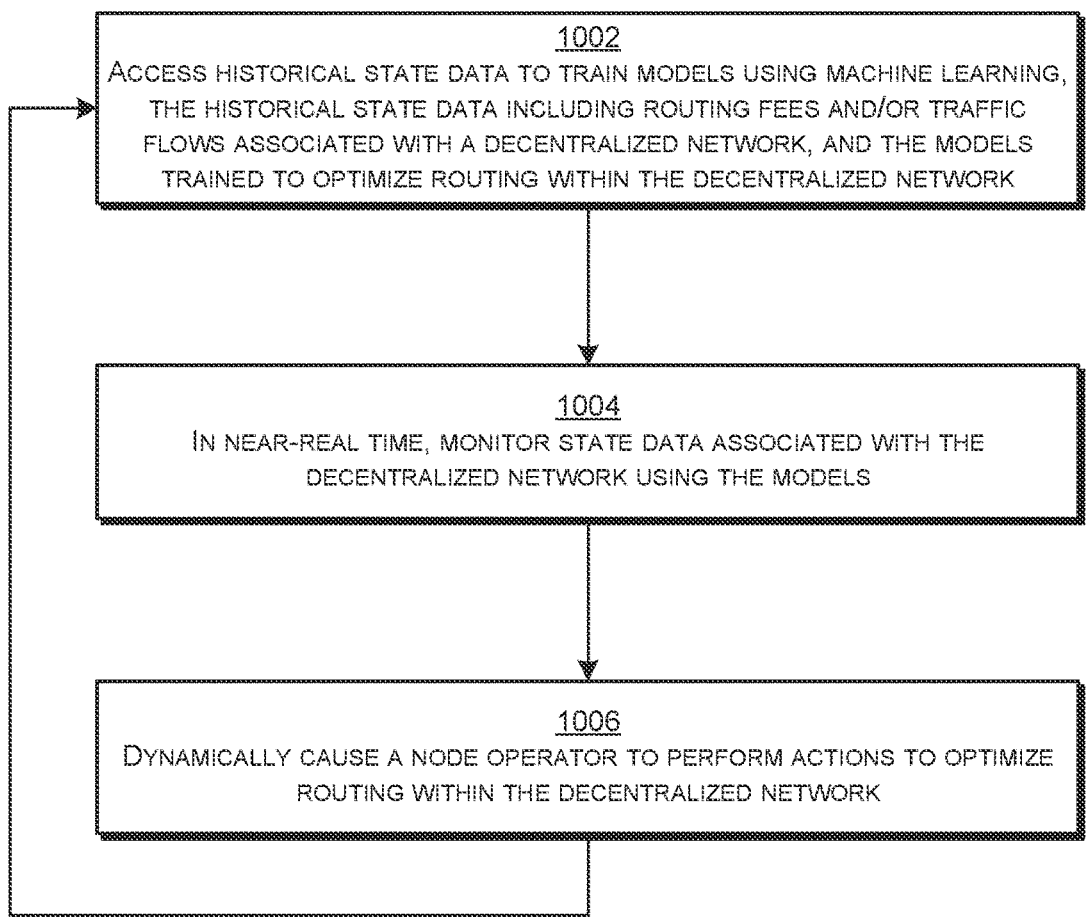
FIG. 10 depicts a procedure in an example implementation of optimizing routing within a decentralized network by monitoring state data associated with the decentralized network in near-real time with models trained using machine learning, according to an embodiment described herein.

FIG. 10 depicts a procedure 1000 in an example implementation of optimizing routing within a decentralized network by monitoring state data associated with the decentralized network in near-real time with models trained using machine learning.

Historical state data is accessed to train models using machine learning (block 1002). In accordance with the principles discussed herein, the historical state data includes routing fees and/or traffic flows associated with a decentralized network layered on a blockchain network. In addition, the models are trained to optimize routing within the decentralized network. By way of example, the machine learning engine 302 accesses the state data 142 that describes historical routing fees and/or traffic flows associated with the decentralized network 104. Using the historical state data 142 obtained, the machine learning engine 302 trains the model(s) 140 as discussed in more detail above.

In one or more implementations, for example, the machine learning engine 302 trains the model(s) 140 using a multivariate approach such as Bayesian optimization. Broadly, Bayesian optimization is a global optimization method for noisy black-box functions, like optimizing routing across a level 2 network (e.g., the decentralized network 104). Applied to hyperparameter optimization of the model(s) 140, for instance, Bayesian optimization builds a probabilistic model of a function mapping from hyperparameter values to an objective (e.g., maximizing ROI) evaluated on a validation set (e.g., simulated transactions over the decentralized network 104). By iteratively evaluating a promising hyperparameter configuration based on a current model, and then updating it, Bayesian optimization aims to gather observations revealing as much information as possible about this function and, in particular, the location of the optimum. In various implementations, Bayesian optimization is configured to balance exploration (hyperparameters for which the outcome is most uncertain) and exploitation (hyperparameters known to be or expected close to the optimum). In practice, Bayesian optimization obtains better (e.g., more optimal/higher performing) results in fewer evaluations compared to grid- and random-search techniques. Although Bayesian optimization is discussed just above, it is to be appreciated that the machine learning engine 302 may train the model(s) 140 using other machine learning approaches in accordance with the described techniques. Using a global multivariate optimization approach as described herein for network-based optimization enables a more robust and reliable method for optimizing the routing within the decentralized network.

In near-real time, state data associated with the decentralized network is monitored using the models (block 1004). By way of example, the node operator 138 monitors the state data 142 associated with the decentralized network 104 using the model(s) 140 trained at block 1002. Accordingly, this multivariate optimization approach results in a more robust and reliable method for optimizing the routing, thereby improving resource utilization.

Actions to optimize routing within the decentralized network are performed dynamically by a node operator (block 1006). By way of example, the node operator 138 performs one or more actions dynamically to optimize routing within the decentralized network 104, examples of which include, but are not limited to, opening or closing one or more channels between the node 112 and other nodes of the decentralized network 104, setting a routing fee for the node 112 (e.g., modifying or tuning the routing fee), adjusting a balance of a channel of the node 112, and performing a circular rebalancing to shift an amount of cryptocurrency from one side of a channel to the other, to name just a few. Due to this, the node operator 138 reduces idle time of open channels and their underlying computing resources and also reduces a number of processing cycles which are used to change routing node settings. Further, the efficient use of underlying computing resources enables processing requirements, network bandwidth requirements and power consumption for nodes in the decentralized network to be reduced.

In one or more implementations, the machine learning engine 302 retrains the model(s) 140 after the node operator 138 dynamically performs the one or more actions, such as based on state data 142 collected over a time period after those actions are performed. In other words, the procedure 1000 returns to block 1002. By training the model(s) 140 based on the historical state data 142 and the state data using machine learning techniques, the procedure 1000 is a global, multivariate optimization approach to optimizing the routing, thereby offering advantages over piecewise or heuristic optimization approaches. Additionally, using machine learning in this way optimizes the distribution of network traffic, i.e. transactions, across the channels, thereby optimizing load distribution in the decentralized network.

Figure 11:
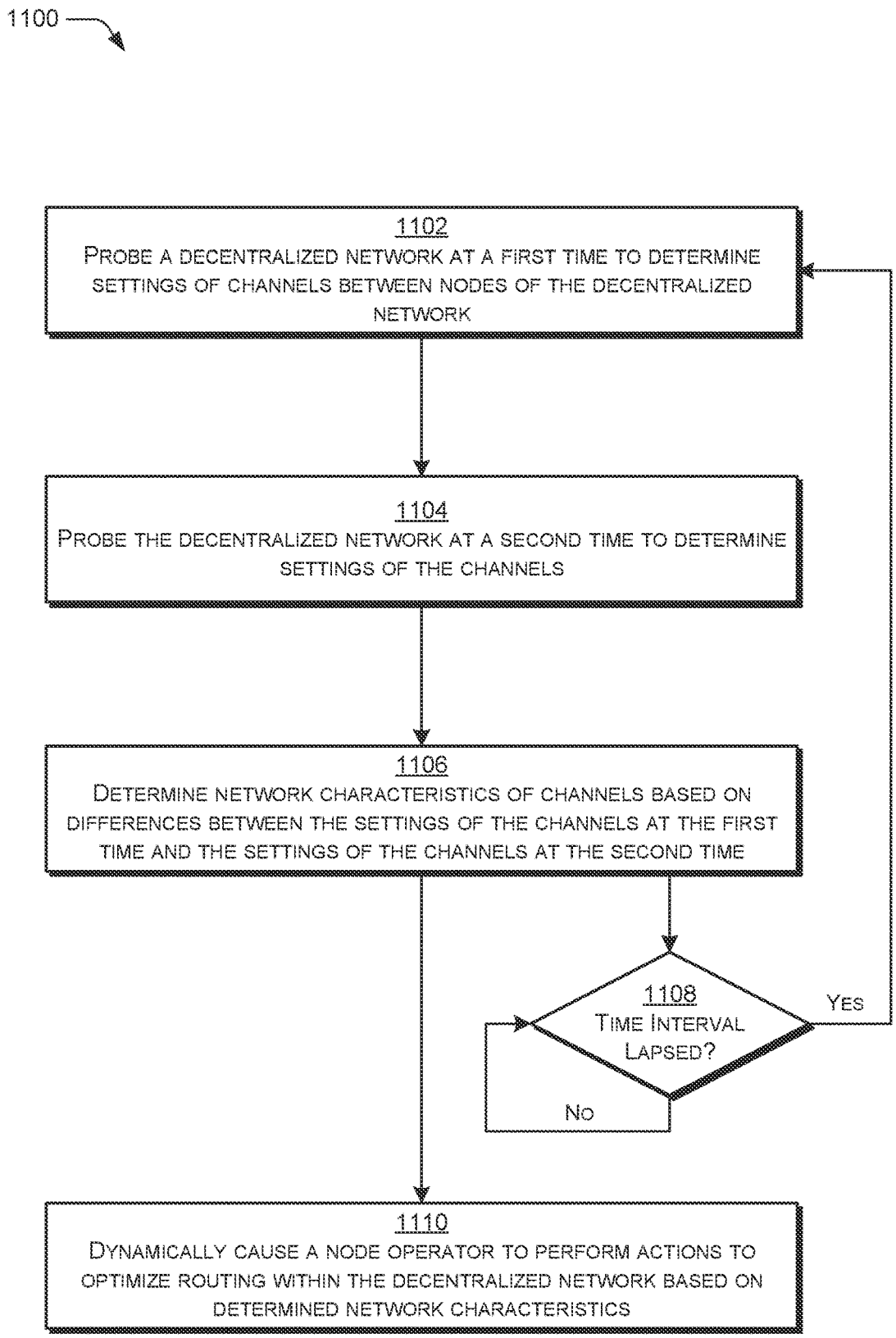
FIG. 11 depicts a procedure in an example implementation of successively probing a decentralized network to determine a flow of network traffic across channels of the decentralized network, according to an embodiment described herein.

FIG. 11 depicts a procedure 1100 in an example implementation of successively probing a decentralized network to determine a characteristic channels of the decentralized network.

A decentralized network is probed at a first time to determine one or more settings of channels that are open between nodes of the decentralized network (block 1102).

By way of example, the node 502 and the node 504 are included in the decentralized network 104 and a channel is established between those nodes. The node operator 138 sends the probe 506 and the probe 602 to determine settings of the channel (e.g., a balance, throughput, etc.) between the node 502 and the node 504 at a first time.

The decentralized network is probed at a second time to determine settings of the channels (block 1104). By way of example, the node operator 138 sends the probe 702 and the probe 704 to determine the settings of the channel (e.g., a balance, throughput, etc.) between the node 502 and the node 504 at a second time.

One or more network characteristics of the channels are determined based on, for example, differences between the balances of the channels at the first time and the balances of the channels at the second time (block 1106). By way of example, the node operator 138 determines a characteristic of the channel between the node 502 and the node 504, such as a flow of network traffic (e.g., performs a flow check) over that channel, security of the transactions over the channel, speed of the transactions over the channel, latency of the transactions over the channel, a measure indicative of malicious nodes encountered by transactions along a path to the channel, and so forth. In one or more implementations, the node operator 138 determines the characteristic based on a difference between the settings determined at block 1102 and the settings determined at block 1104. For instance, the node operator 138 determines a flow of network traffic based on a difference between a balance determined at the first time and the balance determined at the second time.

If, at block 1108, an interval of time regulated by the node operator 138 to perform a subsequent characteristic check (e.g., a flow check) has lapsed, the procedure returns to block 1102 to again probe the decentralized network 104 to perform the subsequent characteristic check (e.g., a subsequent flow check). If the interval of time has not lapsed, the node operator 138 waits to probe the decentralized network 104 until the interval has lapsed. As noted above, the interval can be regular or irregular (e.g., based on the occurrence of events).

Actions to optimize routing within the decentralized network are performed dynamically by a node operator based on the determined network characteristic (block 1110). By way of example, the node operator 138 performs one or more actions dynamically to optimize routing within the decentralized network 104 based on the characteristic determined at block 1106. Examples of those actions are discussed above. By successively probing the decentralized network 104 in accordance with the procedure 1100, the node operator 138 is not limited to using information that is local to a node (e.g., describing network traffic routed through the node and states of channels that involve the node) and information about other nodes that utilize a same node operator (e.g., from a central bus associated with the node operator). Instead, the node operator 138 uses a network-focused approach (instead of, or in addition to a locally-focused approach), enabling network-based optimization that would not otherwise be available for locally-focused approaches.

Figure 12:
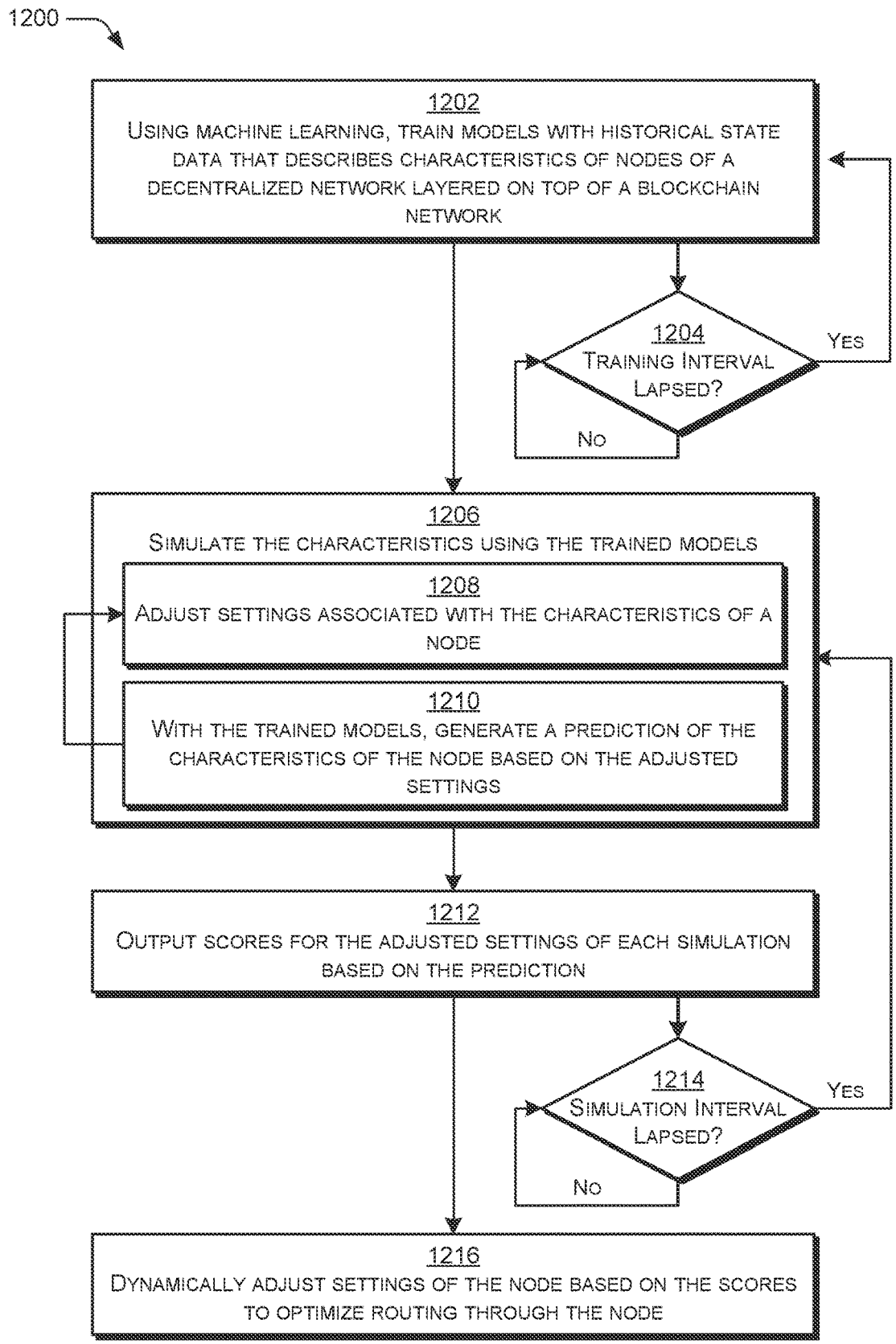
FIG. 12 depicts a procedure in an example implementation of simulating network traffic of a decentralized network using models trained with machine learning and dynamically adjusting settings of a node in the decentralized network based on the simulating, according to an embodiment described herein.

FIG. 12 depicts a procedure 1200 in an example implementation of simulating one or more characteristics of a decentralized network using models trained with machine learning and dynamically adjusting settings of a node in the decentralized network based on the simulating.

Using machine learning, models are trained with historical state data that describes one or more characteristics of nodes of a decentralized network, which is layered on top of a blockchain network (block 1202). By way of example, the machine learning engine 302 trains the model(s) 140 according to one or more machine learning algorithms. Further, the machine learning engine 302 trains the model(s) 140 using the state data 142—the historical state data—that describes network traffic routed through at least a portion of the nodes of the decentralized network 104. In one or more implementations, the node operator 138 obtains historical state data by probing the decentralized network 104 to obtain the state data 142 in accordance with the various techniques discussed above (e.g., by performing "balance searches" and "flow checks"), storing the obtained state data in the storage 310 (e.g., one or more databases), and then accessing the state data 142 from the storage 310 at a subsequent time.

If, at block 1204, an interval of time to wait before retraining the models has lapsed, the procedure returns to block 1202 to again train the model(s) 140 with the historical state data using machine learning. If the interval of time has not lapsed, the subsequent steps of the procedure 1200 use the model(s) 140 last trained at block 1202.

In some examples, the machine-learning approach can be agnostic to different layer 1 and layer 2 networks. That is, a model can be trained on data associated with a first layer 1 and/or layer 2 network and can be utilized by second layer 1 and/or layer 2 networks without regard to the differences in the networks. In some examples, transaction data associated with layer 1 and/or layer 2 networks can be used to update and/or re-train a model trained on other layer 1 and/or layer 2 networks to customize the model for the layer 1 and/or layer 2 networks. Such updating and/or re-training can therefore enable faster use and/or application of a model when compared to training a model from scratch. As such, techniques described herein can be compatible with different layer 1 and/or layer 2 networks and provide efficiencies as described above.

Characteristics of the nodes of the decentralized network are simulated using the trained models (block 1206). In accordance with the principles discussed herein, the simulation engine 304 performs multiple simulations, where each simulation is an iteration of block 1208 and block 1210. At block 1208, one or more settings associated with the characteristics of a node (e.g., settings associated with routing network traffic through the node) of the decentralized network are adjusted. By way of example, the simulation setting selector 902 generates adjusted settings 912, which are adjusted relative to other sets of settings provided to the model(s) 140 for different simulations. The simulation engine 304 provides the adjusted settings 912 as input to the model(s) 140. Using machine learning in this way optimizes the distribution of network traffic, i.e. transactions, across the channels, thereby optimizing load distribution in the decentralized network.

At block 1210, a prediction of the characteristics of the node is generated with the trained models based on the adjusted settings. By way of example, the model(s) 140 generate a prediction 914 of the network traffic routed through the node 112—and other nodes and across channels of the decentralized network 104—based on the adjusted settings 912 received as input by the model(s) 140.

Scores for the adjusted settings of each simulation are output (block 1212). In accordance with the principles discussed herein, the scores for the adjusted settings of each simulation are based on the prediction. By way of example, the score generator 904 generates scores 320 for the adjusted settings 912 of each simulation performed through iterations of block 1208 and block 1210. In the context of FIG. 9, for instance, the score generator 904 generates the first score 916 for the first adjusted settings 906 used by the model(s) 140 in a first simulation, the score generator 904 generates the second score 918 for the second adjusted settings 908 used by the model(s) 140 in a second simulation, and so forth.

If, at block 1214, an interval of time to wait before again simulating the characteristics has lapsed, the procedure returns to block 1206 to simulate the characteristics using the trained model(s) 140. If the interval of time has not lapsed, however, the subsequent steps of the procedure 1200 use the scores 320 last output at block 1212.

Settings of the node are dynamically adjusted based on the scores (block 1216). In accordance with the principles discussed herein, the settings are dynamically adjusted to optimize routing through the node. By way of example, the adjustment system 306 adjusts the settings 144 of the node 112 dynamically to optimize routing through the node 112, e.g., such as by conforming a state of the node 112 to optimal settings as indicated by the scores 320. By simulating characteristics of nodes of the decentralized network 104 over time in accordance with the procedure 1200, the node operator 138 eliminates the interaction of human users making a "best guess" as to what a routing node's settings should be to optimize the performance metrics. Unlike the procedure 1200, a human user is not capable of simulating hundreds or thousands (or more) of transactions flowing across a decentralized network over multiple hours while a routing node operates with particular settings, and also tracking the outcomes of the simulated transactions. Moreover, a human user is not further capable of subsequently performing additional simulations (e.g., the iterations of blocks 1208, 1210) for different settings of the routing node, and tracking the outcomes of the simulated transactions. Notably, even if a human user were able to perform such simulations, by the time he or she was able to complete those simulations, the state of the decentralized network 104 (e.g., settings of other nodes in the network) is likely to have changed, rendering the human-performed simulations obsolete.

Figure 13:
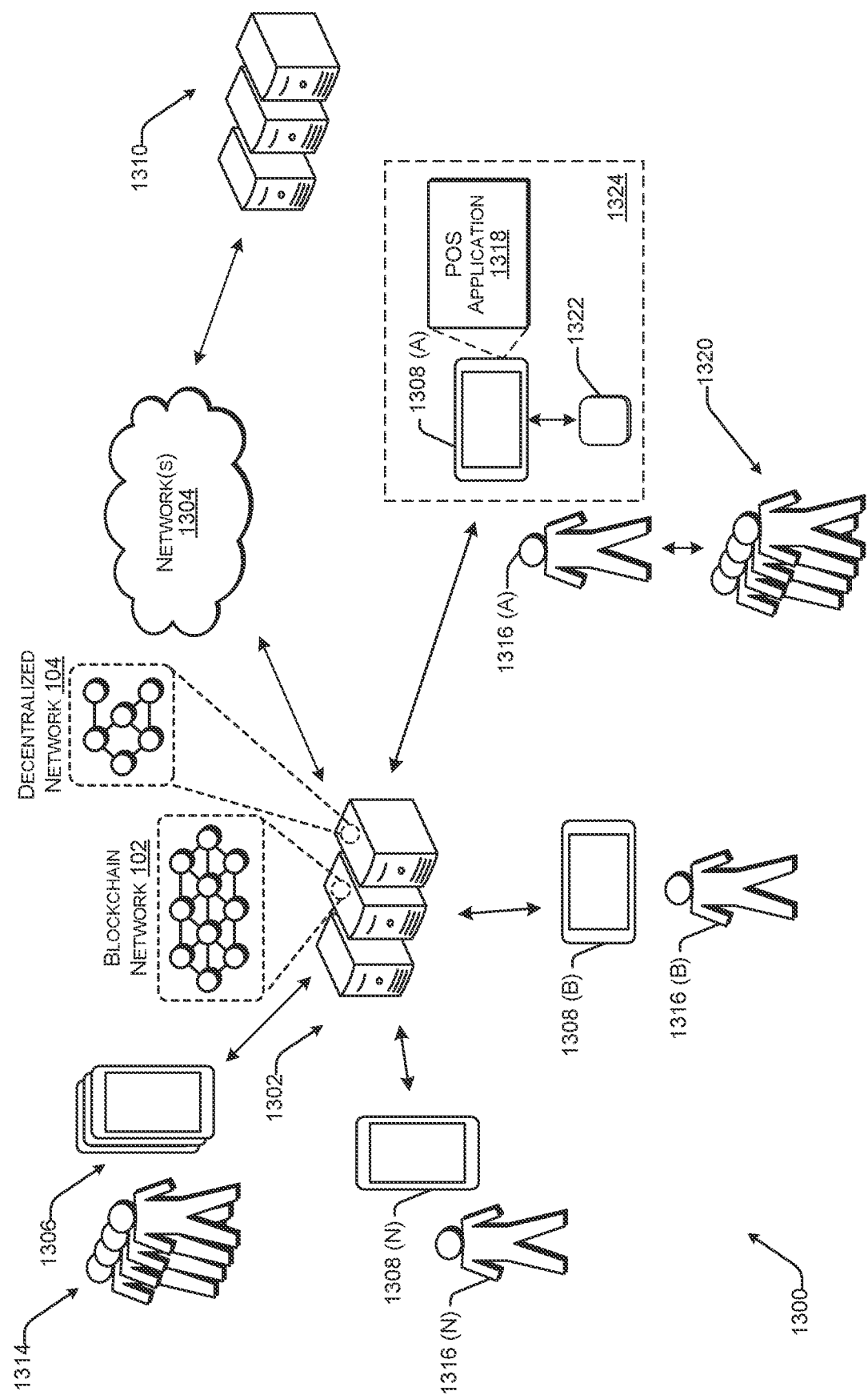
FIG. 13 illustrates an example environment with which techniques described herein can be implemented, according to an embodiment described herein.

FIG. 13 illustrates an example environment 1300. The environment 1300 includes server(s) 1302 that can communicate over a network 1304 with user devices 1306 (which, in some examples can be merchant devices 1308 (individually, 1308(A)-1308(N))) and/or server(s) 1310 associated with third-party service provider(s). The server(s) 1302 can be associated with a service provider that can provide one or more services for the benefit of users 1314, as described below. Actions attributed to the service provider can be performed by the server(s) 1302.

In the context of the previously described figures, for example, at least a portion of the server(s) 1302 may be used to implement one or more of the blockchain nodes of the blockchain network 102, such as the blockchain node 110. Alternatively or in addition, at least a portion of the server(s) 1302 may be used to implement nodes of the decentralized network 104, such as to implement the node 112. By way of example, the server(s) 1302 may be used to implement nodes of the decentralized network 104 in scenarios where a corresponding service provider has an interest in propagating use of the decentralized network 104 among its end users. For instance, service providers that facilitate the use and/or transfer of digital assets implemented using the blockchain 124 (e.g., with a computing application, plugin, extension, etc.), may have an interest in propagating use of the decentralized network 104 and thus use their resources (e.g., server(s) 1302) to run nodes. Accordingly, the node operator 138 may be implemented using one or more of the server(s) 1302, e.g., to optimize routing within the decentralized network on behalf of such a service provider.

The environment 1300 can include a plurality of user devices 1306, as described above. In the preceding description, the client device 106 and the client device 108 are example of the user devices 1306. Each one of the plurality of user devices 1306 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. In some examples, individual ones of the user devices can be operable by users 1314. The users 1314 can be referred to as customers, buyers, merchants, sellers, borrowers, employees, employers, payors, payees, couriers and so on. The users 1314 can interact with the user devices 1306 via user interfaces presented via the user devices 1306. In the context of FIG. 2, for example, the users 1314 can interact with the client device 106 and the client device 108 via the user interface 202 and the user interface 204, respectively. In at least one example, a user interface can be presented via a web browser, or the like. In other examples, a user interface can be presented via an application, such as a mobile application or desktop application, which can be provided by the service provider or which can be an otherwise dedicated application. In some examples, individual of the user devices 1306 can have an instance or versioned instance of an application, which can be downloaded from an application store, for example, which can present the user interface(s) described herein. In at least one example, a user 1314 can interact with the user interface via touch input, spoken input, or any other type of input.

As described above, in at least one example, the users 1314 can include merchants 1316 (individually, 1316(A)-1316(N)). In an example, the merchants 1316 can operate respective merchant devices 1308, which can be user devices 1306 configured for use by merchants 1316. By way of example, a merchant device 1308 may be configured with a user interface that enables a respective merchant to accept cryptocurrency payments from a user device 1306 of a customer, where the cryptocurrency payments are executed over the decentralized network 104. For the purpose of this discussion, a "merchant" can be any entity that offers items (e.g., goods or services) for purchase or other means of acquisition (e.g., rent, borrow, barter, etc.). The merchants 1316 can offer items for purchase or other means of acquisition via brick-and-mortar stores, mobile stores (e.g., pop-up shops, food trucks, etc.), online stores, combinations of the foregoing, and so forth. In some examples, at least some of the merchants 1316 can be associated with a same entity but can have different merchant locations and/or can have franchise/franchisee relationships. In additional or alternative examples, the merchants 1316 can be different merchants. That is, in at least one example, the merchant 1316(A) is a different merchant than the merchant 1316(B) and/or the merchant 1316(C).

For the purpose of this discussion, "different merchants" can refer to two or more unrelated merchants. "Different merchants" therefore can refer to two or more merchants that are different legal entities (e.g., natural persons and/or corporate persons) that do not share accounting, employees, branding, etc. "Different merchants," as used herein, have different names, employer identification numbers (EIN)s, lines of business (in some examples), inventories (or at least portions thereof), and/or the like. Thus, the use of the term "different merchants" does not refer to a merchant with various merchant locations or franchise/franchisee relationships. Such merchants—with various merchant locations or franchise/franchisee relationships—can be referred to as merchants having different merchant locations and/or different commerce channels.

Each merchant device 1308 can have an instance of a POS application 1318 stored thereon. The POS application 1318 can configure the merchant device 1308 as a POS terminal, which enables the merchant 1316(A) to interact with one or more customers 1320. As described above, the users 1314 can include customers, such as the customers 1320 shown as interacting with the merchant 1316(A). For the purpose of this discussion, a "customer" can be any entity that acquires items from merchants. While two customers 1320 are illustrated in FIG. 13, any number of customers 1320 can interact with the merchants 1316. Further, while FIG. 13 illustrates the customers 1320 interacting with the merchant 1316(A), the customers 1320 can interact with any of the merchants 1316.

In at least one example, interactions between the customers 1320 and the merchants 1316 that involve the exchange of funds (from the customers 1320) for items (from the merchants 1316) can be referred to as "transactions." In at least one example, the POS application 1318 can determine transaction data associated with the POS transactions. Transaction data can include payment information, which can be obtained from a reader device 1322 associated with the merchant device 1308(A), user authentication data, purchase amount information, point-of-purchase information (e.g., item(s) purchased, date of purchase, time of purchase, etc.), etc. The POS application 1318 can send transaction data to the server(s) 1302 such that the server(s) 1302 can track transactions of the customers 1320, merchants 1316, and/or any of the users 1314 over time. Furthermore, the POS application 1318 can present a user interface to enable the merchant 1316(A) to interact with the POS application 1318 and/or the service provider via the POS application 1318.

In at least one example, the merchant device 1308(A) can be a special-purpose computing device configured as a POS terminal (via the execution of the POS application 1318). In at least one example, the POS terminal may be connected to a reader device 1322, which is capable of accepting a variety of payment instruments, such as credit cards, debit cards, gift cards, short-range communication-based payment instruments, and the like, as described below. In at least one example, the reader device 1322 can plug in to a port in the merchant device 1308(A), such as a microphone port, a headphone port, an audio-jack, a data port, or other suitable port. In additional or alternative examples, the reader device 1322 can be coupled to the merchant device 1308(A) via another wired or wireless connection, such as via a Bluetooth®, BLE, and so on. Additional details are described below with reference to FIG. 16. In some examples, the reader device 1322 can read information from alternative payment instruments including, but not limited to, wristbands and the like.

In some examples, the reader device 1322 may physically interact with payment instruments such as magnetic stripe payment cards, EMV payment cards, and/or short-range communication (e.g., near field communication (NFC), radio frequency identification (RFID), Bluetooth®, Bluetooth® low energy (BLE), etc.) payment instruments (e.g., cards or devices configured for tapping). The POS terminal may provide a rich user interface, communicate with the reader device 1322, and communicate with the server(s) 1302, which can provide, among other services, a payment processing service. The server(s) 1302 associated with the service provider can communicate with server(s) 1310, as described below. In this manner, the POS terminal and reader device 1322 may collectively process transaction(s) between the merchants 1316 and customers 1320. In some examples, POS terminals and reader devices can be configured in one-to-one pairings. In other examples, the POS terminals and reader devices can be configured in many-to-one pairings (e.g., one POS terminal coupled to multiple reader devices or multiple POS terminals coupled to one reader device). In some examples, there could be multiple POS terminal(s) connected to a number of other devices, such as "secondary" terminals, e.g., back-of-the-house systems, printers, line-buster devices, POS readers, and the like, to allow for information from the secondary terminal to be shared between the primary POS terminal(s) and secondary terminal(s), for example via short-range communication technology. This kind of arrangement may also work in an offline-online scenario to allow one device (e.g., secondary terminal) to continue taking user input, and synchronize data with another device (e.g., primary terminal) when the primary or secondary terminal switches to online mode. In other examples, such data synchronization may happen periodically or at randomly selected time intervals.

While the POS terminal and the reader device 1322 of the POS system 1324 are shown as separate devices, in additional or alternative examples, the POS terminal and the reader device 1322 can be part of a single device. In some examples, the reader device 1322 can have a display integrated therein for presenting information to the customers 1320. In additional or alternative examples, the POS terminal can have a display integrated therein for presenting information to the customers 1320. POS systems, such as the POS system 1324, may be mobile, such that POS terminals and reader devices may process transactions in disparate locations across the world. POS systems can be used for processing card-present transactions and card-not-present (CNP) transactions, as described below.

A card-present transaction is a transaction where both a customer 1320 and his or her payment instrument are physically present at the time of the transaction. Card-present transactions may be processed by swipes, dips, taps, or any other interaction between a physical payment instrument (e.g., a card), or otherwise present payment instrument, and a reader device 1322 whereby the reader device 1322 is able to obtain payment data from the payment instrument. A swipe is a card-present transaction where a customer 1320 slides a card, or other payment instrument, having a magnetic strip through a reader device 1322 that captures payment data contained in the magnetic strip. A dip is a card-present transaction where a customer 1320 inserts a payment instrument having an embedded microchip (i.e., chip) into a reader device 1322 first. The dipped payment instrument remains in the payment reader until the reader device 1322 prompts the customer 1320 to remove the card, or other payment instrument. While the payment instrument is in the reader device 1322, the microchip can create a one-time code which is sent from the POS system 1324 to the server(s) 1310 (which can be associated with third-party service providers that provide payment services, including but not limited to, an acquirer bank, an issuer, and/or a card payment network (e.g., Mastercard®, VISA®, etc.)) to be matched with an identical one-time code. A tap is a card-present transaction where a customer 1320 may tap or hover his or her payment instrument (e.g., card, electronic device such as a smart phone running a payment application, etc.) over a reader device 1322 to complete a transaction via short-range communication (e.g., NFC, RFID, Bluetooth®, BLE, etc.). Short-range communication enables the payment instrument to exchange information with the reader device 1322. A tap may also be called a contactless payment.

A CNP transaction is a transaction where a card, or other payment instrument, is not physically present at the POS such that payment data is required to be manually keyed in (e.g., by a merchant, customer, etc.), or payment data is required to be recalled from a card-on-file data store, to complete the transaction.

The POS system 1324, the server(s) 1302, and/or the server(s) 1310 may exchange payment information and transaction data to determine whether transactions are authorized. For example, the POS system 1324 may provide encrypted payment data, user authentication data, purchase amount information, point-of-purchase information, etc. (collectively, transaction data) to server(s) 1302 over the network(s) 1304. The server(s) 1302 may send the transaction data to the server(s) 1310. As described above, in at least one example, the server(s) 1310 can be associated with third-party service providers that provide payment services, including but not limited to, an acquirer bank, an issuer, a cryptocurrency exchange network, and/or a card payment network (e.g., Mastercard®, VISA®, etc.)

For the purpose of this discussion, the "payment service providers" can be acquiring banks ("acquirer"), issuing banks ("issuer"), card payment networks, and the like. In an example, an acquirer is a bank or financial institution that processes payments (e.g., credit or debit card payments) and can assume risk on behalf of merchants(s). An acquirer can be a registered member of a card association (e.g., Visa®, MasterCard®), and can be part of a card payment network. The acquirer (e.g., the server(s) 1310 associated therewith) can send a fund transfer request to a server computing device of a card payment network (e.g., Mastercard®, VISA®, etc.) to determine whether the transaction is authorized or deficient. In at least one example, the service provider can serve as an acquirer and connect directly with the card payment network.

The card payment network (e.g., the server(s) 1310 associated therewith) can forward the fund transfer request to an issuing bank (e.g., "issuer"). The issuer is a bank or financial institution that offers a financial account (e.g., credit or debit card account) to a user. An issuer can issue payment cards to users and can pay acquirers for purchases made by cardholders to which the issuing bank has issued a payment card. The issuer (e.g., the server(s) 1310 associated therewith) can make a determination as to whether the customer has the capacity to absorb the relevant charge associated with the payment transaction. In at least one example, the service provider can serve as an issuer and/or can partner with an issuer. The transaction is either approved or rejected by the issuer and/or the card payment network (e.g., the server(s) 1310 associated therewith), and a payment authorization message is communicated from the issuer to the POS device via a path opposite of that described above, or via an alternate path.

As described above, the server(s) 1310, which can be associated with payment service provider(s), may determine whether the transaction is authorized based on the transaction data, as well as information relating to parties to the transaction (e.g., the customer 1320 and/or the merchant 1316(A)). The server(s) 1310 may send an authorization notification over the network(s) 1304 to the server(s) 1302, which may send the authorization notification to the POS system 1324 over the network(s) 1304 to indicate whether the transaction is authorized. The server(s) 1302 may also transmit additional information such as transaction identifiers to the POS system 1324. In one example, the server(s) 1302 may include a merchant application and/or other functional components for communicating with the POS system 1324 and/or the server(s) 1310 to authorize or decline transactions.

Based on the authentication notification that is received by the POS system 1324 from server(s) 1302, the merchant 1316(A) may indicate to the customer 1320 whether the transaction has been approved. In some examples, approval may be indicated at the POS system 1324, for example, at a display of the POS system 1324. In other examples, such as with a smart phone or watch operating as a short-range communication payment instrument, information about the approved transaction may be provided to the short-range communication payment instrument for presentation via a display of the smart phone or watch. In some examples, additional or alternative information can additionally be presented with the approved transaction notification including, but not limited to, receipts, special offers, coupons, or loyalty program information.

As mentioned above, the service provider can provide, among other services, payment processing services, inventory management services, catalog management services, business banking services, financing services, lending services, reservation management services, web-development services, payroll services, employee management services, appointment services, loyalty tracking services, restaurant management services, order management services, fulfillment services, onboarding services, identity verification (IDV) services, and so on. In some examples, the users 1314 can access all of the services of the service provider. In other examples, the users 1314 can have gradated access to the services, which can be based on risk tolerance, IDV outputs, subscriptions, type of account with the service provider (e.g., merchant versus customer), and so on. In at least one example, access to such services can be availed to the merchants 1316 via the POS application 1318. In additional or alternative examples, each service can be associated with its own access point (e.g., application, web browser, etc.).

The service provider can offer payment processing services for processing payments on behalf of the merchants 1316, as described above. For example, the service provider can provision payment processing software, payment processing hardware and/or payment processing services to merchants 1316, as described above, to enable the merchants 1316 to receive payments from the customers 1320 when conducting POS transactions with the customers 1320. For instance, the service provider can enable the merchants 1316 to receive cash payments, payment card payments, and/or electronic payments from customers 1320 for POS transactions and the service provider can process transactions on behalf of the merchants 1316.

As the service provider processes transactions on behalf of the merchants 1316, the service provider can maintain accounts or balances for the merchants 1316 in one or more ledgers. For example, the service provider can analyze transaction data received for a transaction to determine an amount of funds owed to a merchant 1316(A) for the transaction. In at least one example, such an amount can be a total purchase price less fees charged by the service provider for providing the payment processing services. Based on determining the amount of funds owed to the merchant 1316(A), the service provider can deposit funds into an account of the merchant 1316(A). The account can have a stored balance, which can be managed by the service provider. The account can be different from a conventional bank account at least because the stored balance is managed by a ledger of the service provider and the associated funds are accessible via various withdrawal channels including, but not limited to, scheduled deposit, same-day deposit, instant deposit, and a linked payment instrument.

A scheduled deposit can occur when the service provider transfers funds associated with a stored balance of the merchant 1316(A) to a bank account of the merchant 1316(A) that is held at a bank or other financial institution (e.g., associated with the server(s) 1310). Scheduled deposits can occur at a prearranged time after a POS transaction is funded, which can be a business day after the POS transaction occurred, or sooner or later. In some examples, the merchant 1316(A) can access funds prior to a scheduled deposit. For instance, the merchant 1316(A) may have access to same-day deposits (e.g., wherein the service provider deposits funds from the stored balance to a linked bank account of the merchant on a same day as POS transaction, in some examples prior to the POS transaction being funded) or instant deposits (e.g., wherein the service provider deposits funds from the stored balance to a linked bank account of the merchant on demand, such as responsive to a request). Further, in at least one example, the merchant 1316(A) can have a payment instrument that is linked to the stored balance that enables the merchant to access the funds without first transferring the funds from the account managed by the service provider to the bank account of the merchant 1316(A).

In at least one example, the service provider may provide inventory management services. That is, the service provider may provide inventory tracking and reporting. Inventory management services may enable the merchant 1316(A) to access and manage a database storing data associated with a quantity of each item that the merchant 1316(A) has available (i.e., an inventory). Furthermore, in at least one example, the service provider can provide catalog management services to enable the merchant 1316(A) to maintain a catalog, which can be a database storing data associated with items that the merchant 1316(A) has available for acquisition (i.e., catalog management services). In at least one example, the catalog may include a plurality of data items and a data item of the plurality of data items may represent an item that the merchant 1316(A) has available for acquisition. The service provider can offer recommendations related to pricing of the items, placement of items on the catalog, and multi-party fulfillment of the inventory.

In at least one example, the service provider can provide business banking services, which allow the merchant 1316(A) to track deposits (from payment processing and/or other sources of funds) into an account of the merchant 1316(A), payroll payments from the account (e.g., payments to employees of the merchant 1316(A)), payments to other merchants (e.g., business-to-business) directly from the account or from a linked debit card, withdrawals made via scheduled deposit and/or instant deposit, etc. Furthermore, the business banking services can enable the merchant 1316(A) to obtain a customized payment instrument (e.g., credit card), check how much money they are earning (e.g., via presentation of available earned balance), understand where their money is going (e.g., via deposit reports (which can include a breakdown of fees), spend reports, etc.), access/use earned money (e.g., via scheduled deposit, instant deposit, linked payment instrument, etc.), feel in control of their money (e.g., via management of deposit schedule, deposit speed, linked instruments, etc.), etc. Moreover, the business banking services can enable the merchants 1316 to visualize their cash flow to track their financial health, set aside money for upcoming obligations (e.g., savings), organize money around goals, etc.

In at least one example, the service provider can provide financing services and products, such as via business loans, consumer loans, fixed term loans, flexible term loans, and the like. In at least one example, the service provider can utilize one or more risk signals to determine whether to extend financing offers and/or terms associated with such financing offers.

In at least one example, the service provider can provide financing services for offering and/or lending a loan to a borrower that is to be used for, in some instances, financing the borrower's short-term operational needs (e.g., a capital loan). For instance, a potential borrower that is a merchant can obtain a capital loan via a capital loan product in order to finance various operational costs (e.g., rent, payroll, inventory, etc.). In at least one example, the service provider can offer different types of capital loan products. For instance, in at least one example, the service provider can offer a daily repayment loan product, wherein a capital loan is repaid daily, for instance, from a portion of transactions processed by the payment processing service on behalf of the borrower. Additionally and/or alternatively, the service provider can offer a monthly repayment loan product, wherein a capital loan is repaid monthly, for instance, via a debit from a bank account linked to the payment processing service. The credit risk of the merchant may be evaluated using risk models that take into account factors, such as payment volume, credit risk of similarly situated merchants, past transaction history, seasonality, credit history, and so on.

Additionally or alternatively, the service provider can provide financing services for offering and/or lending a loan to a borrower that is to be used for, in some instances, financing the borrower's consumer purchase (e.g., a consumer loan). In at least one example, a borrower can submit a request for a loan to enable the borrower to purchase an item from a merchant, which can be one of the merchants 1316. The service provider can generate the loan based at least in part on determining that the borrower purchased or intends to purchase the item from the merchant. The loan can be associated with a balance based on an actual purchase price of the item and the borrower can repay the loan over time. In some examples, the borrower can repay the loan via installments, which can be paid via funds managed and/or maintained by the service provider (e.g., from payments owed to the merchant from payments processed on behalf of the merchant, funds transferred to the merchant, etc.). The service provider can offer specific financial products, such as payment instruments, tied specifically to the loan products. For example, in one implementation, the service provider associates capital to a merchant or customer's debit card, where the use of the debit card is defined by the terms of the loan. In some examples, the merchant may only use the debit card for making specific purchases. In other examples, the "installment" associated with the loan product is credited directly via the payment instrument. The payment instrument is thus customized to the loan and/or the parties associated with the loan.

The service provider can provide web-development services, which enable users 1314 who are unfamiliar with HTML, XML, JavaScript, CSS, or other web design tools to create and maintain professional and aesthetically pleasing websites. Some of these web page editing applications allow users to build a web page and/or modify a web page (e.g., change, add, or remove content associated with a web page). Further, in addition to websites, the web-development services can create and maintain other online omni-channel presences, such as social media posts for example. In some examples, the resulting web page(s) and/or other content items can be used for offering item(s) for sale via an online/e-commerce platform. That is, the resulting web page(s) and/or other content items can be associated with an online store or offering by one or more of the merchants 1316. In at least one example, the service provider can recommend and/or generate content items to supplement omni-channel presences of the merchants 1316. That is, if a merchant of the merchants 1316 has a web page, the service provider-via the web-development or other services—can recommend and/or generate additional content items to be presented via other channel(s), such as social media, email, etc.

Furthermore, the service provider can provide payroll services to enable employers to pay employees for work performed on behalf of employers. In at least one example, the service provider can receive data that includes time worked by an employee (e.g., through imported timecards and/or POS interactions), sales made by the employee, gratuities received by the employee, and so forth. Based on such data, the service provider can make payroll payments to employee(s) on behalf of an employer via the payroll service, including using the decentralized network 104 to transfer digital instruments implemented by the blockchain network 102. For instance, the service provider can facilitate the transfer of a total amount to be paid out for the payroll of an employee from the bank of the employer to the bank of the service provider to be used to make payroll payments, or from a digital wallet of the employer to a digital wallet of the service provider to be used to make the payroll payments. In at least one example, when the funds have been received at the bank of the service provider, the service provider can pay the employee, such as by check or direct deposit, often a day, a week, or more after when the work was actually performed by the employee. In additional or alternative examples, the service provider can enable employee(s) to receive payments via same-day or instant deposit based at least in part on risk and/or reliability analyses performed by the service provider. Additionally or alternatively, the service provider can enable employee(s) to receive cryptocurrency payments (or other digital assets) to digital wallets, where the payments (or assets) are transferred to the employees via the decentralized network 104.

Moreover, in at least one example, the service provider can provide employee management services for managing schedules of employees. Further, the service provider can provide appointment services for enabling users 1314 to set schedules for scheduling appointments and/or users 1314 to schedule appointments.

In some examples, the service provider can provide restaurant management services to enable users 1314 to make and/or manage reservations, to monitor front-of-house and/or back-of-house operations, and so on. In such examples, the merchant device(s) 1308 and/or server(s) 1302 can be configured to communicate with one or more other computing devices, which can be located in the front-of-house (e.g., POS device(s)) and/or back-of-house (e.g., kitchen display system(s) (KDS)). In at least one example, the service provider can provide order management services and/or fulfillment services to enable restaurants to manage open tickets, split tickets, and so on and/or manage fulfillment services. In some examples, such services can be associated with restaurant merchants, as described above. In additional or alternative examples, such services can be any type of merchant.

In at least one example, the service provider can provide fulfilment services, which can use couriers for delivery, wherein couriers can travel between multiple locations to provide delivery services, photography services, etc. Couriers can be users 1314 who can travel between locations to perform services for a requesting user 1314 (e.g., deliver items, capture images, etc.). In some examples, the courier can receive compensation from the service provider. The courier can employ one or more vehicles, such as automobiles, bicycles, scooters, motorcycles, buses, airplanes, helicopters, boats, skateboards, etc. Although, in other instances the courier can travel by foot or otherwise without a vehicle. Some examples discussed herein enable people to participate as couriers in a type of crowdsourced service economy. Here, essentially any person with a mobile device is able to immediately become a courier, or cease to be a courier, in a courier network that provides services as described herein. In at least one example, the couriers can be unmanned aerial vehicles (e.g., drones), autonomous vehicles, or any other type of vehicle capable of receiving instructions for traveling between locations. In some examples, the service provider can receive requests for courier services, automatically assign the requests to active couriers, and communicate dispatch instructions to couriers via user interface (e.g., application, web browser, or other access point) presented via respective devices 1306.

In some examples, the service provider can provide omni-channel fulfillment services. For instance, if a customer places an order with a merchant and the merchant cannot fulfill the order because one or more items are out of stock or otherwise unavailable, the service provider can leverage other merchants and/or sales channels that are part of the platform of the service provider to fulfill the customer's order. That is, another merchant can provide the one or more items to fulfill the order of the customer. Furthermore, in some examples, another sales channel (e.g., online, brick-and-mortar, etc.) can be used to fulfill the order of the customer.

In some examples, the service provider can enable conversational commerce via conversational commerce services, which can use one or more machine learning mechanisms to analyze messages exchanged between two or more users 1314, voice inputs into a virtual assistant or the like, to determine intents of user(s) 1314. In some examples, the service provider can utilize determined intents to automate customer service, offer promotions, provide recommendations, or otherwise interact with customers in real-time. In at least one example, the service provider can integrate products and services, and payment mechanisms into a communication platform (e.g., messaging, etc.) to enable customers to make purchases, or otherwise transact, without having to call, email, or visit a web page or other channel of a merchant. That is, conversational commerce alleviates the need for customers to toggle back and forth between conversations and web pages to gather information and make purchases.

In at least one example, a user 1314 may be new to the service provider such that the user 1314 that has not registered (e.g., subscribed to receive access to one or more services offered by the service provider) with the service provider. The service provider can offer onboarding services for registering a potential user 1314 with the service provider. In some examples, onboarding can involve presenting various questions, prompts, and the like to a potential user 1314 to obtain information that can be used to generate a profile for the potential user 1314. In at least one example, the service provider can provide limited or short-term access to its services prior to, or during, onboarding (e.g., a user of a peer-to-peer payment service can transfer and/or receive funds prior to being fully onboarded, a merchant can process payments prior to being fully onboarded, etc.). In at least one example, responsive to the potential user 1314 providing all necessary information, the potential user 1314 can be onboarded to the service provider. In such an example, any limited or short-term access to services of the service provider can be transitioned to more permissive (e.g., less limited) or longer-term access to such services.

The service provider can be associated with IDV services, which can be used by the service provider for compliance purposes and/or can be offered as a service, for instance to third-party service providers (e.g., associated with the server(s) 1310). That is, the service provider can offer IDV services to verify the identity of users 1314 seeking to use or using their services. Identity verification requires a customer (or potential customer) to provide information that is used by compliance departments to prove that the information is associated with an identity of a real person or entity. In at least one example, the service provider can perform services for determining whether identifying information provided by a user 1314 accurately identifies the customer (or potential customer) (i.e., Is the customer who they say they are?).

The service provider is capable of providing additional or alternative services and the services described above are offered as a sampling of services. In at least one example, the service provider can exchange data with the server(s) 1310 associated with third-party service providers. Such third-party service providers can provide information that enables the service provider to provide services, such as those described above. In additional or alternative examples, such third-party service providers can access services of the service provider. That is, in some examples, the third-party service providers can be subscribers, or otherwise access, services of the service provider.

Techniques described herein can be configured to operate in both real-time/online and offline modes. "Online" modes refer to modes when devices are capable of communicating with the service provider (e.g., the server(s) 1302) and/or the server(s) 1310 via the network(s) 1304. In some examples, the merchant device(s) 1308 are not capable of connecting with the service provider (e.g., the server(s) 1302) and/or the server(s) 1310, due to a network connectivity issue, for example. In additional or alternative examples, the server(s) 1302 are not capable of communicating with the server(s) 1310 due to network connectivity issue, for example. In such examples, devices may operate in "offline" mode where at least some payment data is stored (e.g., on the merchant device(s) 1308) and/or the server(s) 1302 until connectivity is restored and the payment data can be transmitted to the server(s) 1302 and/or the server(s) 1310 for processing.

In at least one example, the service provider can be associated with a hub, such as an order hub, an inventory hub, a fulfillment hub and so on, which can enable integration with one or more additional service providers (e.g., associated with the additional server(s) 1310). In some examples, such additional service providers can offer additional or alternative services and the service provider can provide an interface or other computer-readable instructions to integrate functionality of the service provider into the one or more additional service providers.

Techniques described herein are directed to services provided via a distributed system of user devices 1306 that are in communication with server(s) 1302 of the service provider. That is, techniques described herein are directed to a specific implementation—or a practical application—of utilizing a distributed system of user devices 1306 that are in communication with server(s) 1302 of the service provider to perform a variety of services, as described above. The unconventional configuration of the distributed system described herein enables the server(s) 1302 that are remotely-located from end-users (e.g., users 1314) to intelligently offer services based on aggregated data associated with the end-users, such as the users 1314 (e.g., data associated with multiple, different merchants and/or multiple, different buyers), in some examples, in near-real time. Accordingly, techniques described herein are directed to a particular arrangement of elements that offer technical improvements over conventional techniques for performing payment processing services and the like. For small business owners in particular, the business environment is typically fragmented and relies on unrelated tools and programs, making it difficult for an owner to manually consolidate and view such data. The techniques described herein continuously or periodically monitor disparate and distinct merchant accounts, e.g., accounts within the control of the service provider, and those outside of the control of the service provider, to track the business standing (payables, receivables, payroll, invoices, appointments, capital, etc.) of the merchants. The techniques herein provide a consolidated view of a merchant's cash flow, predict needs, preemptively offer recommendations or services, such as capital, coupons, etc., and/or enable money movement between disparate accounts (a merchant's, another merchant's, or even payment service's) in a frictionless and transparent manner.

As described herein, artificial intelligence, machine learning, and the like can be used to dynamically make determinations, recommendations, and the like, thereby adding intelligence and context-awareness to an otherwise one-size-fits-all scheme for providing payment processing services and/or additional or alternative services described herein. In some implementations, the distributed system is capable of applying the intelligence derived from an existing user base to a new user, thereby making the onboarding experience for the new user personalized and frictionless when compared to traditional onboarding methods. Thus, techniques described herein improve existing technological processes.

As described above, various graphical user interfaces (GUIs) can be presented to facilitate techniques described herein. Some of the techniques described herein are directed to user interface features presented via GUIs to improve interaction between users 1314 and user devices 1306. Furthermore, such features are changed dynamically based on the profiles of the users involved interacting with the GUIs. As such, techniques described herein are directed to improvements to computing systems.

Figure 14:
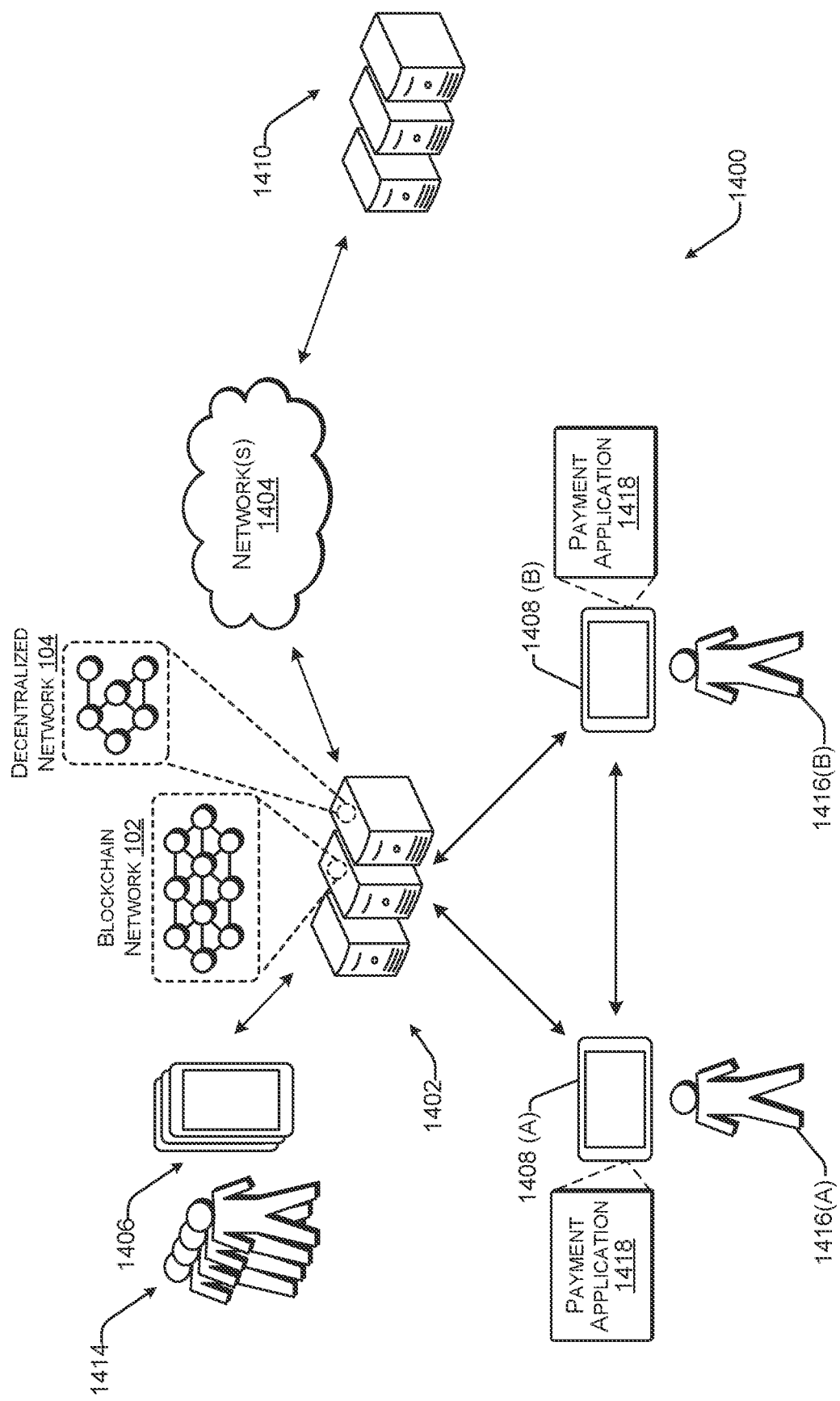
FIG. 14 illustrates an example environment with which techniques described herein can be implemented, according to an embodiment described herein.

FIG. 14 illustrates an example environment 1400. The environment 1400 includes server(s) 1402 that can communicate over a network 1404 with user devices 1406 (which, in some examples can be user devices 1408 (individually, 1408(A), 1408(B)) and/or server(s) 1410 associated with third-party service provider(s). The server(s) 1402 can be associated with a service provider that can provide one or more services for the benefit of users 1414, as described below. Actions attributed to the service provider can be performed by the server(s) 1402. In some examples, the service provider referenced in FIG. 13 can be the same as or different than the service provider referenced in FIG. 14.

In the context of previously described figures, for example, at least a portion of the server(s) 1402 and/or the server(s) 1410 may be used to implement one or more of the blockchain nodes of the blockchain network 102, such as the blockchain node 110. Alternatively or in addition, at least a portion of the server(s) 1402 and/or the server(s) 1410 may be used to implement nodes of the decentralized network 104, such as to implement the node 112. By way of example, the server(s) 1402 and/or the server(s) 1410 may be used to implement nodes of the decentralized network 104 in scenarios where a corresponding service provider has an interest in propagating use of the decentralized network 104 among its users. For instance, service providers that facilitate the use and/or transfer of digital assets implemented using the blockchain 124 (e.g., with a computing application, plugin, extension, etc.), may have an interest in propagating use of the decentralized network 104 and thus use their resources (e.g., server(s) 1402 or the server(s) 1410) to run nodes. Accordingly, the node operator 138 may be implemented using one or more of the server(s) 1402 and/or the server(s) 1410, e.g., to optimize routing within the decentralized network on behalf of the respective service provider.

The environment 1400 can include a plurality of user devices 1406, as described above. By way of example, the client device 106 and the client device 108 are example of the user devices 1406. Each one of the plurality of user devices 1406 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. In some examples, individual ones of the user devices can be operable by users 1414. The users 1414 can be referred to as customers, buyers, merchants, sellers, borrowers, employees, employers, payors, payees, couriers and so on. The users 1414 can interact with the user devices 1406 via user interfaces presented via the user devices 1406. In the context of FIG. 2, for example, the users 1414 can interact with the client device 106 and the client device 108 (e.g., examples of the user devices 1406) via the user interface 202 and the user interface 204, respectively. In at least one example, a user interface can be presented via a web browser, or the like. In other examples, a user interface can be presented via an application, such as a mobile application or desktop application, which can be provided by the service provider or which can be an otherwise dedicated application. In some examples, individual of the user devices 1406 can have an instance or versioned instance of an application, which can be downloaded from an application store, for example, which can present the user interface(s) described herein. In at least one example, a user 1414 can interact with the user interface via touch input, spoken input, or any other type of input.

In at least one example, the service provider can provide a peer-to-peer payment service that enables peer-to-peer payments between two or more users 1414. Two users, user 1416(A) and user 1416(B) are illustrated in FIG. 14 as "peers" in a peer-to-peer payment. In the context of FIG. 2, for instance, user 1416(A) and user 1416(B) may correspond to users 1414 operating the client device 106 and the client device 108 to execute the payment indicated in the user interface 202 and the user interface 204. In at least one example, the service provider can communicate with instances of a payment application 1418 (or other access point) installed on devices 1406 configured for operation by users 1414. Referring again to the example depicted in FIG. 2, in at least one variation, the user interface 202 and the user interface 204 are generated and displayed by instances of the payment application 1418 installed on the client device 106 and the client device 108. In another example, an instance of the payment application 1418 executing on a first device 1408(A) (e.g., the client device 106) operated by a payor (e.g., user 1416(A)) can send a request to the service provider to transfer an asset (e.g., fiat currency, non-fiat currency, digital assets, cryptocurrency, securities, gift cards, and/or related assets) from the payor to a payee (e.g., user 1416(B)) via a peer-to-peer payment. In some examples, assets associated with an account of the payor are transferred to an account of the payee, and an instance of the payment application 1418 executing on a second device 1408(B) (e.g., the client device 108) operated by the payee (e.g., user 1416(B)) can display a control to accept the transaction and/or a notification that the transaction was executed. In some examples, assets can be held at least temporarily in an account of the service provider prior to transferring the assets to the account of the payee.

In some examples, the service provider can utilize a ledger system to track transfers of assets between users 1414. FIG. 15, below, provides additional details associated with such a ledger system. The ledger system can enable users 1414 to own fractional shares of assets that are not conventionally available. For instance, a user can own a fraction of a Bitcoin or a stock. Additional details are described herein.

In at least one example, the service provider can facilitate transfers and can send notifications related thereto to instances of the payment application 1418 executing on user device(s) of payee(s). As an example, the service provider can transfer assets from an account of user 1416(A) to an account of the user 1416(B) and can send a notification to the user device 1408(B) of the user 1416(B) for presentation via a user interface. The notification can indicate that a transfer is in process, a transfer is complete, or the like. In some examples, the service provider can send additional or alternative information to the instances of the payment application 1418 (e.g., low balance to the payor, current balance to the payor or the payee, etc.). In some examples, the payor and/or payee can be identified automatically, e.g., based on context, proximity, prior transaction history, and so on. In other examples, the payee can send a request for funds to the payor prior to the payor initiating the transfer of funds. In some embodiments, the service provider funds the request to payee on behalf of the payor, to speed up the transfer process and compensate for any lags that may be attributed to the payor's financial network.

In some examples, the service provider can trigger the peer-to-peer payment process through identification of a "payment proxy" having a particular syntax. For example, the syntax can include a monetary currency indicator prefixing one or more alphanumeric characters (e.g., $Cash). The currency indicator operates as the tagging mechanism that indicates to the server(s) 1402 to treat the inputs as a request from the payor to transfer assets, where detection of the syntax triggers a transfer of assets. The currency indicator can correspond to various currencies including but not limited to, dollar ($), euro (€), pound (£), rupee (₹), yuan (¥), etc. Although use of the dollar currency indicator ($) is used herein, it is to be understood that any currency symbol could equally be used. In some examples, additional or alternative identifiers can be used to trigger the peer-to-peer payment process. For instance, email, telephone number, social media handles, and/or the like can be used to trigger and/or identify users of a peer-to-peer payment process.

In some examples, the peer-to-peer payment process can be initiated through instances of the payment application 1418 executing on the user devices 1406. In at least some embodiments, the peer-to-peer process can be implemented within a landing page associated with a user and/or an identifier of a user. The term "landing page," as used here, refers to a virtual location identified by a personalized location address that is dedicated to collect payments on behalf of a recipient associated with the personalized location address. The personalized location address that identifies the landing page can include a payment proxy discussed above. The service provider can generate the landing page to enable the recipient to conveniently receive one or more payments from one or more senders. In some examples, the personalized location address identifying the landing page can be a uniform resource locator (URL) that incorporates the payment proxy. In such examples, the landing page can be a web page, e.g., www.cash.me/$Cash.

In some examples, the peer-to-peer payment process can be implemented within a forum. The term "forum," as used here, refers to a content provider's media channel (e.g., a social networking platform, a microblog, a blog, video sharing platform, a music sharing platform, etc.) that enables user interaction and engagement through comments, posts, messages on electronic bulletin boards, messages on a social networking platform, and/or any other types of messages. In some examples, the content provider can be the service provider as described with reference to FIG. 14 or a third-party service provider associated with the server(s) 1410. In examples where the content provider is a third-party service provider, the server(s) 1410 can be accessible via one or more APIs or other integrations. The forum can be employed by a content provider to enable users of the forum to interact with one another (e.g., through creating messages, posting comments, etc.). In some examples, "forum" may also refer to an application or webpage of an e-commerce or retail organization that offers products and/or services. Such websites can provide an online "form" to complete before or after the products or services are added to a virtual cart. The online form may include one or more fields to receive user interaction and engagement. Examples include name and other identification of the user, shipping address of the user, etc. Some of these fields may be configured to receive payment information, such as a payment proxy, in lieu of other kinds of payment mechanisms, such as credit cards, debit cards, prepaid cards, gift cards, virtual wallets, etc.

In some embodiments, the peer-to-peer process can be implemented within a communication application, such as a messaging application. The term "messaging application," as used here, refers to any messaging application that enables communication between users (e.g., sender and recipient of a message) over a wired or wireless communications network, through use of a communication message. The messaging application can be employed by the service provider referenced in FIG. 14. For instance, the service provider can offer messaging services that provide a communication service to users via a messaging application (e.g., chat or messaging capability). The messaging application can include, for example, a text messaging application for communication between phones (e.g., conventional mobile telephones or smartphones), or a cross-platform instant messaging application for smartphones and phones that use the Internet for communication. The messaging application can be executed on a user device 1406 (e.g., mobile device or conventional personal computer (PC)) based on instructions transmitted to and from the server(s) 1402 (which, in such an example can be called a "messaging server"). In some instances, the messaging application can include a payment application with messaging capability that enables users of the payment application to communicate with one another. In such instances, the payment application can be executed on a user device 1406 based on instructions transmitted to and from the server(s) 1402 (e.g., the payment service discussed in this description or another payment service that supports payment transactions). In some examples, the messaging application can be provided by a third-party service provider associated with the server(s) 1410. In examples where the messaging application is a third-party service provider, the server(s) 1410 can be accessible via one or more APIs or other integrations.

As described above, the service provider can facilitate peer-to-peer transactions, which can enable users 1414 to transfer fiat currency, non-fiat currency, cryptocurrency, securities, or other assets, or portions thereof, to other users 1414. In at least one example, individual users can be associated with user accounts. Additional details associated with user accounts and the transfer of assets between users 1414 are described below with reference to FIG. 15.

Furthermore, the service provider of FIG. 14 can enable users 1414 to perform banking transactions via instances of the payment application 1418. For example, users can configure direct deposits or other deposits for adding assets to their various ledgers/balances. Further, users 1414 can configure bill pay, recurring payments, and/or the like using assets associated with their accounts. In addition to sending and/or receiving assets via peer-to-peer transactions, users 1414 buy and/or sell assets via asset networks such as cryptocurrency networks, securities networks, and/or the like.

FIG. 15 illustrates example data store(s) 1500 that can be associated with the server(s) 1402.

In at least one example, the data store(s) 1500 can store assets in an asset storage 1502, as well as data in user account(s) 1504. In some examples, user account(s) 1504 can include merchant account(s) and/or customer account(s). In at least one example, the asset storage 1502 can be used to store assets managed by the service provider of FIG. 14. In at least one example, the asset storage 1502 can be used to record whether individual of the assets are registered to users. For example, the asset storage 1502 can include an asset wallet 1506 for storing records of assets owned by the service provider of FIG. 14, such as cryptocurrency, tokens (e.g., NFTs), digital content (e.g., music, videos, images, etc.), securities, or the like, and communicating with one or more asset networks, such as cryptocurrency networks, token networks, content exchange networks, securities networks, or the like. In some examples, the asset network can be a first-party network or a third-party network, such as a cryptocurrency exchange, an NFT exchange, or the stock market. In examples where the asset network is a third-party network, the server(s) 1410 can be associated therewith. In some examples, the asset wallet 1506 can communicate with the asset network via one or more components associated with the server(s) 1402.

The asset wallet 1506 can be associated with one or more addresses and can vary addresses used to acquire assets (e.g., from the asset network(s)) so that its holdings are represented under a variety of addresses on the asset network. In examples where the service provider of FIG. 14 has its own holdings of cryptocurrency (e.g., in the asset wallet 1506), a user can acquire cryptocurrency directly from the service provider of FIG. 14. In some examples, the service provider of FIG. 14 can include logic for buying and selling cryptocurrency to maintain a desired level of cryptocurrency. In some examples, the desired level can be based on a volume of transactions over a period of time, balances of collective cryptocurrency ledgers, exchange rates, or trends in changing of exchange rates such that the cryptocurrency is trending towards gaining or losing value with respect to the fiat currency. In these various scenarios, the buying and selling of cryptocurrency, and therefore the associated updating of the public ledger of the asset network can be separate from any customer-merchant transaction or peer-to-peer transaction, and therefore not necessarily time-sensitive. This can enable batching transactions to reduce computational resources and/or costs. The service provider can provide the same or similar functionality for securities or other assets.

The asset storage 1502 may contain ledgers that store records of assignments of assets to users 1414. Specifically, the asset storage 1502 may include asset wallet 1506, asset ledger 1508, fiat currency ledger 1510, and other ledger(s) 1512, which can be used to record transfers of assets between users 1414 of the service provider and/or one or more third-parties (e.g., merchant network(s), payment card network(s), ACH network(s), equities network(s), the asset network, securities networks, content licensing and distributing network(s), etc.). In doing so, the asset storage 1502 can maintain a running balance of assets managed by the service provider of FIG. 14. The ledger(s) of the asset storage 1502 can further indicate some of the running balance for each of the ledger(s) stored in the asset storage 1502 is assigned or registered to one or more user account(s) 1504.

In at least one example, the asset storage 1502 can include transaction logs 1514, which can include records of past transactions involving the service provider of FIG. 14. In at least one example, transaction data, as described herein, can be stored in association with the transaction logs 1514.

In some examples, the data store(s) 1500 can store a private blockchain 1516. A private blockchain 1516 can function to record sender addresses, recipient addresses, public keys, values of cryptocurrency transferred, and/or can be used to verify ownership of cryptocurrency tokens to be transferred. In some examples, the service provider of FIG. 14 can record transactions taking place within the service provider of FIG. 14 involving cryptocurrency until the number of transactions has exceeded a determined limit (e.g., number of transactions, storage space allocation, etc.). Based at least in part on determining that the limit has been reached, the service provider of FIG. 14 can publish the transactions in the private blockchain 1516 to a public blockchain (e.g., associated with the asset network), where miners can verify the transactions and record the transactions to blocks on the public blockchain. In at least one example, the service provider of FIG. 14 can participate as miner(s) at least for its transactions to be posted to the public blockchain.

In at least one example, the data store(s) 1500 can store and/or manage accounts, such as user account(s) 1504, merchant account(s), and/or customer account(s). In at least one example, the user account(s) 1504 may store records of user accounts associated with the users 1414. In at least one example, the user account(s) 1504 can include a user account 1518, which can be associated with a user (of the users 1414). Other user accounts of the user account(s) 1504 can be similarly structured to the user account 1518, according to some examples. In other examples, other user accounts may include more or less data and/or account information than that provided by the user account 1518. In at least one example, the user account 1518 can include user account data 1520, which can include, but is not limited to, data associated with user identifying information (e.g., name, phone number, address, etc.), user identifier(s) (e.g., alphanumeric identifiers, etc.), user preferences (e.g., learned or user-specified), purchase history data (e.g., identifying one or more items purchased (and respective item information), linked payment sources (e.g., bank account(s), stored balance(s), etc.), payment assets used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, user service data, loyalty data (e.g., loyalty account numbers, rewards redeemed, rewards available, etc.), risk indicator(s) (e.g., level(s) of risk), etc.

In at least one example, the user account data 1520 can include account activity 1522 and user wallet key(s) 1524. The account activity 1522 may include a transaction log for recording transactions associated with the user account 1518. In some examples, the user wallet key(s) 1524 can include a public-private key-pair and a respective address associated with the asset network or other asset networks. In some examples, the user wallet key(s) 1524 may include one or more key pairs, which can be unique to the asset network or other asset networks.

In addition to the user account data 1520, the user account 1518 can include ledger(s) for account(s) managed by the service provider of FIG. 14, for the user. For example, the user account 1518 may include an asset ledger 1526, a fiat currency ledger 1528, and/or one or more other ledgers 1530. The ledger(s) can indicate that a corresponding user utilizes the service provider of FIG. 14 to manage corresponding accounts (e.g., a cryptocurrency account, a securities account, a fiat currency account, etc.). It should be noted that in some examples, the ledger(s) can be logical ledger(s) and the data can be represented in a single database. In some examples, individual of the ledger(s), or portions thereof, can be maintained by the service provider of FIG. 14.

In some examples, the asset ledger 1526 can store a balance for each of one or more cryptocurrencies (e.g., Bitcoin, Ethereum, Litecoin, etc.) registered to the user account 1518. In at least one example, the asset ledger 1526 can further record transactions of cryptocurrency assets associated with the user account 1518. For example, the user account 1518 can receive cryptocurrency from the asset network or via the decentralized network 104 using the user wallet key(s) 1524. In some examples, the user wallet key(s) 1524 may be generated for the user upon request. User wallet key(s) 1524 can be requested by the user in order to send, exchange, or otherwise control the balance of cryptocurrency held by the service provider of FIG. 14 (e.g., in the asset wallet 1506) and registered to the user. The asset ledger 1526 can further record transactions of other digital assets associated with the user account 1518 that are transferrable using the decentralized network 104, and the user account 1518 can receive such assets from the asset network or via the decentralized network 104 using the user wallet key(s) 1524. In some examples, the user wallet key(s) 1524 may not be generated until a user account requires such. This on-the-fly wallet key generation provides enhanced security features for users, reducing the number of access points to a user account's balance and, therefore, limiting exposure to external threats.

Each account ledger can reflect a positive balance when funds are added to the corresponding account. An account can be funded by transferring currency in the form associated with the account from an external account (e.g., transferring a value of cryptocurrency to the service provider of FIG. 14 and the value is credited as a balance in asset ledger 1526), by purchasing currency in the form associated with the account using currency in a different form (e.g., buying a value of cryptocurrency from the service provider of FIG. 14 using a value of fiat currency reflected in fiat currency ledger 1528, and crediting the value of cryptocurrency in asset ledger 1526), or by conducting a transaction with another user (customer or merchant) of the service provider of FIG. 14 wherein the account receives incoming currency (which can be in the form associated with the account or a different form, in which the incoming currency may be converted to the form associated with the account). In some examples, the user account data 1520 can include preferences for maintaining balances of individual of the ledgers. For example, the service provider of FIG. 14 can automatically debit the fiat currency ledger 1528 to increase the asset ledger 1526, or another account associated with the user whenever the cryptocurrency balance (e.g., of the asset ledger 1526) falls below a stated level (e.g., a threshold). Conversely, in some embodiments, the service provider of FIG. 14 can automatically credit the fiat currency ledger 1528 to decrease the asset ledger 1526 whenever cryptocurrency balance rises above a stated level (e.g., a threshold). In some examples, automatic transactions can be further defined by an exchange rate between the cryptocurrency and the fiat currency such that transactions to buy or sell cryptocurrency can occur when exchange rates are favorable.

With specific reference to funding a cryptocurrency account, a user may have a balance of cryptocurrency stored in another cryptocurrency wallet. In some examples, the other cryptocurrency wallet can be associated with a third-party unrelated to the service provider of FIG. 14 (i.e., an external account). In at least one example, the user can transfer all or a portion of a balance of the cryptocurrency stored in the third-party cryptocurrency wallet to the service provider of FIG. 14. Such a transaction can require the user to transfer an amount of the cryptocurrency in a message signed by user's private key to an address provided by the service provider of FIG. 14. In at least one example, the transaction can be sent to miners to bundle the transaction into a block of transactions (e.g., of the blocks 130) and to verify the authenticity of the transactions in the block. Once a miner has verified the block, the block is written to a public, distributed blockchain (e.g., blockchain 124) where the service provider of FIG. 14 can then verify that the transaction has been confirmed and can credit the user's asset ledger 1526 with the transferred amount. When an account is funded by transferring cryptocurrency from a third-party cryptocurrency wallet, an update can be made to the public blockchain. Importantly, this update of the public blockchain need not take place at a time critical moment, such as when a transaction is being processed by a merchant in store or online.

In some examples, a user can purchase cryptocurrency to fund their cryptocurrency account. In some examples, the user can purchase cryptocurrency through services offered by the service provider of FIG. 14. As described above, in some examples, the service provider of FIG. 14 can acquire cryptocurrency from a third-party source. In such examples, the asset wallet 1506 can be associated with different addresses and can vary addresses used to acquire cryptocurrency so that its holdings are represented under a variety of addresses on a blockchain. When the service provider of FIG. 14 has their own holdings of cryptocurrency, users can acquire cryptocurrency directly from the service provider of FIG. 14. In some examples, the service provider of FIG. 14 can include logic for buying and selling cryptocurrency in order to maintain a desired level of cryptocurrency. The desired level can be based on a volume of transactions over a period, balances of collective user profiles' cryptocurrency ledgers, exchange rates, or trends in changing of exchange rates such that the cryptocurrency is trending towards gaining or losing value with respect to the fiat currency. In the various examples, the buying and selling of cryptocurrency, and therefore the associated updating of the public ledger can be separate from any customer-merchant transaction, and therefore not necessarily time-sensitive.

In examples where the service provider of FIG. 14 has its own cryptocurrency assets, cryptocurrency transferred in a transaction (e.g., data with address provided for receipt of transaction and a balance of cryptocurrency transferred in the transaction) can be stored in the asset wallet 1506. In at least one example, the service provider of FIG. 14 can credit the asset ledger 1526 of the user. Additionally, while the service provider of FIG. 14 recognizes that the user retains the value of the transferred cryptocurrency through crediting the asset ledger 1526, any person that inspects the blockchain will see the cryptocurrency as having been transferred to the service provider of FIG. 14. In some examples, the asset wallet 1506 can be associated with many different addresses. In such examples, any person that inspects the blockchain may not easily associate all cryptocurrency stored in asset wallet 1506 as belonging to the same entity. It is this presence of a private ledger that is used for real-time transactions and maintained by the service provider of FIG. 14, combined with updates to the public ledger at other times, that allows for extremely fast transactions using cryptocurrency to be achieved. In some examples, the "private ledger" can refer to the asset ledger 1508, which in some examples, can utilize the private blockchain 1516, as described herein. The "public ledger" can correspond to a public blockchain associated with the asset network. In accordance with the techniques described herein, the blockchain 124 may correspond to the private blockchain 1516 or a public blockchain associated with the asset network.

In at least one example, a user's asset ledger 1526, fiat currency ledger 1528, or the like can be credited when conducting a transaction with another user (customer or merchant) wherein the user receives incoming currency. In some examples, a user can receive cryptocurrency in the form of payment for a transaction with another user. In at least one example, such cryptocurrency can be used to fund the asset ledger 1526. In some examples, a user can receive fiat currency or another currency in the form of payment for a transaction with another user. In at least one example, at least a portion of such funds can be converted into cryptocurrency by the service provider of FIG. 14 and used to fund the asset ledger 1526 of the user.

As addressed above, in some examples, users can also have other accounts maintained by the service provider of FIG. 14. For example, a user can also have an account in U.S. dollars, which can be tracked, for example, via the fiat currency ledger 1528. Such an account can be funded by transferring money from a bank account at a third-party bank to an account maintained by the service provider of FIG. 14 as is conventionally known. In some examples, a user can receive fiat currency in the form of payment for a transaction with another user. In such examples, at least a portion of such funds can be used to fund the fiat currency ledger 1528.

In some examples, a user can have one or more internal payment cards registered with the service provider of FIG. 14. Internal payment cards can be linked to one or more of the accounts associated with the user account 1518. In some embodiments, options with respect to internal payment cards can be adjusted and managed using an application (e.g., the payment application 1418).

In at least one example, as described above, each ledger can correspond to an account of the user that is managed by the service provider of FIG. 14. In at least one example, individual of the accounts can be associated with a wallet or a stored balance for use in payment transactions, peer-to-peer transactions, payroll payments, etc.

In at least one example, the user account 1518 can be associated with an asset wallet 1532. The asset wallet 1532 of the user can be associated with account information that can be stored in the user account data 1520 and, in some examples, can be associated with the user wallet key(s) 1524. In at least one example, the asset wallet 1532 can store data indicating an address provided for receipt of a cryptocurrency transaction, a blockchain token-based transaction, or a transaction for another digital asset implemented using the blockchain 124, to name just a few. In at least one example, the balance of the asset wallet 1532 can be based at least in part on a balance of the asset ledger 1526. In at least one example, funds availed via the asset wallet 1532 can be stored in the asset wallet 1532 or the asset wallet 1506. Funds availed via the asset wallet 1506 can be tracked via the asset ledger 1526. The asset wallet 1532, however, can be associated with additional cryptocurrency funds and other digital assets.

In at least one example, when the service provider of FIG. 14 includes a private blockchain 1516 for recording and validating cryptocurrency transactions, the asset wallet 1532 can be used instead of, or in addition to, the asset ledger 1526. For example, at least one example, a merchant can provide the address of the asset wallet 1532 for receiving payments. In an example where a customer is paying in cryptocurrency and the customer has their own cryptocurrency wallet account associated with the service provider of FIG. 14, the customer can send a message signed by its private key including its wallet address (i.e., of the customer) and identifying the cryptocurrency and value to be transferred to the merchant's asset wallet 1532. The service provider of FIG. 14 can complete the transaction by reducing the cryptocurrency balance in the customer's cryptocurrency wallet and increasing the cryptocurrency balance in the merchant's asset wallet 1532. In addition to recording the transaction in the respective cryptocurrency wallets, the transaction can be recorded in the private blockchain 1516, and the transaction can be confirmed. A user can perform a similar transaction with cryptocurrency in a peer-to-peer transaction as described above. In at least one example, the cryptocurrency wallet account can be funded by a balance transfer from a third-party cryptocurrency wallet, as described above. Such a transaction can require a user to transfer an amount of cryptocurrency in a message signed by the user's private key to an address of the cryptocurrency wallet account. The transferred amount of cryptocurrency can then be within the cryptocurrency wallet account for use in later transactions.

While the asset ledger 1526 and/or asset wallet 1532 are each described above with reference to cryptocurrency, the asset ledger 1526 and/or asset wallet 1532 can alternatively be used in association with securities and other digital assets, such as tokens (e.g., NFTs), smart contracts, and so forth. In some examples, different ledgers and/or wallets can be used for different types of assets. That is, in some examples, a user can have multiple asset ledgers and/or asset wallets for tracking cryptocurrency, securities, tokens (e.g., NFTs), smart contracts, or the like.

It should be noted that user(s) having accounts managed by the service provider of FIG. 14 is an aspect of the technology disclosed that enables technical advantages of increased processing speed and improved security.

Figure 16:
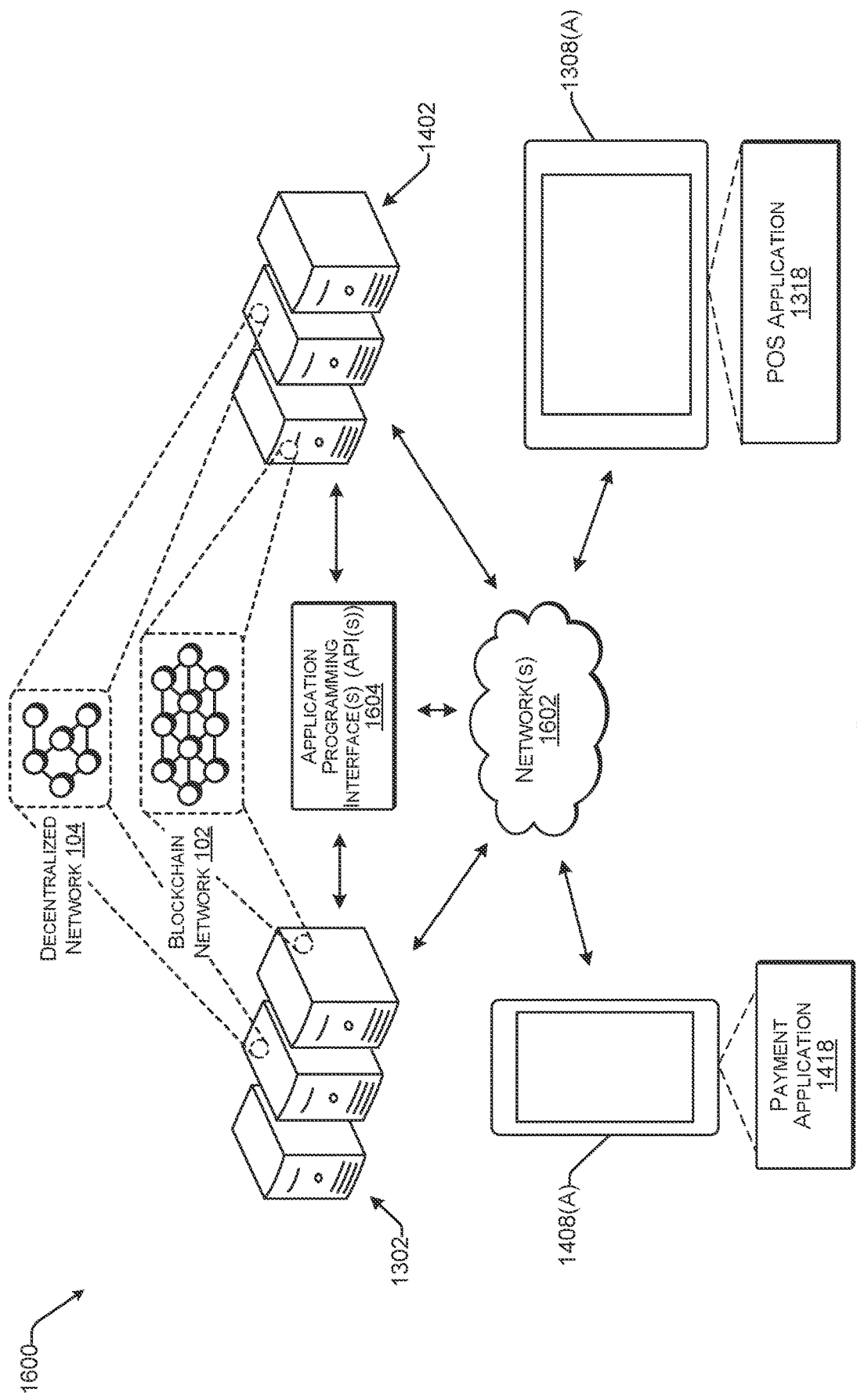
FIG. 16 illustrates an example environment in which the environments of FIGS. 13 and 14 can be integrated to enable payments at the point-of-sale using assets associated with user accounts in the peer-to-peer environment of FIG. 14 with which techniques described herein can be implemented, according to an embodiment described herein.

FIG. 16 illustrates an example environment 1600 wherein the environment 1300 and the environment 1400 can be integrated to enable payments at the point-of-sale using assets associated with user accounts in the peer-to-peer environment of FIG. 14. As illustrated, each of the components can communicate with one another via one or more networks 1602. In some examples, one or more APIs 1604 or other functional components can be used to facilitate such communication.

In at least one example, the example environment 1600 can enable contactless payments, via integration of peer-to-peer payment, or other payment making, platform(s) and payment processing platform(s), are described herein. For the purpose of FIG. 16, the environment 1300 can refer to a payment processing platform and the environment 1400 can refer to a peer-to-peer payment, or payment making, platform. In an example, such an integration can enable a customer to participate in a transaction via their own computing device instead of interacting with a merchant device of a merchant, such as the merchant device 1308(A). In such an example, the POS application 1318, associated with a payment processing platform and executable by the merchant device 1308(A) of the merchant, can present a Quick Response (QR) code, or other code that can be used to identify a transaction (e.g., a transaction code), in association with a transaction between the customer and the merchant. The QR code, or other transaction code, can be provided to the POS application 1318 via an API associated with the peer-to-peer payment platform. In an example, the customer can utilize their own computing device, such as the user device 1408(A), to capture the QR code, or the other transaction code, and to provide an indication of the captured QR code, or other transaction code, to server(s) 1302 and/or server(s) 1402.

Based at least in part on the integration of the peer-to-peer payment platform and the payment processing platform (e.g., via the API), the server(s) 1302 and/or 1402 associated with each can exchange communications with each other—and with a payment application 1418 associated with the peer-to-peer payment platform and/or the POS application 1318—to process payment for the transaction using a peer-to-peer payment where the customer is a first "peer" and the merchant is a second "peer." In at least one example, the peer-to-peer payment platform can transfer funds from an account of the customer, maintained by the peer-to-peer payment platform, to an account of the merchant, maintained by the payment processing platform, thereby facilitating a contactless (peer-to-peer) payment for the transaction. That is, based at least in part on receiving an indication of which payment method a user (e.g., customer or merchant) intends to use for a transaction, techniques described herein utilize an integration between a peer-to-peer payment platform and payment processing platform (which can be a first- or third-party integration) such that a QR code, or other transaction code, specific to the transaction can be used for providing transaction details, location details, customer details, or the like to a computing device of the customer, such as the user device 1408(A), to enable a contactless (peer-to-peer) payment for the transaction.

In at least one example, techniques described herein can offer improvements to conventional payment technologies at both brick-and-mortar points of sale and online points of sale. For example, at brick-and-mortar points of sale, techniques described herein can enable customers to "scan to pay," by using their computing devices to scan QR codes, or other transaction codes, encoded with data as described herein, to remit payments for transactions. In such a "scan to pay" example, a customer computing device, such as the user device 1408(A), can be specially configured as a buyer-facing device that can enable the customer to view cart building in near real-time, interact with a transaction during cart building using the customer computing device, authorize payment via the customer computing device, apply coupons or other incentives via the customer computing device, add gratuity, loyalty information, feedback, or the like via the customer computing device, etc. In another example, merchants can "scan for payment" such that a customer can present a QR code, or other transaction code, that can be linked to a payment instrument or stored balance. Funds associated with the payment instrument or stored balance can be used for payment of a transaction.

As described above, techniques described herein can offer improvements to conventional payment technologies at online points of sale, as well as brick-and-mortar points of sale. For example, multiple applications can be used in combination during checkout. That is, the POS application 1318 and the payment application 1418, as described herein, can process a payment transaction by routing information input via the merchant application to the payment application for completing a "frictionless" payment. This can be referred to as "in-application payment." In another example of "in-application payment," the payment application described herein can be created or modified via a software developer kit (SDK) to enable in-application payment.

Returning to the "scan to pay" examples described herein, QR codes, or other transaction codes, can be presented in association with a merchant web page or ecommerce web page. In at least one example, techniques described herein can enable customers to "scan to pay," by using their computing devices to scan or otherwise capture QR codes, or other transaction codes, encoded with data, as described herein, to remit payments for online/ecommerce transactions. In such a "scan to pay" example, a customer computing device, such as the user device 1408(A), can be specially configured as a buyer-facing device that can enable the customer to view cart building in near real-time, interact with a transaction during cart building using the customer computing device, authorize payment via the customer computing device, apply coupons or other incentives via the customer computing device, add gratuity, loyalty information, feedback, or the like via the customer computing device, etc.

In an example, a customer can desire to purchase items from a merchant. When the customer approaches the merchant to check out, the merchant (e.g., a worker associated therewith) can add indications of the items to a virtual cart via the POS application 1318, associated with a payment processing platform, on the merchant device 1308(A). In an example, the merchant can use the payment processing platform to process payments, and the payment processing platform can process payments for the merchant, as well as other merchants. That is, the payment processing platform can be an aggregator. After adding the first item, or otherwise providing an indication to start a transaction, a display of the merchant device 1308(A) can present a QR code, or other transaction code, that can be associated with a peer-to-peer payment platform. The customer can use a camera associated with the user device 1408(A) to scan, or otherwise capture, the QR code. If the customer is already associated with the peer-to-peer payment platform (e.g., has an existing account, previously onboarded, etc.), the peer-to-peer platform can provide an indication of the scanned QR code to the payment processing platform. This interaction—between the customer computing device and the QR code—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. Such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

As an additional or alternative example, a customer can desire to purchase items from a merchant. When the customer approaches the merchant to check out, the merchant (e.g., a worker associated therewith) can add indications of the items to a virtual cart via the POS application 1318, associated with a payment processing platform, on the merchant device 1308(A). In an example, the merchant can use the payment processing platform to process payments, and the payment processing platform can process payments for the merchant, as well as other merchants. That is, the payment processing platform can be an aggregator. After adding the first item, or otherwise providing an indication to start a transaction, the POS application 1318 can cause a text message with a resource locator (e.g., uniform resource locator (URL)) that can be associated with a peer-to-peer payment platform to be sent to the user device 1408(A). The customer can interact with the resource locator and, if the customer is already associated with the peer-to-peer payment platform (e.g., has an existing account, previously onboarded, etc.), the peer-to-peer payment platform can provide an indication of the interaction with the resource locator to the payment processing platform. This interaction-between the customer and the resource locator presented via the customer computing device—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. As described above, such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

The same or similar techniques can be applicable in online and/or ecommerce selling channels as well. In such an example, a QR code, or other transaction code, can be presented via an online store/ecommerce web page of a merchant. The customer can use a camera associated with a customer computing device, such as the user device 1408(A), to scan, or otherwise capture, the QR code. If the customer is already associated with the peer-to-peer payment platform (e.g., has an existing account, previously onboarded, etc.), the peer-to-peer platform can provide an indication of the scanned QR code to the payment processing platform. This interaction-between the customer computing device and the QR code—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. Such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

As described above, techniques described herein offer improvements to conventional payment technologies. In an example, techniques described herein can enable transaction data to be sent from a POS application 1318 of a merchant device 1308(A) at a brick-and-mortar store of a merchant to a payment application 1418 of a user device 1408(A) of a customer to enable the customer to participate in a transaction via their own computing device. For instance, in a "scan to pay" example as described above, based at least in part on capturing the QR code, or other transaction code, via the user device 1408(A), the payment processing platform can provide transaction data to the peer-to-peer payment platform for presentation via the payment application 1418 on the user device 1408(A). In some examples, the customer can watch items being added to their cart (e.g., via a user interface presented via the payment application). As an item is added to a virtual cart by the merchant-via the POS application 1318 on the merchant device 1308(A) of the merchant—the customer can see the item in their virtual cart on their own computing device in near-real time. In another example, the peer-to-peer payment platform can analyze transaction data as it is received to determine whether an incentive (e.g., a discount, a loyalty reward, prioritized access or booking, etc.) is applicable to the transaction and can automatically apply the incentive or send a recommendation to the payment application 1418 for presentation via a user interface associated therewith. In addition to enabling a customer to participate in a transaction during cart building, techniques described herein can enable a customer to complete a transaction, and in some examples, provide gratuity (i.e., a tip), feedback, loyalty information, or the like, via the user device 1408(A) during or after payment of the transaction.

In some examples, based at least in part on capturing the QR code, or other transaction code, the payment processing platform can provide transaction data to the peer-to-peer payment platform for presentation via the payment application 1418 on the computing device of the customer, such as the user device 1408(A), to enable the customer to complete the transaction via their own computing device. In some examples, in response to receiving an indication that the QR code, or other transaction code, has been captured or otherwise interacted with via the customer computing device, the peer-to-peer payment platform can determine that the customer authorizes payment of the transaction using funds associated with a stored balance of the customer that is managed and/or maintained by the peer-to-peer payment platform. Such authorization can be implicit such that the interaction with the transaction code can imply authorization of the customer. In some examples, in response to receiving an indication that the QR code, or other transaction code, has been captured or otherwise interacted with via the customer computing device, the peer-to-peer payment platform can request authorization to process payment for the transaction using the funds associated with the stored balance and the customer can interact with the payment application to authorize the settlement of the transaction. A response to such a request can provide an express authorization of the customer. In some examples, such an authorization (implicit or express) can be provided prior to a transaction being complete and/or initialization of a conventional payment flow. That is, in some examples, such an authorization can be provided during cart building (e.g., adding item(s) to a virtual cart) and/or prior to payment selection. In some examples, such an authorization can be provided after payment is complete (e.g., via another payment instrument). Based at least in part on receiving an authorization to use funds associated with the stored balance (e.g., implicitly or explicitly) of the customer, the peer-to-peer payment platform can transfer funds from the stored balance of the customer to the payment processing platform. In at least one example, the payment processing platform can deposit the funds, or a portion thereof, into a stored balance of the merchant that is managed and/or maintained by the payment processing platform. That is, techniques described herein enable the peer-to-peer payment platform to transfer funds to the payment processing platform to settle payment of the transaction. In such an example, the payment processing platform can be a "peer" to the customer in a peer-to-peer transaction.

In some examples, techniques described herein can enable the customer to interact with the transaction after payment for the transaction has been settled. For example, in at least one example, the payment processing platform can cause a total amount of a transaction to be presented via a user interface associated with the payment application 1418 such that the customer can provide gratuity, feedback, loyalty information, or the like, via an interaction with the user interface. In some examples, because the customer has already authorized payment via the peer-to-peer payment platform, if the customer inputs a tip, the peer-to-peer payment platform can transfer additional funds, associated with the tip, to the payment processing platform. This pre-authorization (or maintained authorization) of sorts can enable faster, more efficient payment processing when the tip is received. Further, the customer can provide feedback and/or loyalty information via the user interface presented by the payment application, which can be associated with the transaction.

As described above- and also below-techniques described herein enable contactless payments. That is, by integrating the payment processing platform with the peer-to-peer payment platform, merchants and customers can participate in transactions via their own computing devices without needing to touch, or otherwise be in contact, with one another. By moving aspects of a transaction that are traditionally performed on a computing device of a merchant to a computing device of a customer, customers can have more control over the transaction and can have more privacy. That is, customers can monitor items that are added to their cart to ensure accuracy. Further, customers can authorize payments, use rewards, claim incentives, add gratuity, or the like without being watched by the merchant or other customers.

In some examples, such as when the QR code, or other transaction code, is captured by the computing device of the customer prior to a payment selection user interface being presented via the POS application 1318, payment for the transaction can be pre-authorized such that when the time comes to complete the transaction, neither the payment processing platform nor the peer-to-peer payment platform need to re-authorize payment at that time. That is, techniques described herein can enable faster, more efficient transactions. Further, in some examples, when a customer adds a tip after payment for a transaction has been settled, in some examples, because the peer-to-peer payment platform has already been authorized, the peer-to-peer payment platform and the payment processing platform may not need to obtain another authorization to settle funds associated with the tip. That is, in such examples, fewer data transmissions are required and thus, techniques described herein can conserve bandwidth and reduce network congestion. Moreover, as described above, funds associated with tips can be received faster and more efficiently than with conventional payment technologies.

In addition to the improvements described above, techniques described herein can provide enhanced security in payment processing. In some examples, if a camera, or other sensor, used to capture a QR code, or other transaction code, is integrated into a payment application 1418 (e.g., instead of a native camera, or other sensor), techniques described herein can utilize an indication of the QR code, or other transaction code, received from the payment application for two-factor authentication to enable more secure payments.

It should be noted that, while techniques described herein are directed to contactless payments using QR codes or other transaction codes, in additional or alternative examples, techniques described herein can be applicable for contact payments. That is, in some examples, instead of scanning, capturing, or otherwise interacting with a QR code or transaction code, a customer can swipe a payment instrument (e.g., a credit card, a debit card, or the like) via a reader device associated with a merchant device, dip a payment instrument into a reader device associated with a merchant computing device, tap a payment instrument with a reader device associated with a merchant computing device, or the like, to initiate the provisioning of transaction data to the customer computing device. For example, based at least in part on detecting a dip, tap, swipe, or the like, the payment processing platform can associate a customer with a transaction and provide at least a portion of transaction data associated with the transaction to a customer computing device associated therewith. In some examples, the payment instrument can be associated with the peer-to-peer payment platform as described herein (e.g., a debit card linked to a stored balance of a customer) such that when the payment instrument is caused to interact with a payment reader, the payment processing platform can exchange communications with the peer-to-peer payment platform to authorize payment for a transaction and/or provision associated transaction data to a computing device of the customer associated with the transaction.

In one or more implementations, various applications, like the payment application 1418 and the POS application 1318, may have access to or otherwise utilize the decentralized network 104 to carry out transactions involving digital assets supported by the blockchain network 102. As mentioned above, for instance, the server(s) 1302 and the server(s) 1402 may be used in some cases—at least in part—to implement nodes of the decentralized network 104. Alternatively, the applications may be capable of establishing a connection or bridge to the decentralized network 104 to perform such transactions. In addition to a payment application 1418 and a POS application 1318, other examples of applications capable of leveraging the techniques and systems described herein include, by way of example, and not limitation finance applications, content delivery applications (e.g., music streaming applications), digital content marketplaces (e.g., marketplaces for digital art including NFTs), computer game applications, virtual world applications, and so on.

Figure 17:
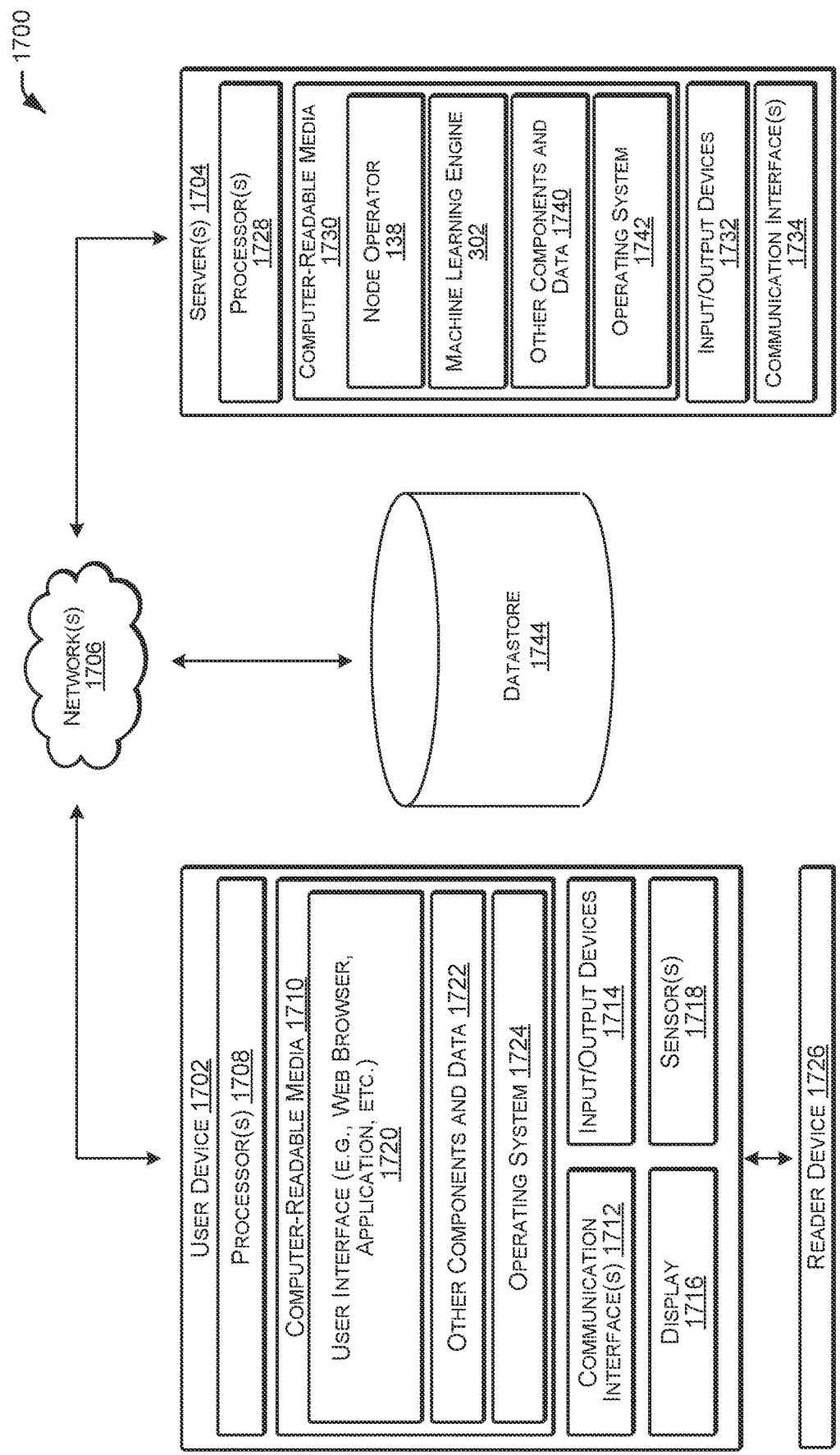
FIG. 17 depicts an illustrative block diagram illustrating a system for performing techniques described herein with which techniques described herein can be implemented, according to an embodiment described herein.

FIG. 17 depicts an illustrative block diagram illustrating a system 1700 for performing techniques described herein. The system 1700 includes a user device 1702, that communicates with server computing device(s) (e.g., server(s) 1704) via network(s) 1706 (e.g., the Internet, cable network(s), cellular network(s), cloud network(s), wireless network(s) (e.g., Wi-Fi) and wired network(s), as well as close-range communications such as Bluetooth®, Bluetooth® low energy (BLE), and the like). While a single user device 1702 is illustrated, in additional or alternate examples, the system 1700 can have multiple user devices, as described above with reference to FIG. 13 and FIG. 14.

In the context of examples discussed above, the client device 106 and/or the client device 108 may be configured like the user device 1702 in one or more implementations. It is to be appreciated, however, that the client device 106 and the client device 108 may be configured differently in variations. Additionally or alternatively, the underlying computing devices used to implement the blockchain nodes of the blockchain network 102 and the underlying computing devices used to implement the nodes of the decentralized network 104 may be configured like the user device 1702 or the server(s) 1704. For example, the user device 1702 may be deployed by an "at-home" user or hobbyist to implement a blockchain node 110 or a node 112 of the decentralized network 104. By way of contrast, the server(s) 1704 may be deployed by a company and/or other organization to implement the blockchain node 110 or the node 112 of the decentralized network 104. That is not to say, however, that an "at-home" user or hobbyist may not build or otherwise utilize a server(s) 1704 to implement a blockchain node or a node of the decentralized network 104—they may.

In at least one example, the user device 1702 can be any suitable type of computing device, e.g., portable, semi-portable, semi-stationary, or stationary. Some examples of the user device 1702 can include, but are not limited to, a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. That is, the user device 1702 can be any computing device capable of sending communications and performing the functions according to the techniques described herein. The user device 1702 can include devices, e.g., payment card readers, or components capable of accepting payments, as described below.

In the illustrated example, the user device 1702 includes one or more processors 1708, one or more computer-readable media 1710, one or more communication interface(s) 1712, one or more input/output (I/O) devices 1714, a display 1716, and sensor(s) 1718.

In at least one example, each processor 1708 can itself comprise one or more processors or processing cores. For example, the processor(s) 1708 can be implemented as one or more microprocessors, microcomputers, microcontrollers, digital signal processors, central processing units, state machines, logic circuitries, and/or any devices that manipulate signals based on operational instructions. In some examples, the processor(s) 1708 can be one or more hardware processors and/or logic circuits of any suitable type specifically programmed or configured to execute the algorithms and processes described herein. The processor(s) 1708 can be configured to fetch and execute computer-readable processor-executable instructions stored in the computer-readable media 1710.

Depending on the configuration of the user device 1702, the computer-readable media 1710 can be an example of tangible non-transitory computer storage media and can include volatile and nonvolatile memory and/or removable and non-removable media implemented in any type of technology for storage of information such as computer-readable processor-executable instructions, data structures, program components or other data. The computer-readable media 1710 can include, but is not limited to, RAM, ROM, EEPROM, flash memory, solid-state storage, magnetic disk storage, optical storage, and/or other computer-readable media technology. Further, in some examples, the user device 1702 can access external storage, such as RAID storage systems, storage arrays, network attached storage, storage area networks, cloud storage, or any other medium that can be used to store information and that can be accessed by the processor(s) 1708 directly or through another computing device or network. Accordingly, the computer-readable media 1710 can be computer storage media able to store instructions, components or components that can be executed by the processor(s) 1708. Further, when mentioned, non-transitory computer-readable media exclude media such as energy, carrier signals, electromagnetic waves, and signals per se.

The computer-readable media 1710 can be used to store and maintain any number of functional components that are executable by the processor(s) 1708. In some implementations, these functional components comprise instructions or programs that are executable by the processor(s) 1708 and that, when executed, implement operational logic for performing the actions and services attributed above to the user device 1702. Functional components stored in the computer-readable media 1710 can include a user interface 1720 to enable users to interact with the user device 1702, and thus the server(s) 1704 and/or other networked devices. In at least one example, the user interface 1720 can be presented via a web browser, or the like. In other examples, the user interface 1720 can be presented via an application, such as a mobile application or desktop application, which can be provided by a service provider associated with the server(s) 1704, or which can be an otherwise dedicated application. In some examples, the user interface 1720 can be displayed to enable a user to initiate a cryptocurrency payment (or other digital asset transfer) to another user (e.g., to a merchant) over the decentralized network 104, to notify a recipient user that a payment (or other digital asset) has been received from a sending user, or to allow the recipient user to accept the transfer, to name just a few. In the context of previously described examples, the user interface 202 and the user interface 204 are each examples of a user interface 1720 that may be displayed via a display 1716 of a respective user device 1702, such as the client device 106 or the client device 108. In at least one example, a user can interact with the user interface via touch input, spoken input, gesture, or any other type of input. The word "input" is also used to describe "contextual" input that may not be directly provided by the user via the user interface 1720. For example, user's interactions with the user interface 1720 are analyzed using, e.g., natural language processing techniques, to determine context or intent of the user, which may be treated in a manner similar to "direct" user input.

Depending on the type of the user device 1702, the computer-readable media 1710 can also optionally include other functional components and data, such as other components and data 1722, which can include programs, drivers, etc., and the data used or generated by the functional components. In addition, the computer-readable media 1710 can also store data, data structures and the like, that are used by the functional components. In accordance with the described techniques, for instance, the computer-readable media 1710 may also be used in variations to store one or more of the state data 142, the model(s) 140, the settings 144, and the scores 320 discussed above. Further, the user device 1702 can include many other logical, programmatic and physical components, of which those described are merely examples that are related to the discussion herein. In accordance with the described techniques, such other components may include, for instance, one or more of the node operator 138 as well as the machine learning engine 302, the simulation engine 304, the adjustment system 306, and the path-finding algorithm 308.

In at least one example, the computer-readable media 1710 can include additional functional components, such as an operating system 1724 for controlling and managing various functions of the user device 1702 and for enabling basic user interactions.

The communication interface(s) 1712 can include one or more interfaces and hardware components for enabling communication with various other devices, such as over the network(s) 1706 or directly. For example, communication interface(s) 1712 can enable communication through one or more network(s) 1706, which can include, but are not limited any type of network known in the art, such as a local area network or a wide area network, such as the Internet, and can include a wireless network, such as a cellular network, a cloud network, a local wireless network, such as Wi-Fi and/or close-range wireless communications, such as Bluetooth®, BLE, NFC, RFID, a wired network, or any other such network, or any combination thereof. Accordingly, network(s) 1706 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

Embodiments of the disclosure may be provided to users through a cloud computing infrastructure. Cloud computing refers to the provision of scalable computing resources as a service over a network, to enable convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

The user device 1702 can further include one or more input/output (I/O) devices 1714. The I/O devices 1714 can include speakers, a microphone, a camera, and various user controls (e.g., buttons, a joystick, a keyboard, a keypad, etc.), a haptic output device, and so forth. The I/O devices 1714 can also include attachments that leverage the accessories (audio-jack, USB-C, Bluetooth, etc.) to connect with the user device 1702.

In at least one example, user device 1702 can include a display 1716. Depending on the type of computing device(s) used as the user device 1702, the display 1716 can employ any suitable display technology. For example, the display 1716 can be a liquid crystal display, a plasma display, a light emitting diode display, an OLED (organic light-emitting diode) display, an electronic paper display, or any other suitable type of display able to present digital content thereon. In at least one example, the display 1716 can be an augmented reality display, a virtually reality display, or any other display able to present and/or project digital content. In some examples, the display 1716 can have a touch sensor associated with the display 1716 to provide a touchscreen display configured to receive touch inputs for enabling interaction with a graphic interface presented on the display 1716. Accordingly, implementations herein are not limited to any particular display technology. Alternatively, in some examples, the user device 1702 may not include the display 1716, and information can be presented by other means, such as aurally, haptically, etc.

In addition, the user device 1702 can include sensor(s) 1718. The sensor(s) 1718 can include a GPS device able to indicate location information. Further, the sensor(s) 1718 can include, but are not limited to, an accelerometer, gyroscope, compass, proximity sensor, camera, microphone, and/or a switch.

In some examples, the GPS device can be used to identify a location of a user. In at least one example, the location of the user can be used by the service provider, described above, to provide one or more services. That is, in some examples, the service provider can implement geofencing to provide particular services to users. As an example, with a lending service, location can be used to confirm that a stated purpose of a loan corresponds to evidence of use (e.g., Is the user using the loan consistent with what he or she said he or she was going to use it for?). Furthermore, in some examples, location can be used for payroll purposes. As an example, if a contractor completes a project, the contractor can provide a geo-tagged image (e.g., tagged based on location information availed by the GPS device). In some examples, location can be used for facilitating peer-to-peer payments between nearby users and/or for sending users notifications regarding available appointments with merchant(s) located proximate to the users. In at least one example, location can be used for taking payments from nearby customers when they leave a geofence, or location can be used to initiate an action responsive to users 1314 enter a brick-and-mortar store of a merchant. Location can be used in additional or alternative ways as well.

Additionally, the user device 1702 can include various other components that are not shown, examples of which include removable storage, a power source, such as a battery and power control unit, a barcode scanner, a printer, a cash drawer, and so forth.

In addition, in some examples, the user device 1702 can include, be connectable to, or otherwise be coupled to a reader device 1726, for reading payment instruments and/or identifiers associated with payment objects. In some examples, as described above, the reader device 1726 can plug in to a port in the user device 1702, such as a microphone port, a headphone port, an audio-jack, a data port, or other suitable port. In additional or alternative examples, the reader device 1726 can be coupled to the user device 1702 via another wired or wireless connection, such as via a Bluetooth®, BLE, and so on. The reader device 1726 can include a read head for reading a magnetic strip of a payment card, and further can include encryption technology for encrypting the information read from the magnetic strip. Additionally or alternatively, the reader device 1726 can be an EMV payment reader, which in some examples, can be embedded in the user device 1702. Moreover, numerous other types of readers can be employed with the user device 1702 herein, depending on the type and configuration of the user device 1702.

The reader device 1726 may be a portable magnetic stripe card reader, optical scanner, smartcard (card with an embedded IC chip) reader (e.g., an EMV-compliant card reader or short-range communication-enabled reader), RFID reader, or the like, configured to detect and obtain data off any payment instrument. Accordingly, the reader device 1726 may include hardware implementation, such as slots, magnetic tracks, and rails with one or more sensors or electrical contacts to facilitate detection and acceptance of a payment instrument. That is, the reader device 1726 may include hardware implementations to enable the reader device 1726 to interact with a payment instrument via a swipe (i.e., a card-present transaction where a customer slides a card having a magnetic strip through a payment reader that captures payment data contained in the magnetic strip), a dip (i.e., a card-present transaction where a customer inserts a card having an embedded microchip (i.e., chip) into a payment reader first until the payment reader prompts the customer to remove the card), or a tap (i.e., a card-present transaction where a customer may tap or hover his or her electronic device such as a smart phone running a payment application over a payment reader to complete a transaction via short-range communication) to obtain payment data associated with a customer. Additionally or optionally, the reader device 1726 may also include a biometric sensor to receive and process biometric characteristics and process them as payment instruments, given that such biometric characteristics are registered with the payment service and connected to a financial account with a bank server.

The reader device 1726 may include processing unit(s), computer-readable media, a reader chip, a transaction chip, a timer, a clock, a network interface, a power supply, and so on. The processing unit(s) of the reader device 1726 may execute one or more components and/or processes to cause the reader device 1726 to perform a variety of functions, as set forth above and explained in further detail in the following disclosure. In some examples, the processing unit(s)

may include a central processing unit (CPU), a graphics processing unit (GPU), a CPU and a GPU, or processing units or components known in the art. Additionally, each of the processing unit(s) may possess its own local memory, which also may store program components, program data, and/or one or more operating systems. Depending on the exact configuration and type of the reader device 1726, the computer-readable media may include volatile memory (such as RAM), non-volatile memory (such as ROM, flash memory, miniature hard drive, memory card, or the like), or some combination thereof. In at least one example, the computer-readable media of the reader device 1726 may include at least one component for performing various functions as described herein.

The reader chip may perform functionalities to control the operations and processing of the reader device 1726. That is, the reader chip may perform functionalities to control payment interfaces (e.g., a contactless interface, a contact interface, etc.), a wireless communication interface, a wired interface, a user interface (e.g., a signal condition device (FPGA)), etc. Additionally, the reader chip may perform functionality to control the timer, which may provide a timer signal indicating an amount of time that has lapsed following a particular event (e.g., an interaction, a power-down event, etc.). Moreover, the reader chip may perform functionality to control the clock, which may provide a clock signal indicating a time. Furthermore, the reader chip may perform functionality to control the network interface, which may interface with the network(s) 1706, as described below.

Additionally, the reader chip may perform functionality to control the power supply. The power supply may include one or more power supplies such as a physical connection to AC power or a battery. Power supply may include power conversion circuitry for converting AC power and generating a plurality of DC voltages for use by components of reader device 1726. When power supply includes a battery, the battery may be charged via a physical power connection, via inductive charging, or via any other suitable method.

The transaction chip may perform functionalities relating to processing of payment transactions, interfacing with payment instruments, cryptography, and other payment-specific functionality. That is, the transaction chip may access payment data associated with a payment instrument and may provide the payment data to a POS terminal, as described above. The payment data may include, but is not limited to, a name of the customer, an address of the customer, a type (e.g., credit, debit, etc.) of a payment instrument, a number associated with the payment instrument, a verification value (e.g., PIN Verification Key Indicator (PVKI), PIN Verification Value (PVV), Card Verification Value (CVV), Card Verification Code (CVC), etc.) associated with the payment instrument, an expiration data associated with the payment instrument, a primary account number (PAN) corresponding to the customer (which may or may not match the number associated with the payment instrument), restrictions on what types of charges/debts may be made, etc. Additionally, the transaction chip may encrypt the payment data upon receiving the payment data.

It should be understood that in some examples, the reader chip may have its own processing unit(s) and computer-readable media and/or the transaction chip may have its own processing unit(s) and computer-readable media. In other examples, the functionalities of reader chip and transaction chip may be embodied in a single chip or a plurality of chips, each including any suitable combination of processing units and computer-readable media to collectively perform the functionalities of reader chip and transaction chip as described herein.

While the user device 1702, which can be a POS terminal, and the reader device 1726 are shown as separate devices, in additional or alternative examples, the user device 1702 and the reader device 1726 can be part of a single device, which may be a battery-operated device. In such an example, components of both the user device 1702 and the reader device 1726 may be associated with the single device. In some examples, the reader device 1726 can have a display integrated therewith, which can be in addition to (or as an alternative of) the display 1716 associated with the user device 1702.

The server(s) 1704 can include one or more servers or other types of computing devices that can be embodied in any number of ways. For example, in the example of a server, the components, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the server(s) 1704 as being present in a single location, these components and data can alternatively be distributed across different computing devices and different locations in any manner. Consequently, the functions can be implemented by one or more server computing devices, with the various functionality described above distributed in various ways across the different computing devices. Multiple server(s) 1704 can be located together or separately, and organized, for example, as virtual servers, server banks and/or server farms. The described functionality can be provided by the servers of a single merchant or enterprise, or can be provided by the servers and/or services of multiple different customers or enterprises.

In the illustrated example, the server(s) 1704 can include one or more processors 1728, one or more computer-readable media 1730, one or more I/O devices 1732, and one or more communication interfaces 1734. Each processor 1728 can be a single processing unit or a number of processing units, and can include single or multiple computing units or multiple processing cores. The processor(s) 1728 can be implemented as one or more microprocessors, microcomputers, microcontrollers, digital signal processors, central processing units, state machines, logic circuitries, and/or any devices that manipulate signals based on operational instructions. For example, the processor(s) 1728 can be one or more hardware processors and/or logic circuits of any suitable type specifically programmed or configured to execute the algorithms and processes described herein. The processor(s) 1728 can be configured to fetch and execute computer-readable instructions stored in the computer-readable media 1730, which can program the processor(s) 1728 to perform the functions described herein.

The computer-readable media 1730 can include volatile and nonvolatile memory and/or removable and non-removable media implemented in any type of technology for storage of information, such as computer-readable instructions, data structures, program components, or other data. Such computer-readable media 1730 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the server(s) 1704, the computer-readable media 1730 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 1730 can be used to store any number of functional components that are executable by the processor(s) 1728. In many implementations, these functional components comprise instructions or programs that are executable by the processors 1728 and that, when executed, specifically configure the one or more processors 1728 to perform the actions attributed above to the service provider and/or payment processing service. Functional components stored in the computer-readable media 1730 can optionally include the node operator 138 as well as the machine learning engine 302 and one or more other components and data 1740. Examples of such other components include but are not limited to, the simulation engine 304, the adjustment system 306, and the path-finding algorithm 308, and examples of such other data include but are not limited to the state data 142, the model(s) 140, the settings 144, and the scores 320.

The node operator 138 can be configured to receive transaction data over the decentralized network 104 from POS systems, such in connection with routing a payment through the node 112 between the POS system 1324 described above with reference to FIG. 13 and the user device 1408(A) of the user 1416(A) described above with reference to FIG. 14.

The machine learning engine 302 can be configured to train model(s) 140 using machine-learning mechanisms. For example, a machine-learning mechanism can analyze training data (e.g., the state data 142) to train a data model that generates an output, which can be a recommendation, a score 320, and/or another indication. Machine-learning mechanisms can include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc. In at least one example, machine-trained data models can be stored in a datastore associated with the user device(s) 1702 and/or the server(s) 1704 for use at a time after the data models have been trained (e.g., at runtime).

As noted above, the one or more other components and data 1740 can include the simulation engine 304, the adjustment system 306, the path-finding algorithm 308, the state data 142, the model(s) 140, the settings 144, and the scores 320, the functionality of which is described, at least partially, above. Further, the one or more other components and data 1740 can include programs, drivers, etc., and the data used or generated by the functional components. Further, the server(s) 1704 can include many other logical, programmatic and physical components, of which those described above are merely examples that are related to the discussion herein.

The one or more "components" referenced herein may be implemented as more components or as fewer components, and functions described for the components may be redistributed depending on the details of the implementation. The term "component," as used herein, refers broadly to software stored on non-transitory storage medium (e.g., volatile or non-volatile memory for a computing device), hardware, or firmware (or any combination thereof) components. Modules are typically functional such that they that may generate useful data or other output using specified input(s). A component may or may not be self-contained. An application program (also called an "application") may include one or more components, or a component may include one or more application programs that can be accessed over a network or downloaded as software onto a device (e.g., executable code causing the device to perform an action). An application program (also called an "application") may include one or more components, or a component may include one or more application programs. In additional and/or alternative examples, the component(s) may be implemented as computer-readable instructions, various data structures, and so forth via at least one processing unit to configure the computing device(s) described herein to execute instructions and to perform operations as described herein.

In some examples, a component may include one or more application programming interfaces (APIs) to perform some or all of its functionality (e.g., operations). In at least one example, a software developer kit (SDK) can be provided by the service provider to allow third-party developers to include service provider functionality and/or avail service provider services in association with their own third-party applications. Additionally or alternatively, in some examples, the service provider can utilize an SDK to integrate third-party service provider functionality into its applications. That is, API(s) and/or SDK(s) can enable third-party developers to customize how their respective third-party applications interact with the service provider or vice versa.

The computer-readable media 1730 can additionally include an operating system 1742 for controlling and managing various functions of the server(s) 1704.

The communication interface(s) 1734 can include one or more interfaces and hardware components for enabling communication with various other devices, such as over the network(s) 1706 or directly. For example, communication interface(s) 1734 can enable communication through one or more network(s) 1706, which can include, but are not limited any type of network known in the art, such as a local area network or a wide area network, such as the Internet, and can include a wireless network, such as a cellular network, a local wireless network, such as Wi-Fi and/or close-range wireless communications, such as Bluetooth®, BLE, NFC, RFID, a wired network, or any other such network, or any combination thereof. Accordingly, network(s) 1706 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

The server(s) 1704 can further be equipped with various I/O devices 1732. Such I/O devices 1732 can include a display, various user interface controls (e.g., buttons, joystick, keyboard, mouse, touch screen, biometric or sensory input devices, etc.), audio speakers, connection ports and so forth.

In at least one example, the system 1700 can include a datastore 1744 that can be configured to store data that is accessible, manageable, and updatable. In some examples, the datastore 1744 can be integrated with the user device 1702 and/or the server(s) 1704. In other examples, as shown in FIG. 9, the datastore 1744 can be located remotely from the server(s) 1704 and can be accessible to the server(s) 1704. The datastore 1744 can comprise multiple databases and/or servers connected locally and/or remotely via the network(s) 1706.

In at least one example, the datastore 1744 can store user profiles, which can include merchant profiles, customer profiles, and so on. Alternatively or additionally, the datastore 1744 can store the state data 142 and/or model(s) 140 for access over the network(s) 1706 by various user devices 1702 and/or server(s) 1704.

Merchant profiles can store, or otherwise be associated with, data associated with merchants. For instance, a merchant profile can store, or otherwise be associated with, information about a merchant (e.g., name of the merchant, geographic location of the merchant, operating hours of the merchant, employee information, etc.), a merchant category classification (MCC), item(s) offered for sale by the merchant, hardware (e.g., device type) used by the merchant, transaction data associated with the merchant (e.g., transactions conducted by the merchant, payment data associated with the transactions, items associated with the transactions, descriptions of items associated with the transactions, itemized and/or total spends of each of the transactions, parties to the transactions, dates, times, and/or locations associated with the transactions, etc.), loan information associated with the merchant (e.g., previous loans made to the merchant, previous defaults on said loans, etc.), risk information associated with the merchant (e.g., indications of risk, instances of fraud, chargebacks, etc.), appointments information (e.g., previous appointments, upcoming (scheduled) appointments, timing of appointments, lengths of appointments, etc.), payroll information (e.g., employees, payroll frequency, payroll amounts, etc.), employee information, reservations data (e.g., previous reservations, upcoming (scheduled) reservations, interactions associated with such reservations, etc.), inventory data, customer service data, etc. The merchant profile can securely store bank account information as provided by the merchant. Further, the merchant profile can store payment information associated with a payment instrument linked to a stored balance of the merchant, such as a stored balance maintained in a ledger by the service provider.

Customer profiles can store customer data including, but not limited to, customer information (e.g., name, phone number, address, banking information, etc.), customer preferences (e.g., learned or customer-specified), purchase history data (e.g., identifying one or more items purchased (and respective item information), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, customer service data, etc.

Furthermore, in at least one example, the datastore 1744 can store inventory database(s) and/or catalog database(s). As described above, an inventory can store data associated with a quantity of each item that a merchant has available to the merchant. Furthermore, a catalog can store data associated with items that a merchant has available for acquisition. The datastore 1744 can store additional or alternative types of data as described herein.

The phrases "in some examples," "according to various examples," "in the examples shown," "in one example," "in other examples," "various examples," "some examples," and the like generally mean the particular feature, structure, or characteristic following the phrase is included in at least one example of the present invention, and may be included in more than one example of the present invention. In addition, such phrases do not necessarily refer to the same examples or to different examples.

If the specification states a component or feature "can," "may," "could," or "might" be included or have a characteristic, that particular component or feature is not required to be included or have the characteristic.

Further, the aforementioned description is directed to devices and applications that are related to payment technology. However, it will be understood, that the technology can be extended to any device and application. Moreover, techniques described herein can be configured to operate irrespective of the kind of payment object reader, POS terminal, web applications, mobile applications, POS topologies, payment cards, computer networks, and environments.

Various figures included herein are flowcharts showing example methods involving techniques as described herein. The methods illustrated are described with reference to components described in the figures for convenience and ease of understanding. However, the methods illustrated are not limited to being performed using components described the figures and such components are not limited to performing the methods illustrated herein.

Furthermore, the methods described above are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the methods can be combined in whole or in part with each other or with other methods.

In some aspects, the techniques described herein relate to a computer-implemented method including: accessing historical state data to train one or more models using machine learning, wherein the historical state data includes at least one of routing fees or traffic flows associated with a decentralized network layered on top of a blockchain network, and wherein the one or more models are trained to optimize routing within the decentralized network; monitoring, in near-real-time and using the one or more models, state data associated with the decentralized network; and based at least in part on the monitoring, dynamically causing one or more actions to be performed by a node operator to optimize routing within the decentralized network.

In some aspects, the techniques described herein relate to a computer-implemented method, wherein dynamically causing the one or more actions to be performed further includes: performing multiple simulations of traffic flows over the decentralized network using the state data and the one or more models; adjusting, for each of the multiple simulations, a state associated with a node of the decentralized network; determining an optimized state of the node to optimize routing within the decentralized network based on the multiple simulations; and performing the one or more actions to configure the node to operate in the optimized state.

In some aspects, the techniques described herein relate to a computer-implemented method, wherein adjusting the state associated with the node includes adjusting, for each of the multiple simulations, a routing fee associated with the node of the decentralized network.

In some aspects, the techniques described herein relate to a computer-implemented method, wherein performing the one or more actions to configure the node to operate in the optimized state includes modifying a routing fee of the node based on the multiple simulations.

In some aspects, the techniques described herein relate to a computer-implemented method, wherein the decentralized network comprises Lightning Network, and the blockchain network includes Bitcoin.

In some aspects, the techniques described herein relate to a system including: a node of a decentralized network that is layered on top of a blockchain network, the node configured with settings that control routing of network traffic through the node of the decentralized network; and a node operator associated with the node and configured to: obtain state data describing a state of the decentralized network; process the state data using one or more machine learning models to generate a prediction of optimized settings for the node; and dynamically adjust one or more of the settings of the node to conform to the optimized settings.

In some aspects, the techniques described herein relate to a system, wherein the node operator obtains at least a portion of the state data from one or more public data sources associated with the decentralized network.

In some aspects, the techniques described herein relate to a system, wherein the node operator obtains at least a portion of the state data by probing the decentralized network.

In some aspects, the techniques described herein relate to a system, wherein to probe the decentralized network to obtain the portion of state data, the node operator is further configured to: probe the decentralized network at a first time to determine balances of channels between nodes of the decentralized network at the first time; probe the decentralized network at a second time to determine balances of channels between nodes of the decentralized network at the second time; and determine network traffic over the channels based on a difference between the balances of the channels at the first time and the balances of the channels at the second time.

In some aspects, the techniques described herein relate to a system, wherein dynamically adjusting one or more of the settings includes opening or closing a channel for routing the network traffic through the node to maximize at least one of: a volume of transactions over one or more channels of the node; a number of the transactions over the one or more channels of the node; or a return on investment of a cryptocurrency staked for the node.

In some aspects, the techniques described herein relate to a system, wherein dynamically adjusting one or more of the settings includes setting a routing fee for routing the network traffic through the node to maximize at least one of: a volume of transactions over one or more channels of the node; a number of the transactions over the one or more channels of the node; or a return on investment of a cryptocurrency staked for the node.

In some aspects, the techniques described herein relate to a system, wherein dynamically adjusting one or more of the settings includes adjusting a capacity of a channel for routing the network traffic through the node to maximize at least one of: a volume of transactions over one or more channels of the node; a number of the transactions over the one or more channels of the node; or a return on investment of a cryptocurrency staked for the node.

In some aspects, the techniques described herein relate to computer-readable storage media storing instructions that are executable by one or more processors to perform operations including: accessing historical state data to train one or more models using machine learning, wherein the historical state data includes at least one of routing fees or traffic flows associated with a decentralized network layered on top of a blockchain network, and wherein the one or more models are trained to optimize routing within the decentralized network; monitoring, in near-real-time and using the one or more models, state data associated with the decentralized network; and based at least in part on the monitoring, dynamically causing one or more actions to be performed by a node operator to optimize routing within the decentralized network.

In some aspects, the techniques described herein relate to a computer-readable storage media, wherein the one or more actions include opening or closing a channel in the decentralized network.

In some aspects, the techniques described herein relate to a computer-readable storage media, wherein the one or more actions include setting a routing fee for a node in the decentralized network.

In some aspects, the techniques described herein relate to a computer-readable storage media, wherein the one or more actions include adjusting a capacity of a channel in the decentralized network.

In some aspects, the techniques described herein relate to a computer-readable storage media, wherein the one or more actions include closing a channel with a malicious node.

In some aspects, the techniques described herein relate to a computer-readable storage media, wherein dynamically causing the one or more actions to be performed by the node operator optimizes at least one of: a volume of transactions over one or more channels of a node in the decentralized network; a number of the transactions over the one or more channels of the node in the decentralized network; or a return on investment of a cryptocurrency staked for the node in the decentralized network.

In some aspects, the techniques described herein relate to a computer-readable storage media, wherein the historical state data and the state data include public data associated with the decentralized network.

In some aspects, the techniques described herein relate to a computer-readable storage media, wherein at least a portion of at least one of the historical state data or the state data is obtained by probing the decentralized network.

In some aspects, the techniques described herein relate to a computer-readable storage media, wherein probing the decentralized network includes: probing the decentralized network at a first time to determine balances of channels between nodes of the decentralized network at the first time; probing the decentralized network at a second time to determine balances of channels between nodes of the decentralized network at the second time; and determining network traffic over the channels based on a difference between the balances of the channels at the first time and the balances of the channels at the second time.

While this specification contains many specific implementation details, these should not be construed as limitations on the scope of technologies or of what may be claimed, but rather as descriptions of features specific to particular embodiments of particular technologies. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together into a single software product or packaged into multiple software products.

Although the systems and techniques have been described in language specific to structural features and/or methodological acts, it is to be understood that the systems and techniques defined in the appended claims are not necessarily limited to the specific features or acts described. Rather, the specific features and acts are disclosed as example forms of implementing the claimed subject matter. Additionally, in various scenarios, the claimed subject matter can depend from one or multiple aspects of any other portion of claimed subject matter.

What is claimed is:

1. A computer-implemented method comprising:
   accessing historical state data to train one or more models using machine learning, wherein the historical state data comprises at least one of routing fees or traffic flows associated with a decentralized network layered on top of a blockchain network, and wherein the one or more models are trained to optimize routing within the decentralized network;
   monitoring, in near-real-time and using the one or more models, state data associated with the decentralized network;
   performing multiple simulations of traffic flows over the decentralized network for a period of time using the state data and the one or more models, wherein a state associated with a node of the decentralized network is adjusted for each of the multiple simulations;
   determining an optimized state of the node to optimize routing within the decentralized network based on the multiple simulations; and
   dynamically causing one or more actions to be performed by a node operator that configure the node to operate in the optimized state.

2. The computer-implemented method of claim 1, wherein dynamically causing one or more actions to be performed by the node operator that configure the node to operate in the optimized state includes modifying a routing fee of the node based on the multiple simulations.

3. The computer-implemented method of claim 1, wherein the decentralized network comprises Lightning Network, and the blockchain network comprises Bitcoin.

4. The computer-implemented method of claim 1, wherein the one or more models are trained to optimize routing of blockchain transactions within the decentralized network.

5. The computer-implemented method of claim 1, wherein the multiple simulations simulate the period of time for the decentralized network.

6. The computer-implemented method of claim 1, wherein the period of time is at least one of a number of hours simulated or a number of days simulated.

7. The computer-implemented method of claim 1, wherein the state associated with the node of the decentralized network is based, at least in part, on a plurality of settings of the node, and wherein adjusting the state associated with the node in each of the multiple simulations comprises adjusting at least one setting of the node.

8. The computer-implemented method of claim 7, wherein the at least one setting of the node that is adjusted in a simulation includes at least one of a set of channels open with one or more other nodes of the decentralized network or balances of one or more of the channels of the set of channels.

9. The computer-implemented method of claim 7, wherein the at least one setting of the node is adjusted randomly.

10. The computer-implemented method of claim 7, wherein the at least one setting of the node that is adjusted in a simulation includes a routing fee to use the node for routing a transaction.

11. A system comprising:
    a node of a decentralized network that is layered on top of a blockchain network, the node configured with settings that control routing of network traffic through the node of the decentralized network; and
    a node operator associated with the node and configured to:
      obtain state data describing a state of the decentralized network;
      process the state data using one or more machine learning models to generate a prediction of optimized settings for the node, wherein:
        the one or more machine learning models are used to perform multiple simulations of traffic flows for a period of time over the decentralized network with the state data;
        a state associated with the node is adjusted for each of the multiple simulations, and
        the prediction of the optimized settings for the node is based on optimized routing within the decentralized network in the multiple simulations; and
      dynamically adjust one or more of the settings of the node to conform to the optimized settings.

12. The system of claim 11, wherein the node operator obtains at least a portion of the state data from one or more public data sources associated with the decentralized network.

13. The system of claim 11, wherein the node operator obtains at least a portion of the state data by probing the decentralized network, and wherein to probe the decentralized network to obtain the portion of state data, the node operator is further configured to:

probe the decentralized network at a first time to determine balances of channels between nodes of the decentralized network at the first time;

probe the decentralized network at a second time to determine balances of channels between nodes of the decentralized network at the second time; and determine network traffic over the channels based on a difference between the balances of the channels at the first time and the balances of the channels at the second time.

14. The system of claim 11, wherein dynamically adjusting one or more of the settings includes opening or closing a channel for routing the network traffic through the node to maximize at least one of:

a volume of transactions over one or more channels of the node;

a number of the transactions over the one or more channels of the node; or a return on investment of a cryptocurrency staked for the node.

15. The system of claim 11, wherein dynamically adjusting one or more of the settings includes setting a routing fee for routing the network traffic through the node to maximize at least one of:

a volume of transactions over one or more channels of the node;

a number of the transactions over the one or more channels of the node; or a return on investment of a cryptocurrency staked for the node.

16. The system of claim 11, wherein dynamically adjusting one or more of the settings includes adjusting a capacity of a channel for routing the network traffic through the node to maximize at least one of:

a volume of transactions over one or more channels of the node;

a number of the transactions over the one or more channels of the node; or a return on investment of a cryptocurrency staked for the node.

17. Computer-readable storage media storing instructions that are executable by one or more processors to perform operations comprising:

accessing historical state data to train one or more models using machine learning, wherein the historical state data is associated with a decentralized network layered on top of a blockchain network, and wherein the one or more models are trained to optimize routing within the decentralized network;

monitoring, in near-real-time and using the one or more models, state data associated with the decentralized network;

performing multiple simulations of traffic flows for a period of time over the decentralized network using the state data and the one or more models, wherein a state associated with a node of the decentralized network is adjusted for each of the multiple simulations;

determining an optimized state of the node to optimize routing within the decentralized network based on the multiple simulations; and dynamically causing one or more actions to be performed by a node operator that configure the node to operate in the optimized state.

18. The computer-readable storage media of claim 17, wherein the one or more actions include opening or closing a channel between the node and another node in the decentralized network.

19. The computer-readable storage media of claim 17, wherein the one or more actions include closing a channel between the node and a malicious node in the decentralized network.

20. The computer-readable storage media of claim 17, wherein at least a portion of at least one of the historical state data or the state data is obtained by probing the decentralized network, and probing the decentralized network comprises:

probing the decentralized network at a first time to determine balances of channels between nodes of the decentralized network at the first time;

probing the decentralized network at a second time to determine balances of channels between nodes of the decentralized network at the second time; and determining network traffic over the channels based on a difference between the balances of the channels at the first time and the balances of the channels at the second time.

* * * * *